United States Patent [19]
Nagai et al.

[11] Patent Number: 5,799,543
[45] Date of Patent: Sep. 1, 1998

[54] ACTUATOR STRUCTURAL BODY

[75] Inventors: Shigekazu Nagai; Koji Sugano; Akio Saitoh; Masahiko Suzuki, all of Ibaraki-ken, Japan

[73] Assignee: SMC Kabushiki Kaisha, Tokyo, Japan

[21] Appl. No.: 602,795
[22] PCT Filed: Sep. 2, 1993
[86] PCT No.: PCT/JP93/01242
 § 371 Date: Mar. 4, 1996
 § 102(e) Date: Mar. 4, 1996
[87] PCT Pub. No.: WO95/06545
 PCT Pub. Date: Mar. 9, 1995
[51] Int. Cl.⁶ ............................... B25J 9/02
[52] U.S. Cl. ............... 74/490.09; 74/89.15; 74/89; 403/170; 403/362; 901/16
[58] Field of Search ............... 74/89.15, 89.22; 108/20, 143; 403/230, 362, 381, 170, 171, 174, 217; 901/16

[56] References Cited

U.S. PATENT DOCUMENTS

| | | | |
|---|---|---|---|
| 3,612,585 | 10/1971 | Mayr | 403/230 |
| 3,894,232 | 7/1975 | Laspesa | 74/89.15 X |
| 4,652,170 | 3/1987 | Lew | 403/381 |
| 5,265,972 | 11/1993 | Bahr | 403/230 X |
| 5,277,512 | 1/1994 | Dwillies | 403/381 |
| 5,340,247 | 8/1994 | Cuneo et al. | 74/86.15 X |

FOREIGN PATENT DOCUMENTS 61-19580 1/1986 Japan.

Primary Examiner—Charles A. Marmor
Assistant Examiner—Troy Grabow
Attorney, Agent, or Firm—Oblon, Spivak, McClelland, Maier & Neustadt, P.C.

[57] ABSTRACT

An actuator structural body is constructed of standardized columnar bodies connected for moving a workpiece. The Actuator structural body includes actuators shaped as columnar bodies and having T-shaped grooves defined in outer side surfaces thereof, columnar member shaped as columnar bodies and having T-shaped grooves defined in outer side surfaces thereof and through holes defined therein, and joint members for joining the columnar members and the actuators bodies 204, 206, 208, 210 by engaging in the T-shaped grooves or fitting in the through holes in the columnar bodies. The columnar members 202 and the actuators bodies may be assembled or reassembled into a desired shape by the joint members.

23 Claims, 76 Drawing Sheets

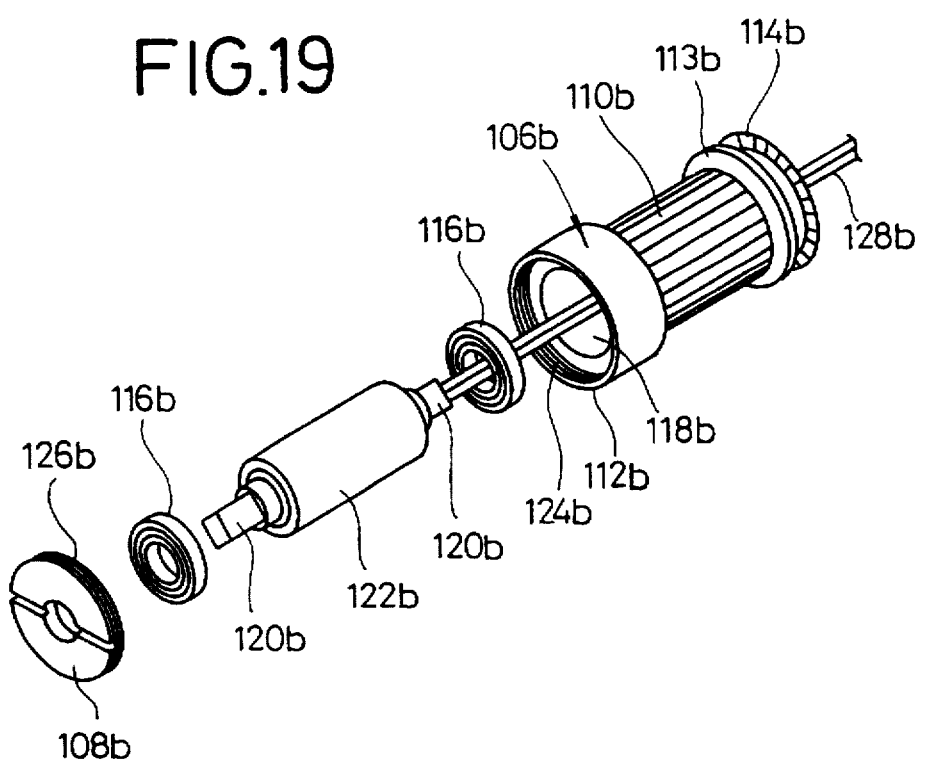

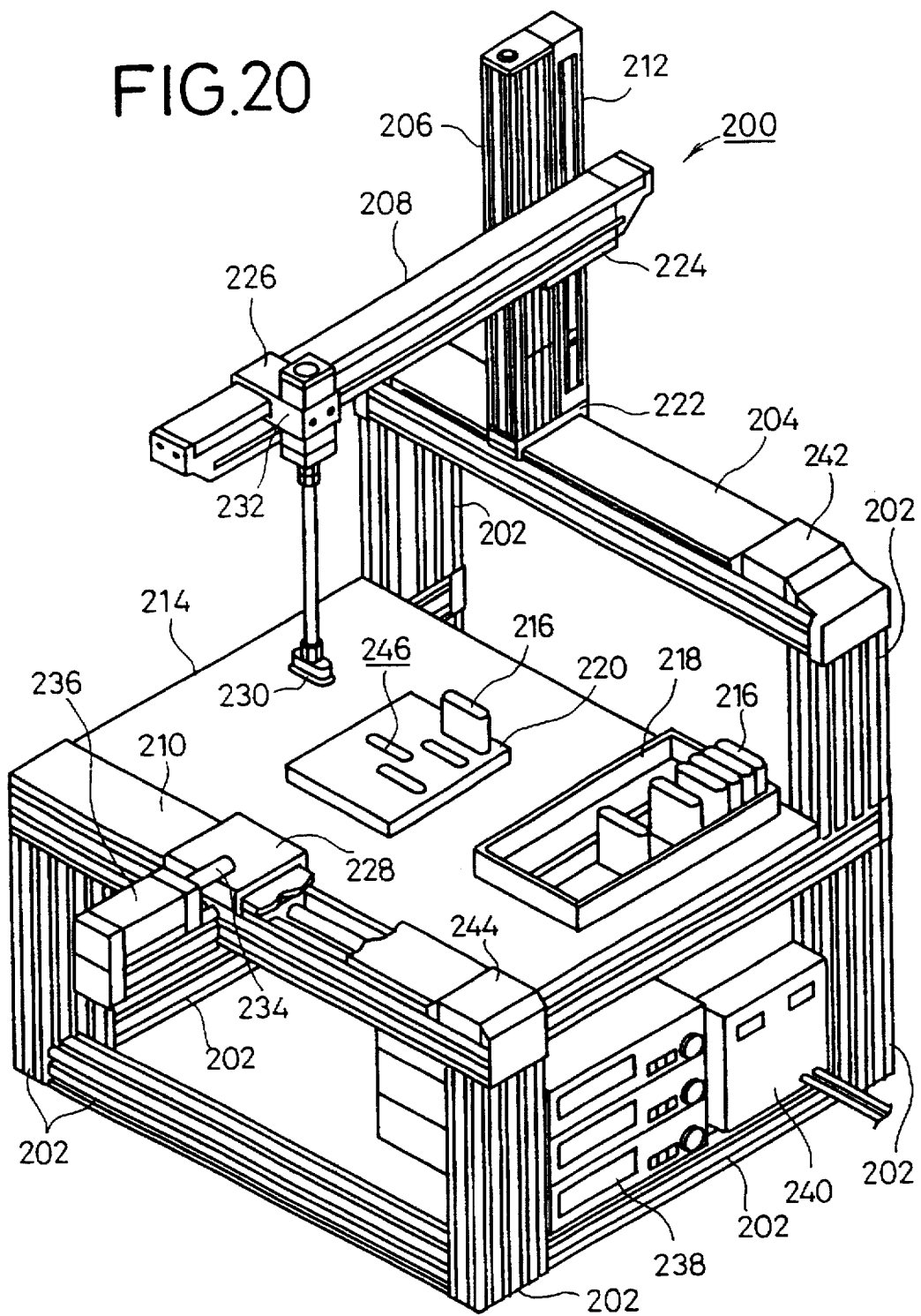

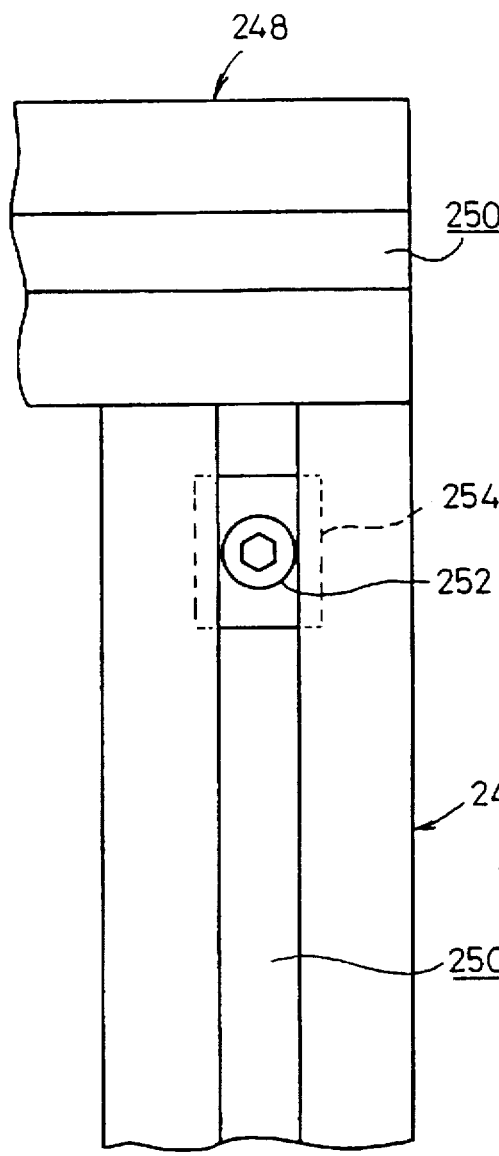
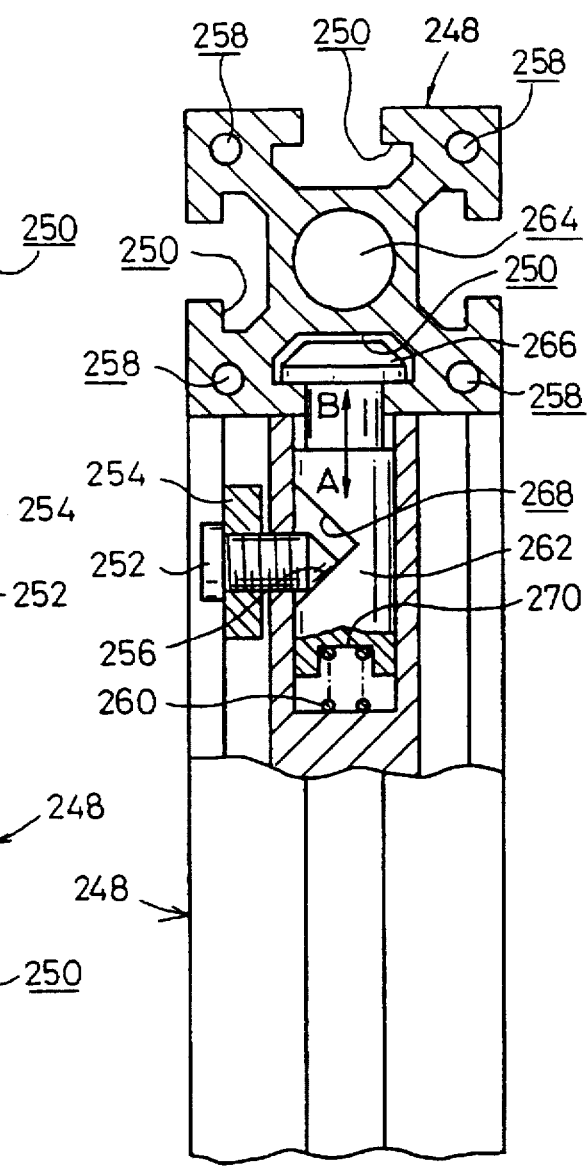

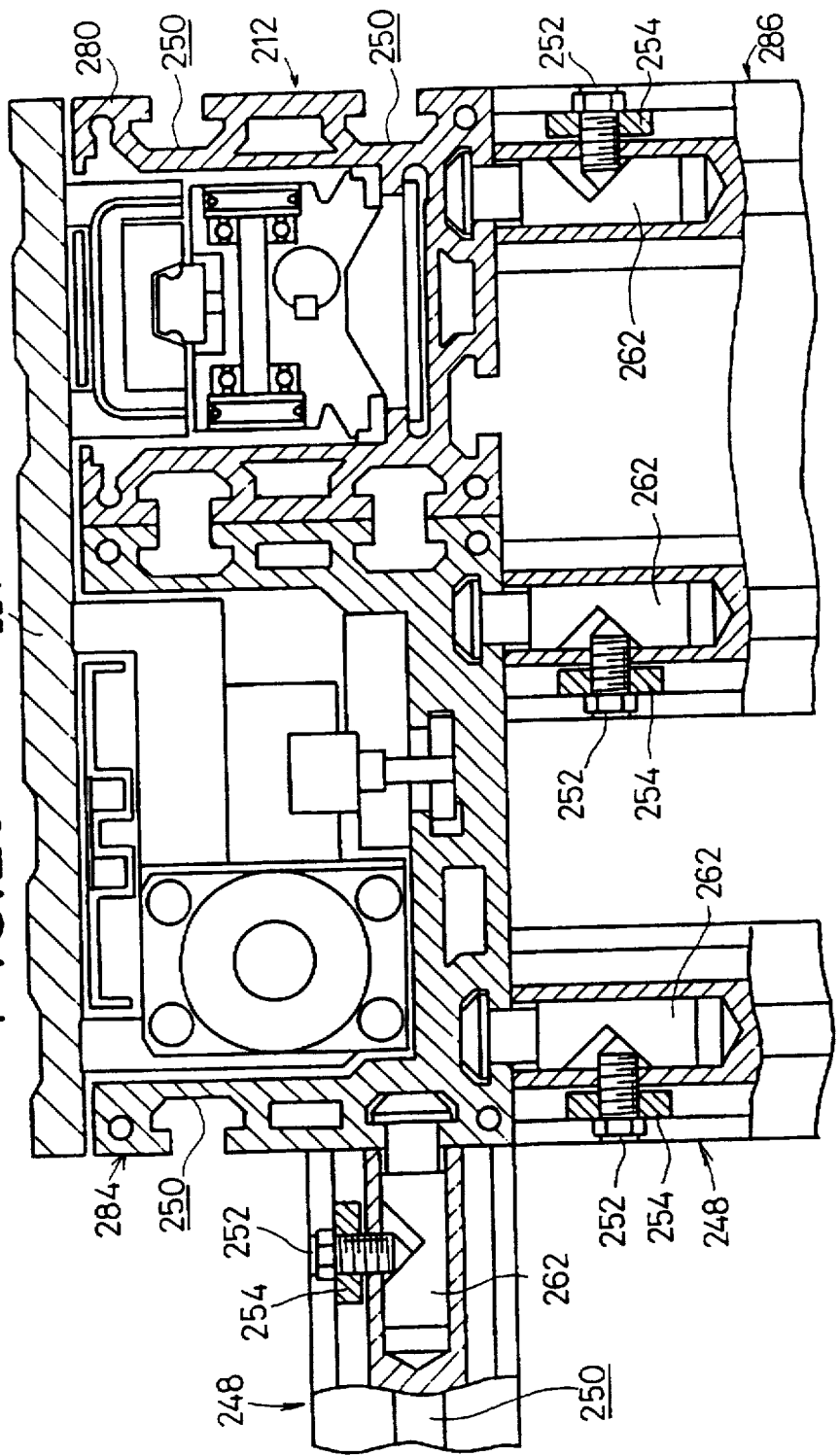

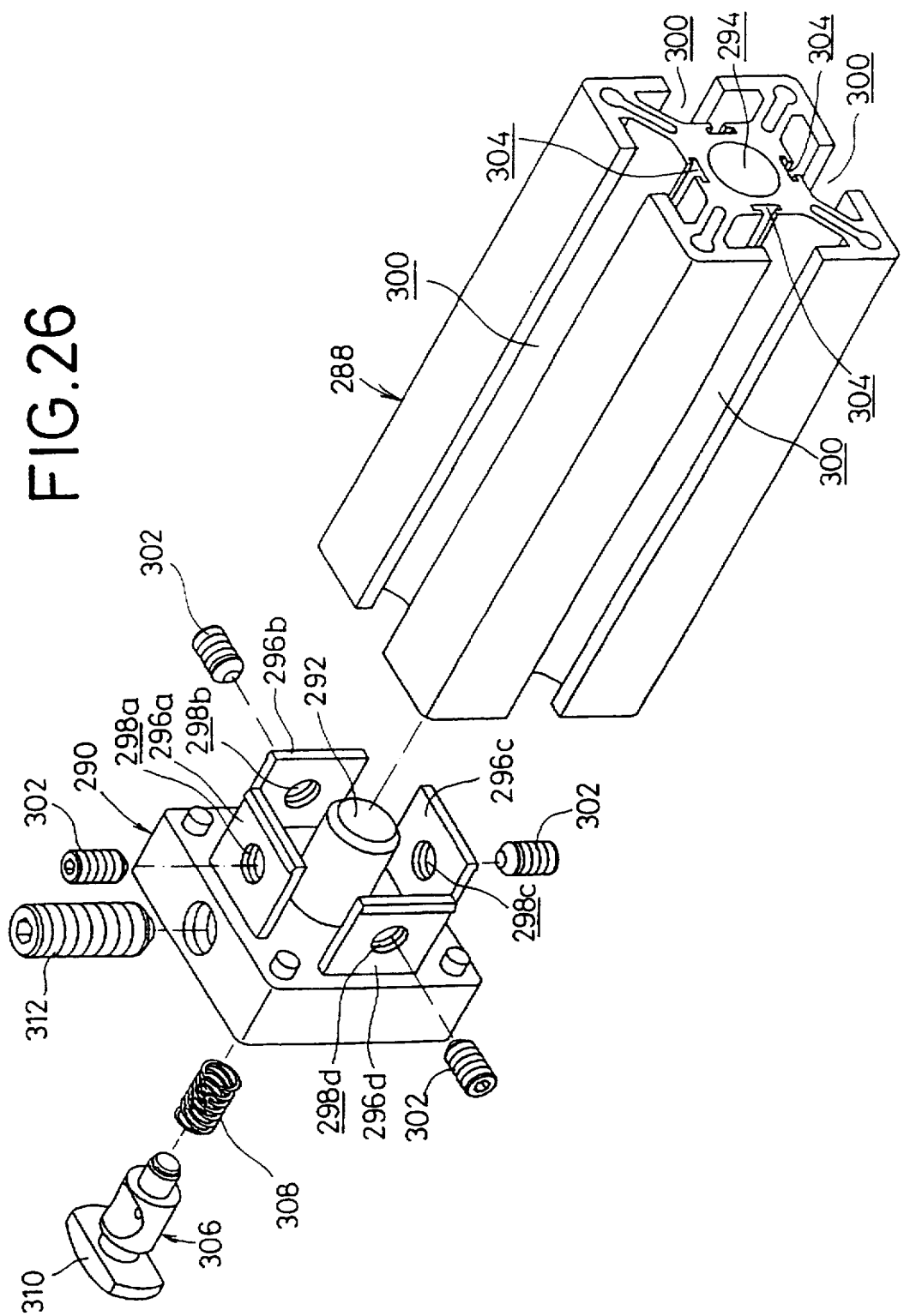

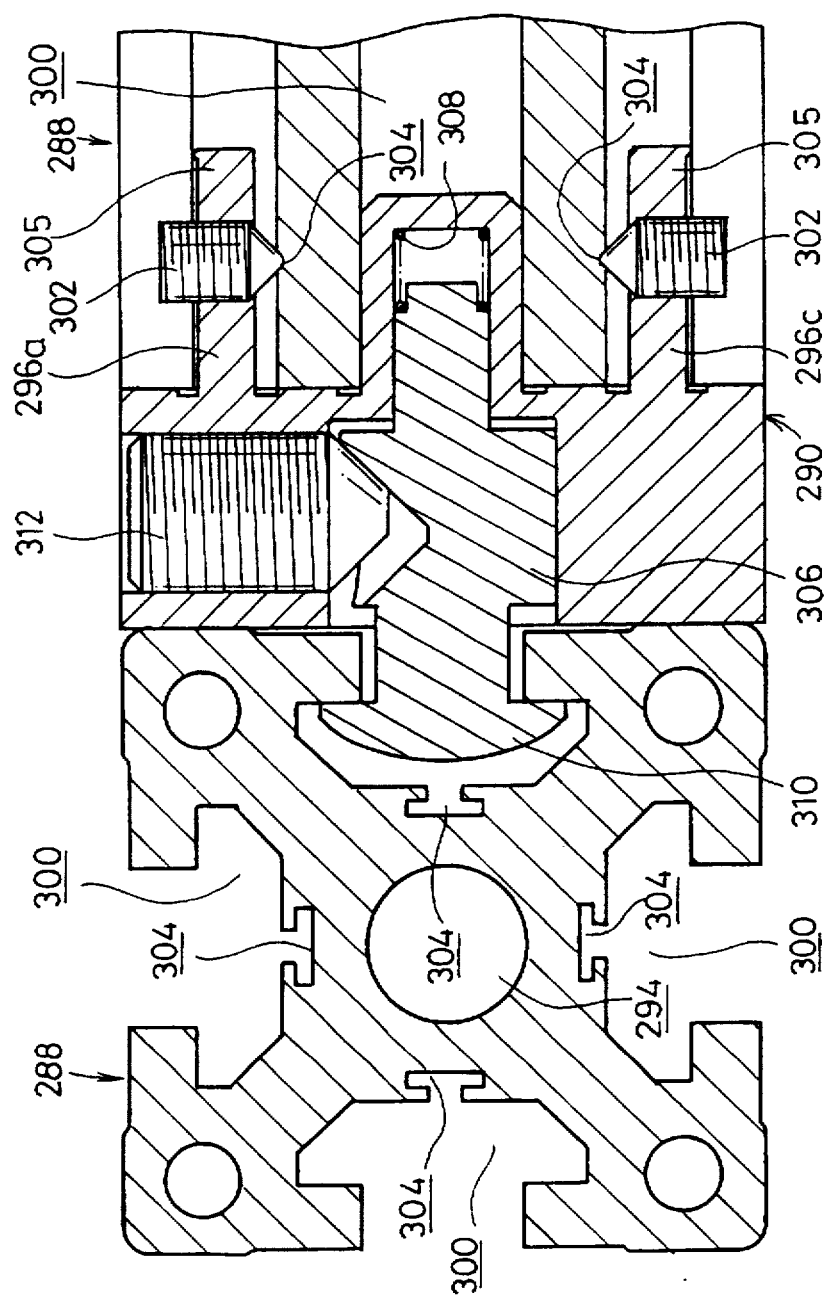

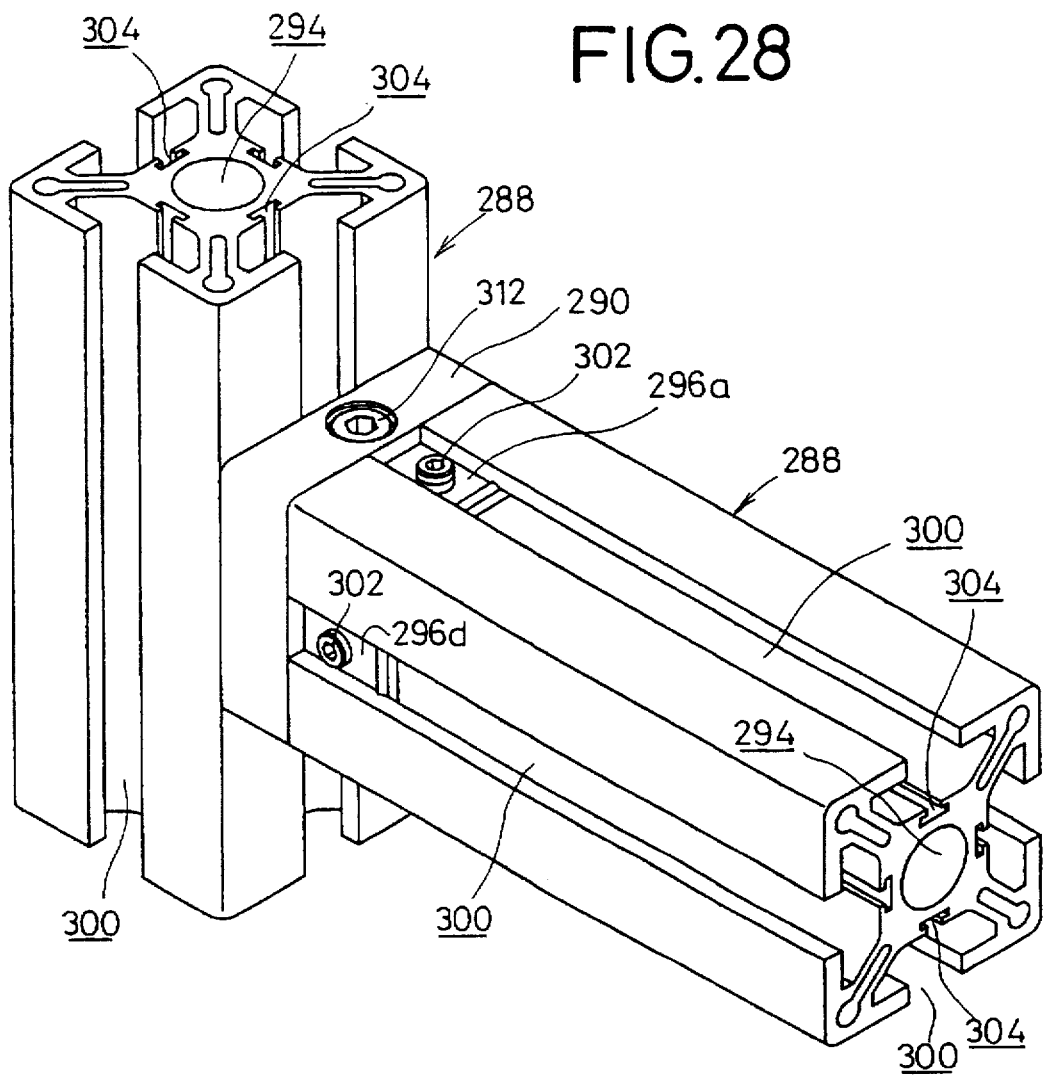

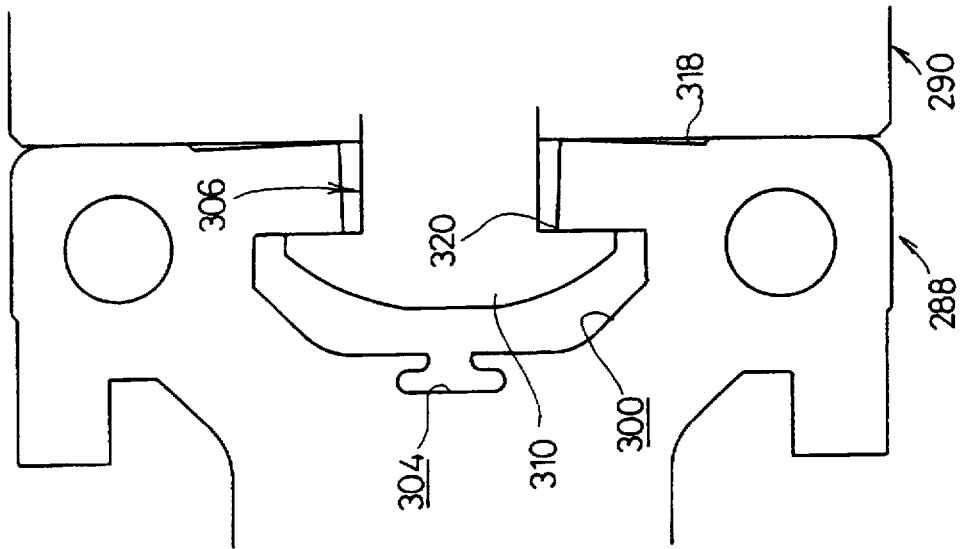
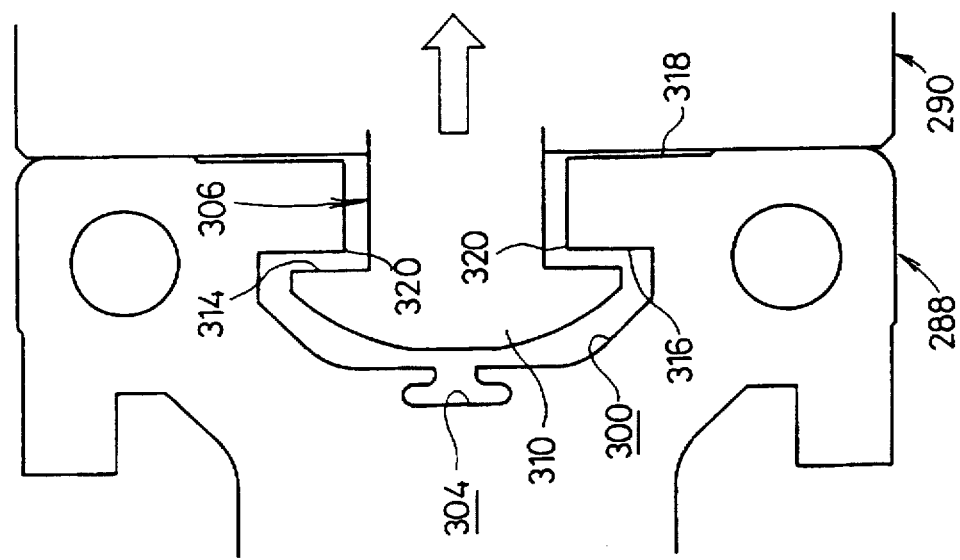

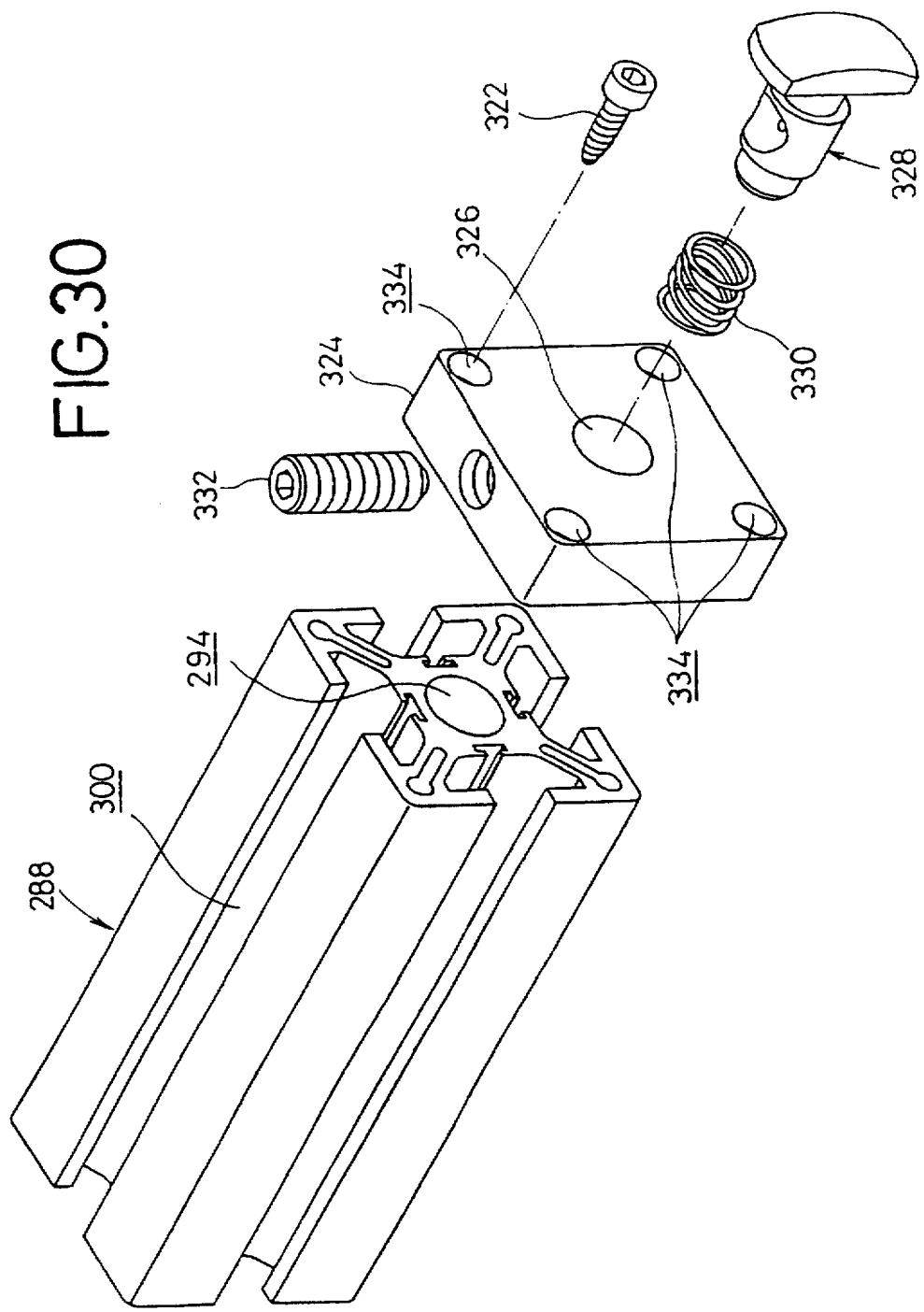

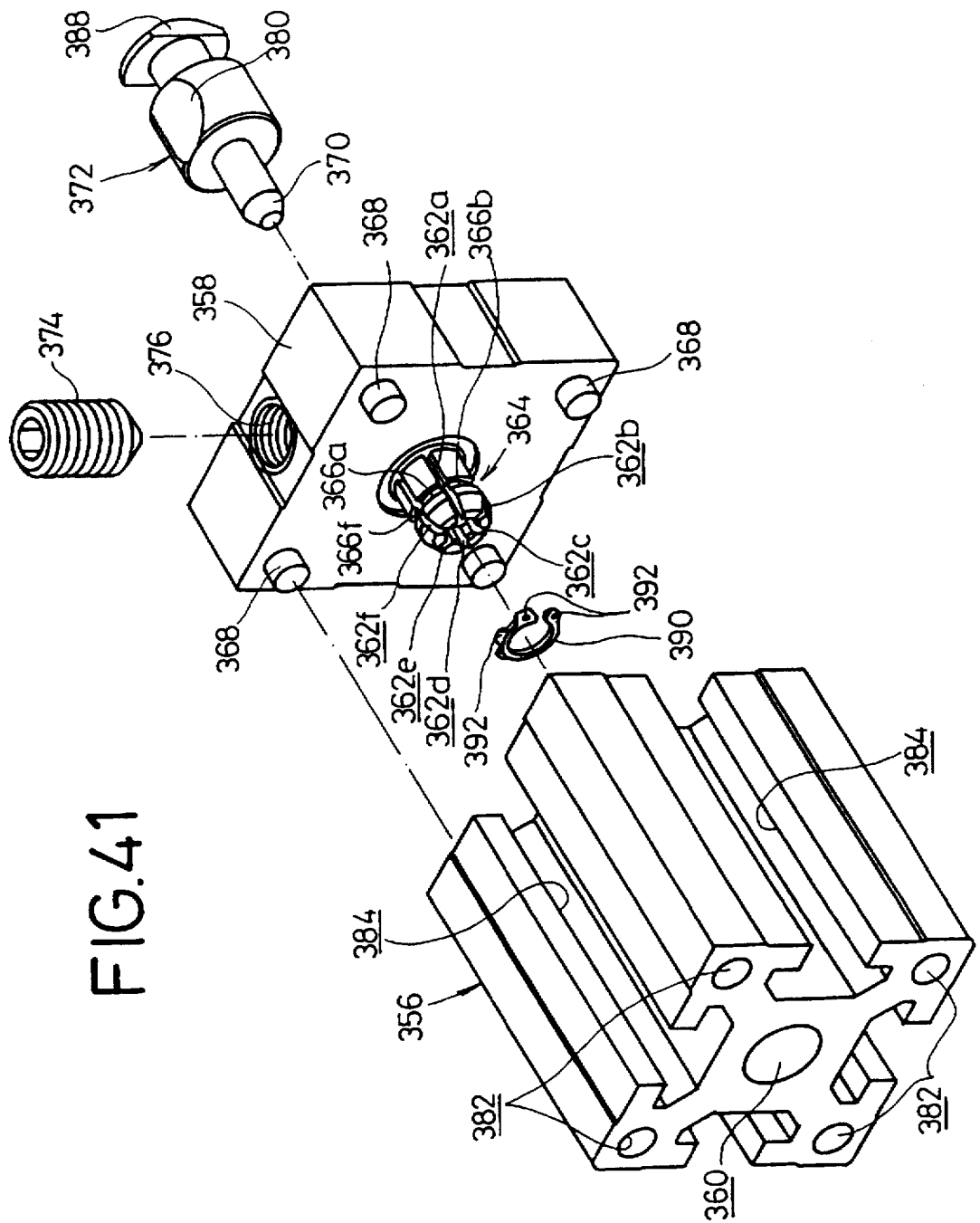

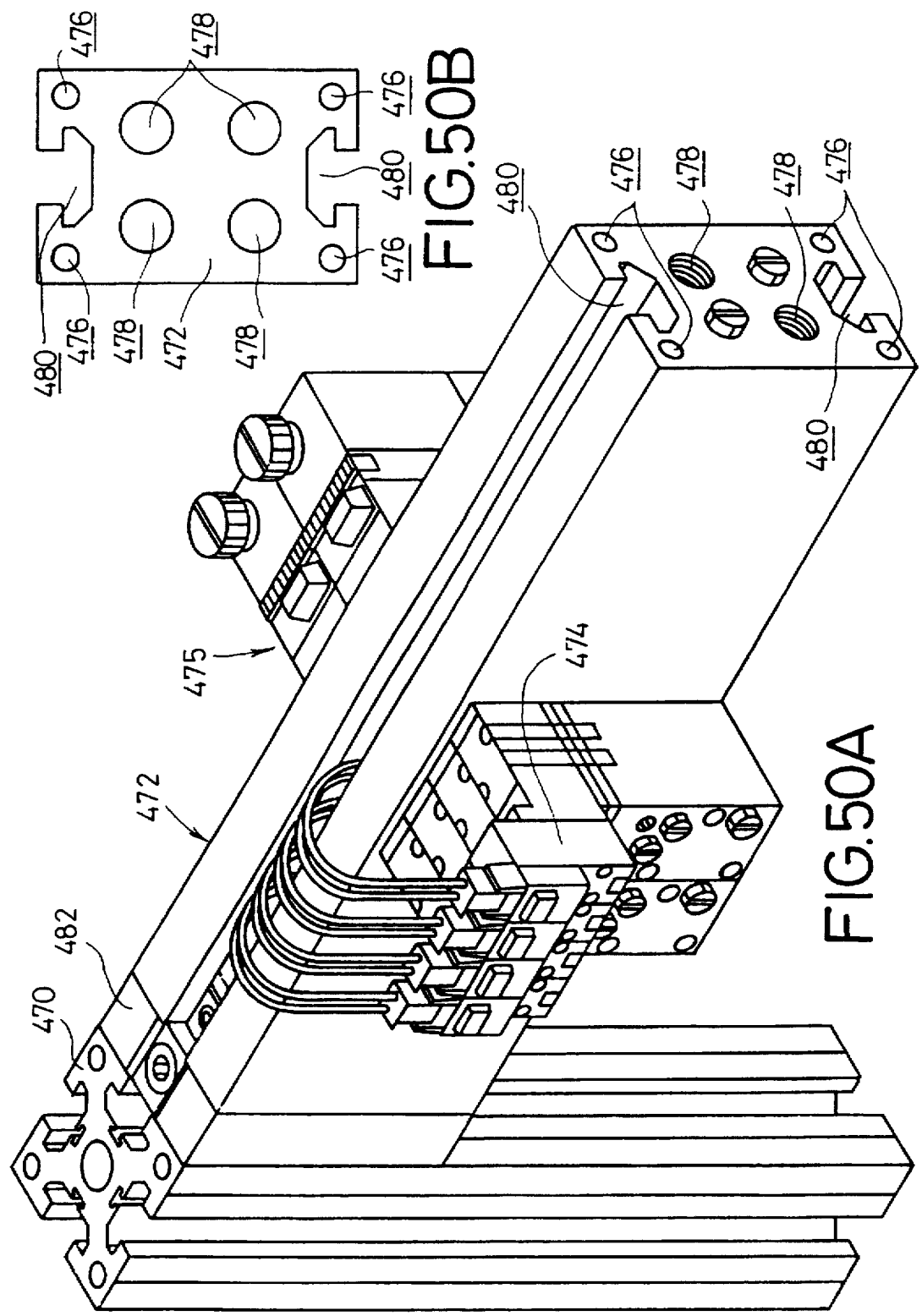

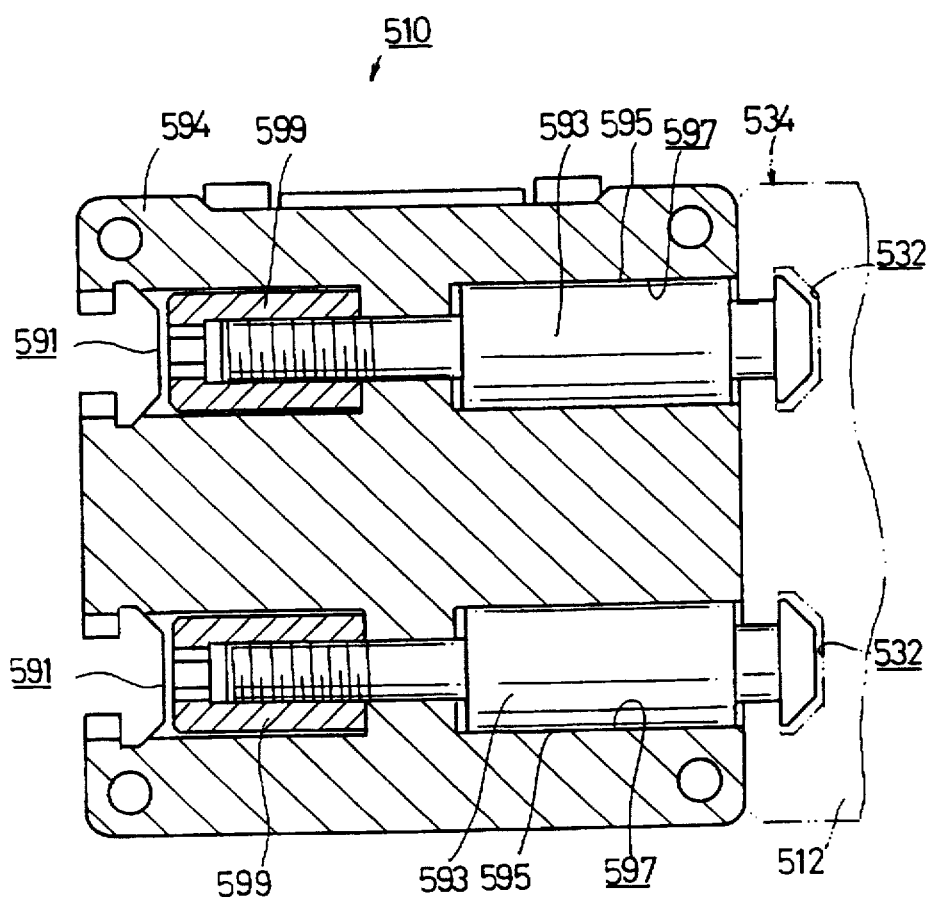

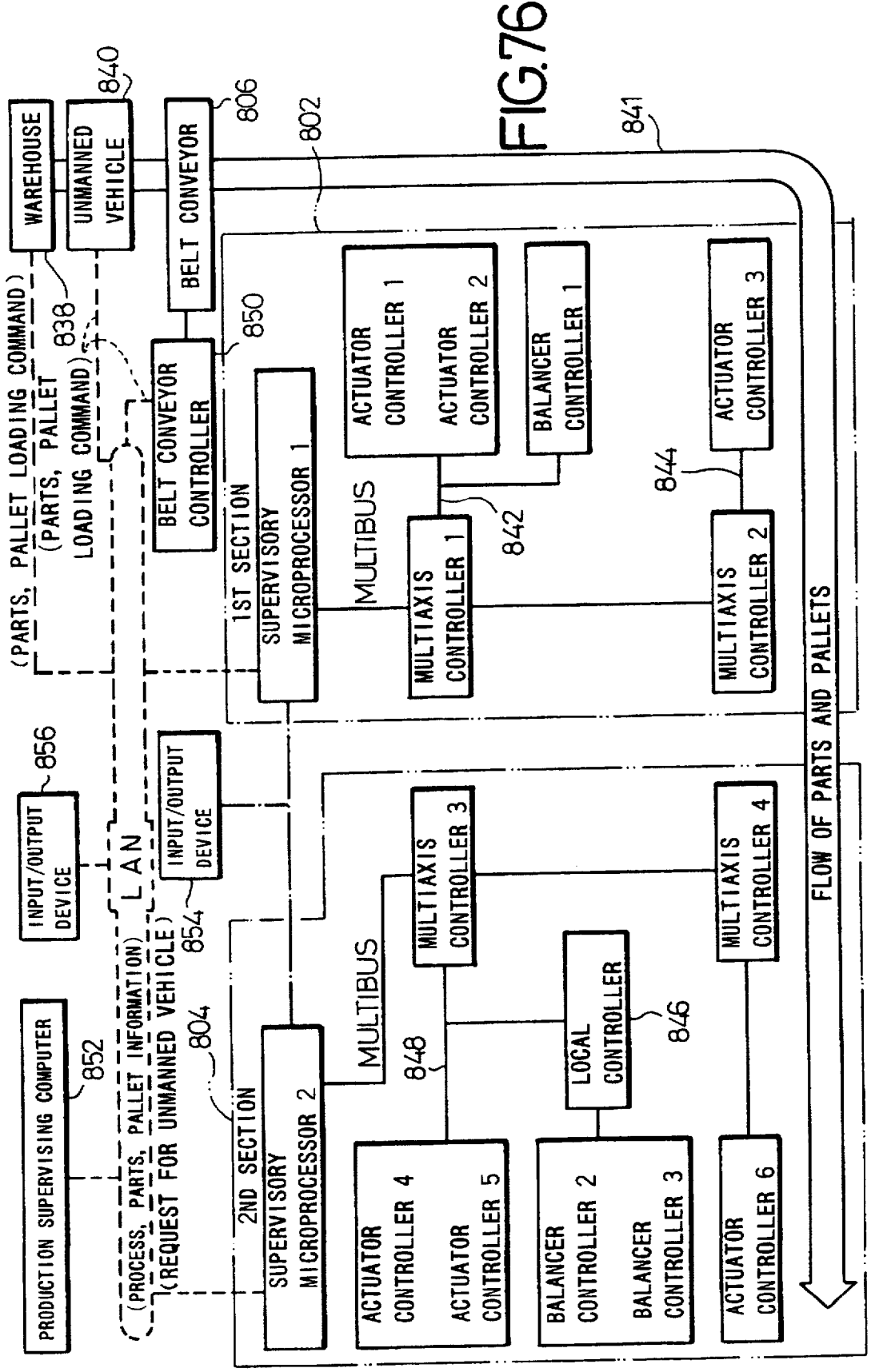

ACTUATOR STRUCTURAL BODY

BACKGROUND OF INVENTION

1. Field of the Invention

The present invention relates to an actuator structural body comprising a combination of actuators actuatable under a fluid pressure or by motors in a line for conveying a workpiece or the like, the actuators or support members which support the actuators being connectable or detachable by joint members.

2. Discussion of the Background

Actuators have heretofore been employed as a device for attracting workpieces with a suction pad or a device for gripping and conveying workpieces with a mechanical hand or a chuck. Such an actuator is mounted on support members at a given position thereon, and moves a movable body comprising a table with a drive source such as a servomotor, a stepping motor, or the like through a drive mechanism such as a ball screw, a timing belt, or the like. As the movable body moves, an attracting and gripping means coupled to the movable body also moves to convey a workpiece attracted by the attracting and gripping means to a desired position.

According to the above conventional art, if an actuator is mounted on support members or the like which are assembled, then the support members have to be disassembled and reconstructed again when the actuator is adjusted positionally or replaced. Such a procedure is tedious and time-consuming.

SUMMARY OF THE INVENTION

An actuator structural body according to the present invention has an actuator and a columnar member which are shaped as columnar bodies and have T-shaped grooves defined in outer side surfaces thereof, and a joint means for joining the columnar bodies by fitting in the T-shaped grooves. When the actuator is to be positionally adjusted after the actuator and the columnar member are assembled, it is only necessary to remove the joint means, move the actuator, and join the actuator and the columnar member to each other with the joint means. The actuator comprises a first induction motor and a second induction motor, its size is smaller than if it were composed of a single motor, and no motor projects from an outer side surface of the columnar member, which can thus be reduced in size.

The joint means may comprise an engaging member having a shank inserted in a through hole defined in the columnar member and a head engaging in the T-shaped groove. A tightening member is threaded, from outside, into a threaded hole communicating with the through hole, and pressed into a recess in the shank to fix the columnar member to the columnar body. The condition in which the columnar member is fixed to the columnar body can easily be varied by turning the tightening member from outside. Alternatively, the tightening member and the shank of the engaging member may have respective bevel gears, and the tightening member may be turned to press the head of the engaging member into the T-shaped groove. The through hole of the columnar member may be used to house wires or as a fluid passage for simplifying a wire or fluid passage arrangement leading to the actuator. A cylinder may be disposed in the actuator, and a pulley body may house a moving pulley mounted on the distal end of a piston rod of the cylinder. A fixed pulley may be disposed on an actuator body at a stroke end of the cylinder, and a wire may be trained around the moving pulley and the fixed pulley so as to extend from the actuator body at the stroke end of the cylinder toward a mobile member. When the cylinder is actuated to displace the piston rod, the movable body is displaced an interval which is twice the interval by which the piston rod is displaced. As a result, the stroke of the piston rod may be reduced, and hence the actuator may be reduced in size.

Furthermore, a fixed pulley may also be disposed on the actuator body remotely from the stroke end of cylinder, and an adjusting pulley may be disposed in the pulley box. Another wire may be trained around the adjusting pulley and the fixed pulley so as to extend from the actuator body remotely from the stroke end of cylinder to the movable member. When the movable member is displaced in either direction, the pulley body is displaced, and hence the wire is prevented from being slackened off the pulleys. The movable member may be integrally formed with a movable member associated with another actuator, so that the actuator may be used as a balancer for the other actuator.

BRIEF DESCRIPTION OF THE DRAWINGS

FIG. 19 is an exploded perspective view of the induction motor in the actuator shown in FIG. 16;

FIG. 20 is a perspective view of a first assembly of the actuator structural body according to the present invention;

FIGS. 21A and 21B are views illustrative of a first embodiment of a joint means for joining an actuator and a columnar member in the actuator structural body according to the present invention;

FIG. 25 is a partly cross-sectional view of a fourth embodiment of the joint means;

FIG. 26 is a perspective view of a fifth embodiment of the joint means;

FIG. 27 is a partly cross-sectional view illustrative of a joined state of the joint means shown in FIG. 26;

FIG. 28 is a perspective view of the joint means shown in FIG. 26;

FIGS. 29A and 29B are views illustrative of a joined state of the joint means shown in FIG. 26;

FIG. 30 is a perspective view of a sixth embodiment of the joint means;

FIG. 41 is a perspective view of an eighth embodiment of the joint means;

FIGS. 50A and 50B are perspective and cross-sectional views showing an eleventh embodiment of the joint means;

FIG. 59 is a partly cross-sectional view showing a joined state of the balancer and an actuator;

FIG. 76 is a block diagram illustrative of operation of the actuator structural body shown in FIG. 74.

DESCRIPTION OF THE PREFERRED EMBODIMENTS

Preferred embodiments of an actuator structural body according to the present invention will be described in detail below with reference to the accompanying drawings.

Figure 1:
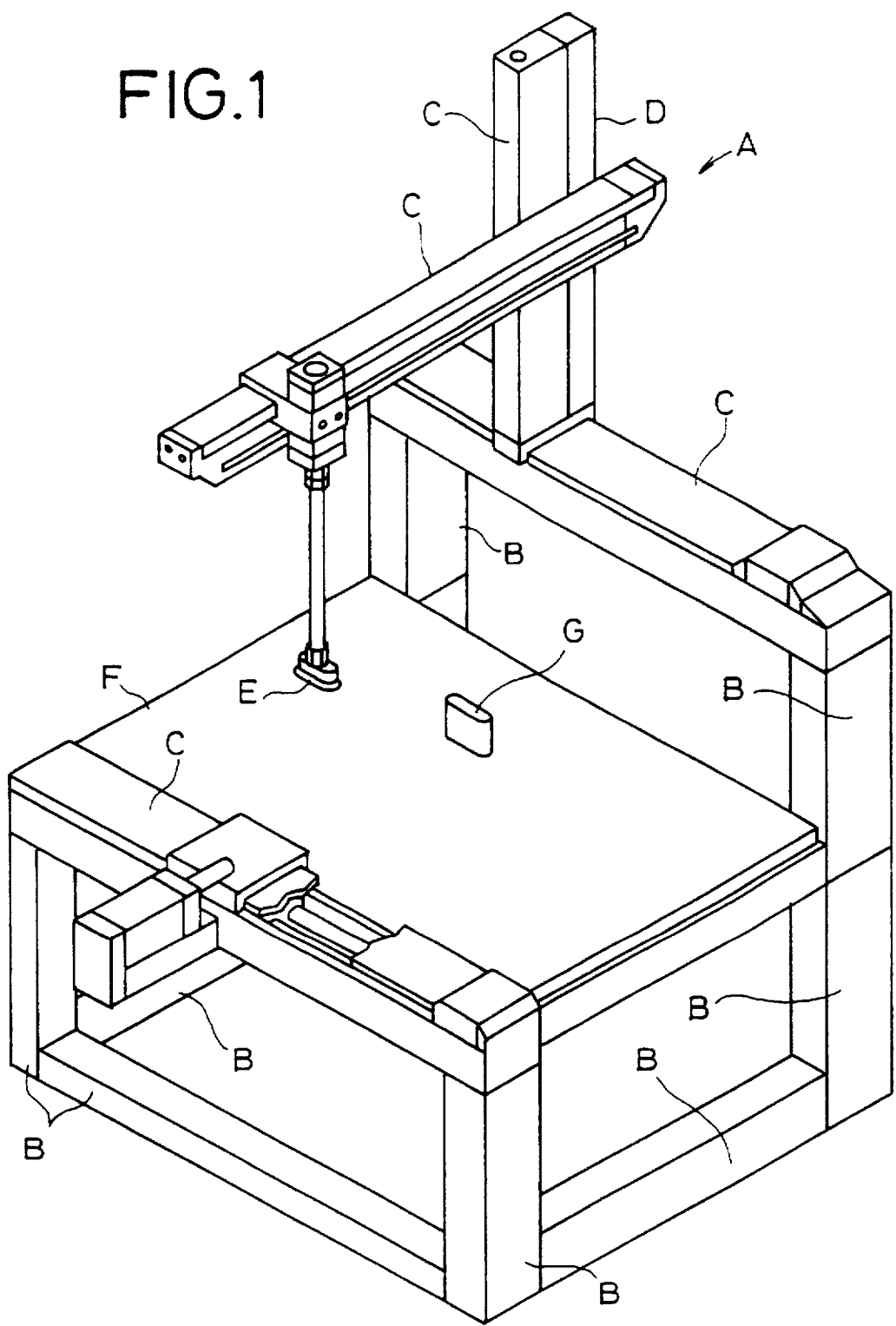
FIG. 1 is a schematic view illustrative of an actuator structural body according to the present invention.

First, an actuator structural body will briefly be described with reference to FIG. 1. An actuator structural body A comprises columnar members B, actuators C, and a balancer D, each having a T-shaped groove defined in an outer side surface thereof, which are connected by joint means (not shown), and a suction pad E is movably disposed in a desired position. The actuators C are operated to cause the suction pad E to move a workpiece G on a working table F to a desired position.

The actuators, the joint means, and the balancer, which are components of the actuator structural body, will first be described, and the actuator structural body will finally be described.

A first embodiment of an actuator will be described below.

Figure 2:
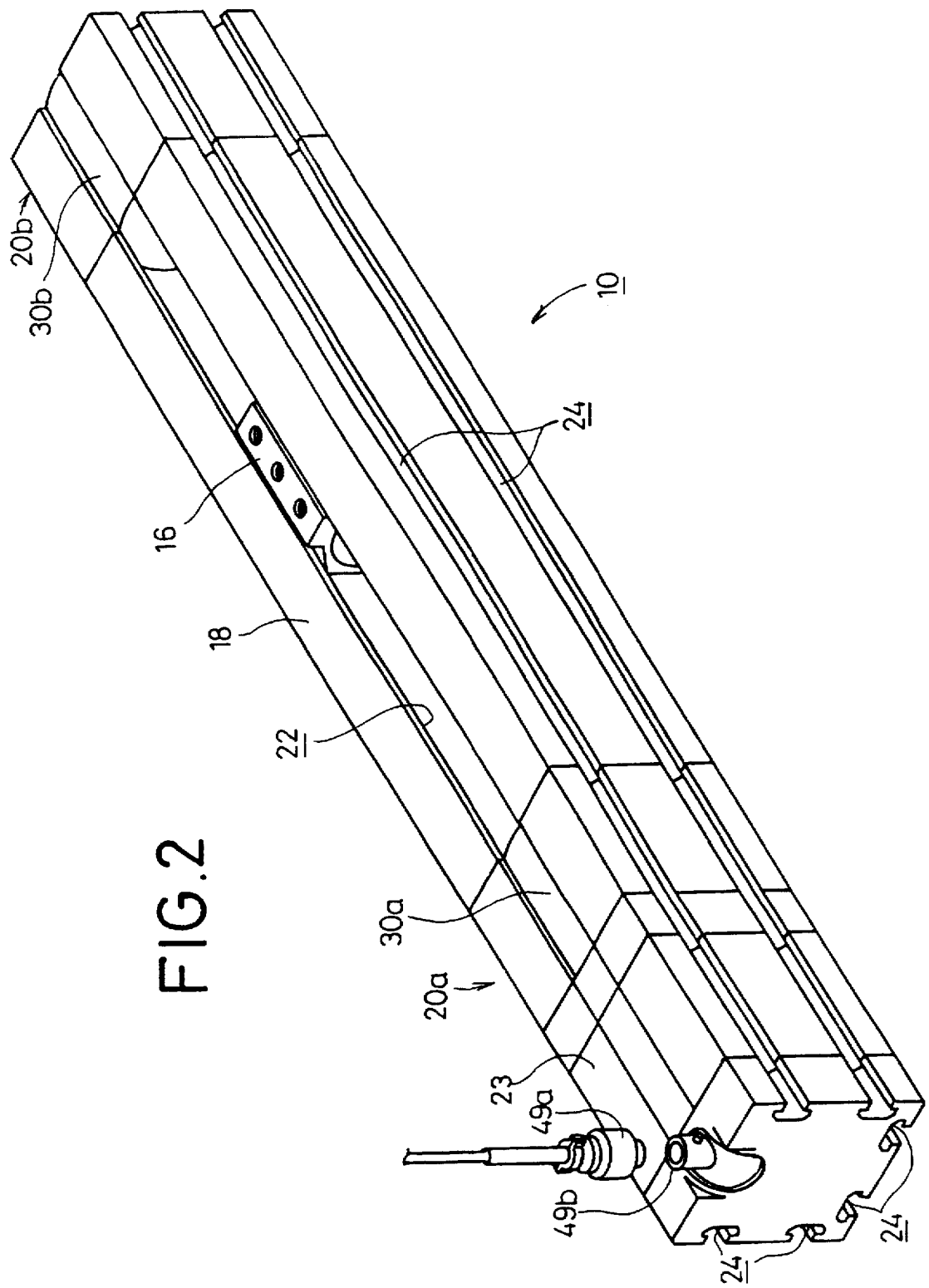
FIG. 2 is a perspective view of a first embodiment of an actuator used in the actuator structural body according to the present invention.
Figure 3:
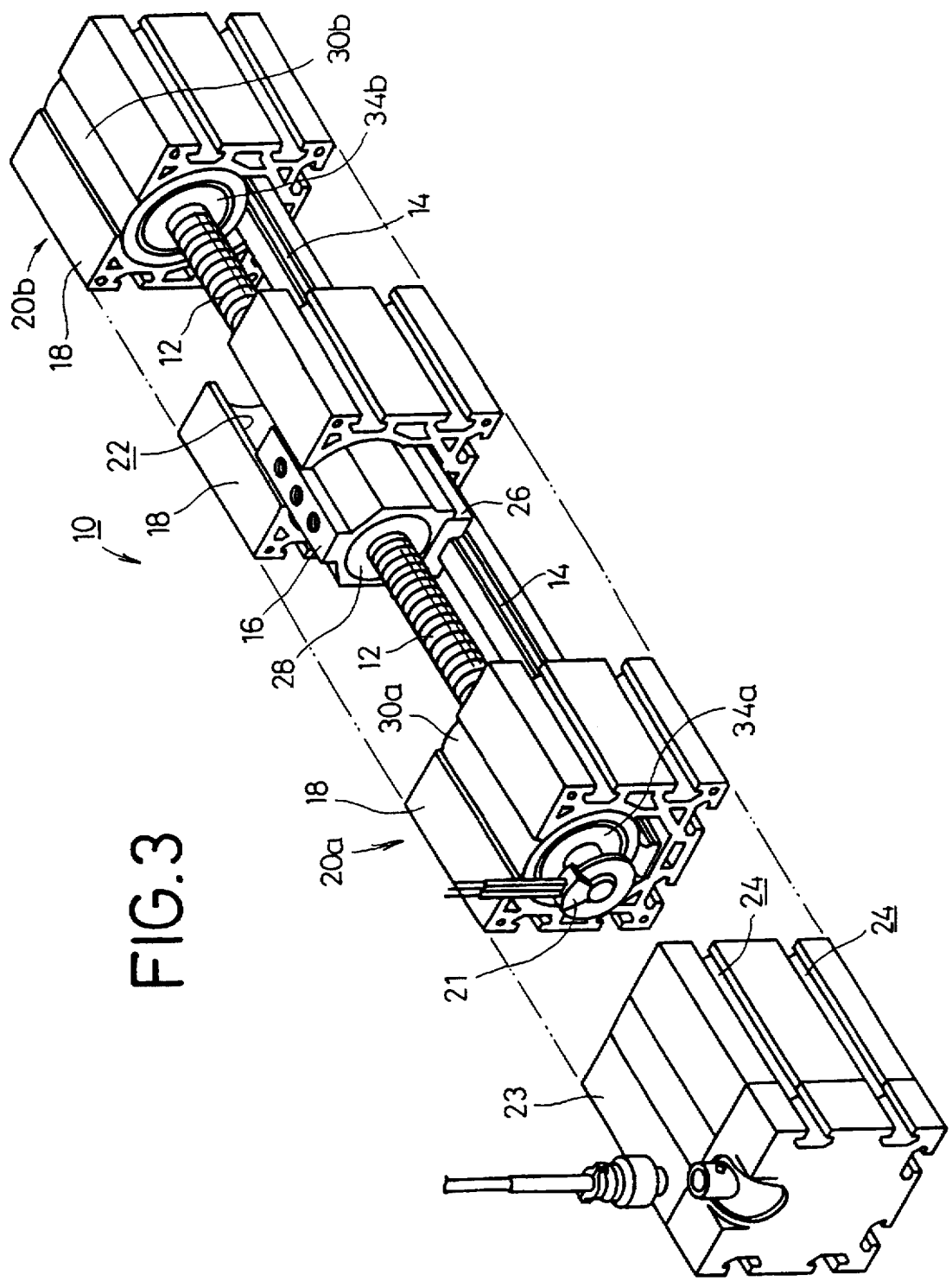
FIG. 3 is a perspective view, partly omitted, of the actuator shown in FIG. 2.
Figure 4:
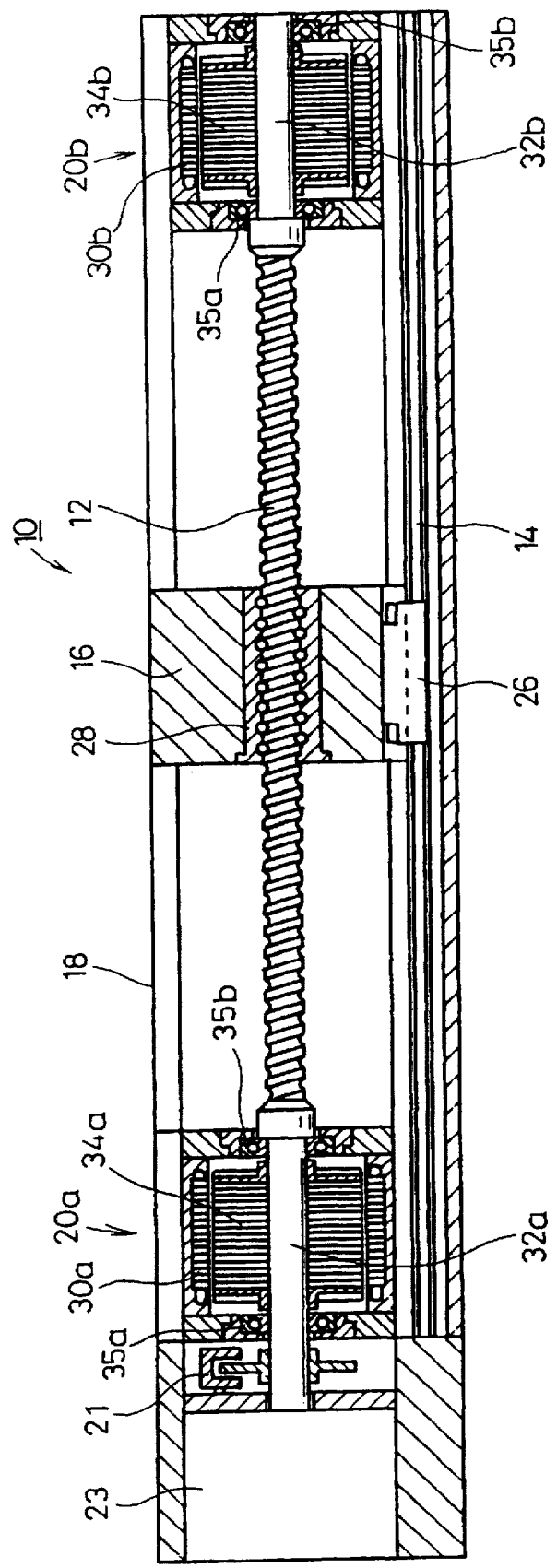
FIG. 4 is a partial longitudinal cross-sectional view of the actuator shown in FIG. 2.
Figure 5:
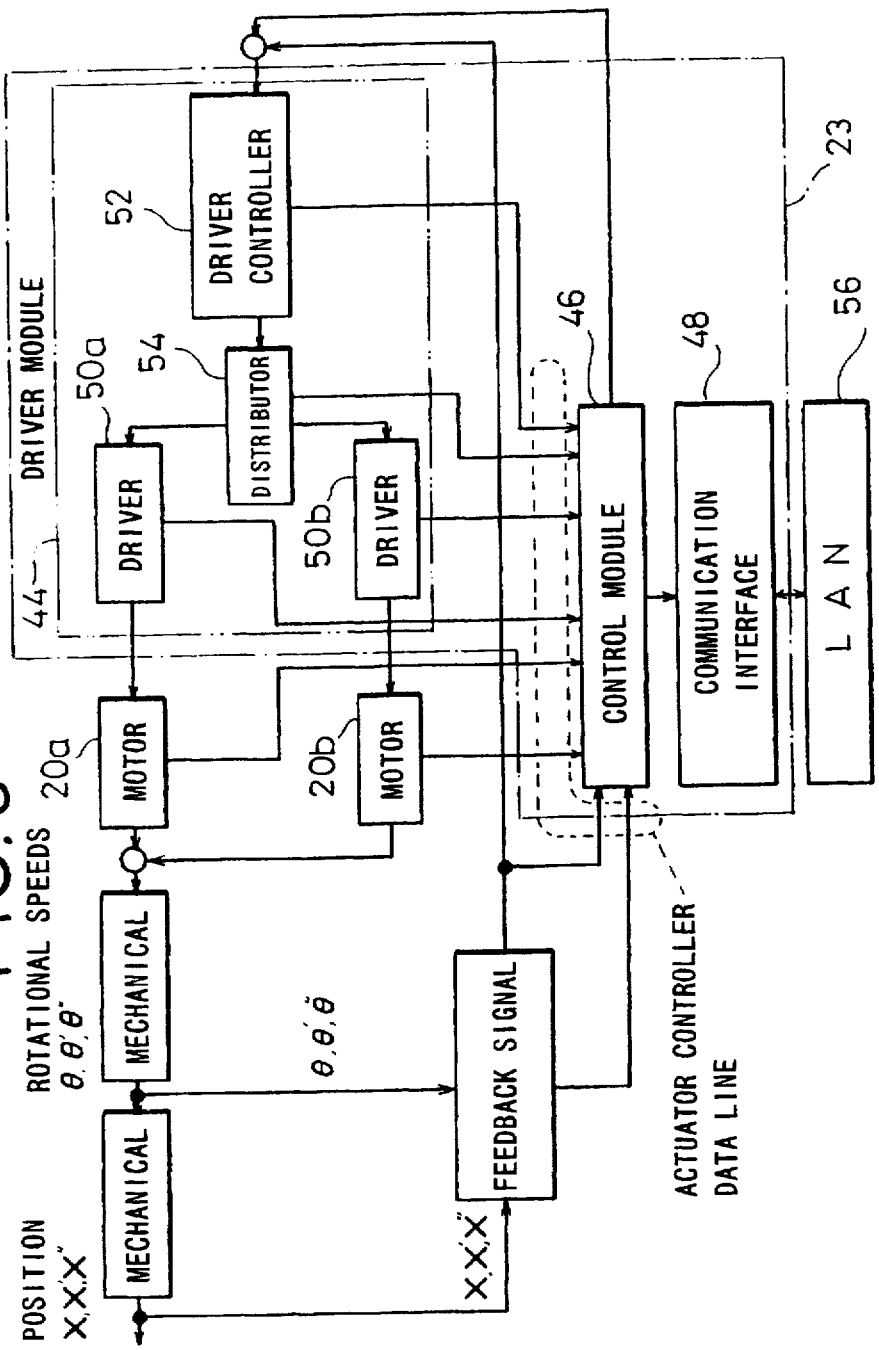
FIG. 5 is a block diagram of a system for controlling the actuator shown in FIG. 2.

FIG. 2 is a perspective view of an actuator according to a first embodiment, FIG. 3 is a perspective view, partly omitted, of the actuator shown in FIG. 2, FIG. 4 is a longitudinal cross-sectional view of the actuator, and FIG. 5 is a block diagram of a system for controlling the actuator.

An actuator 10 according to the first embodiment has a table (movable body) 16 disposed in an elongate frame (structural member) 18 for displacement along a linear guide 14 upon rotation of a ball screw shaft 12, and two induction motors (hereinafter referred to as "motors") 20a, 20b disposed as main and auxiliary motors, respectively, in the frame 18 on respective opposite ends of the ball screw shaft 12 in confronting relationship to each other. The motors 20a, 20b are controlled by an inverter motor controller (hereinafter referred to as a "controller") 23 through an encoder 21 that functions as a displacement detecting means.

More specifically, the actuator 10 has a frame 18, serving as an outer frame, with parallel grooves 24 of substantially T-shaped cross section being defined in side surfaces thereof except for a side surface with an opening 22, a linear guide 14 disposed on the bottom of the frame 18, a bearing 26 slidable along the linear guide 14, the bearing 26 comprising an endless circulating ball bearing, an endless circulating cross roller bearing, a needle bearing, or a biological protein, a table 16 fixed to the bearing 26 for linear displacement upon rotation of a ball screw shaft 12 that is fitted in a ball screw bushing 28, and motors 20a, 20b disposed on respective opposite ends of the ball screw shaft 12 in confronting relationship to each other, the motors 20a, 20b doubling as bearings for the ball screw shaft 12. The table 16 and the ball screw bushing 28 are preferably joined to each other by a swivel joint, an Oldham joint, or the like, for example.

The frame 18 doubles as casings of the motors 20a, 20b, which have respective stators 30a, 30b directly fixed to the frame 18 (see FIG. 4). The ball screw shaft 12 is integrally formed with motor shafts 32a, 32b of the motors 30a, 30b, which have respective cage rotors 34a, 34b mounted respectively on the motor shafts 32a, 32b. The motor shafts 32a, 32b are rotatably supported by bearings 35a, 35b that are positioned at respective opposite ends of the cage rotors 34a, 34b.

Figure 6:
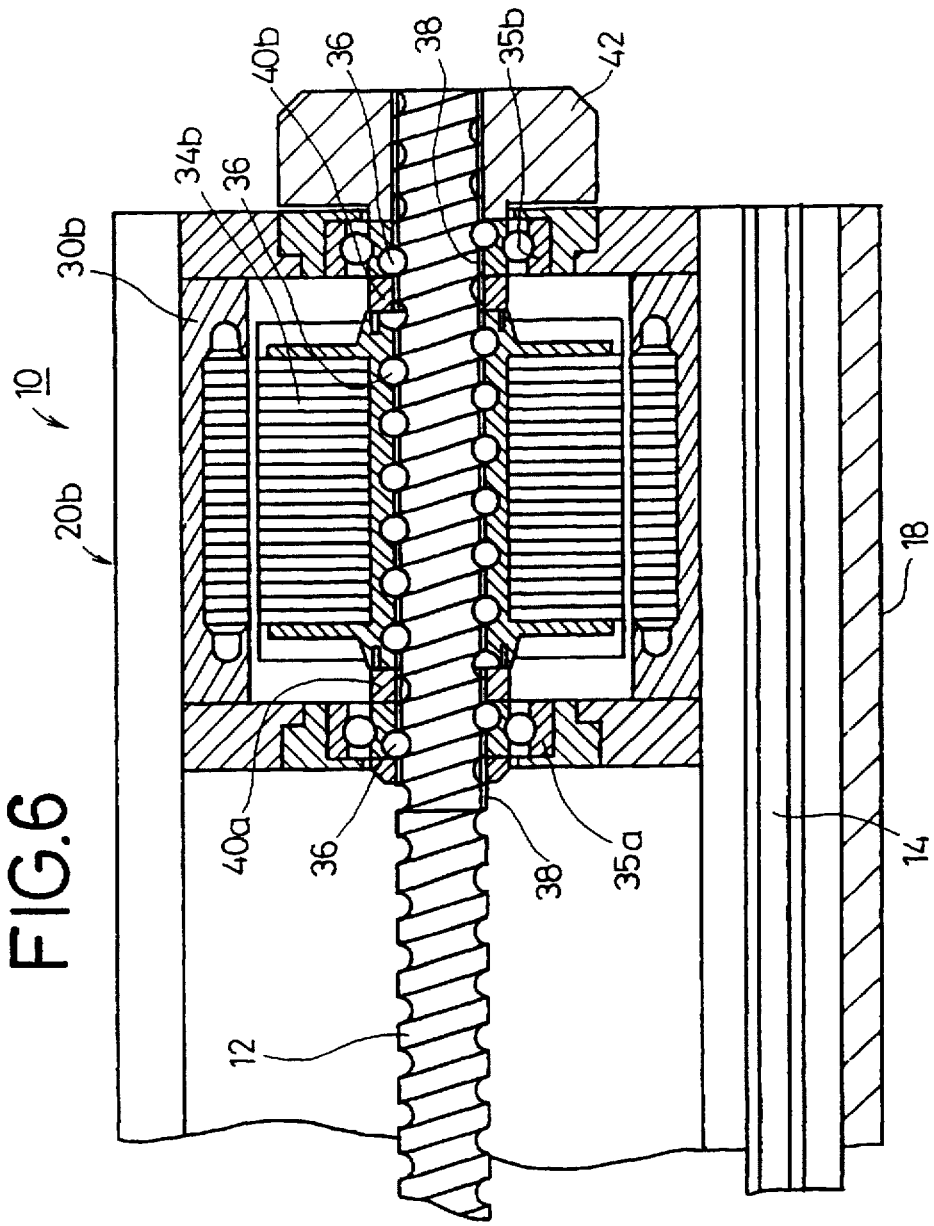
FIG. 6 is a partial longitudinal cross-sectional view of an end of the actuator shown in FIG. 2.

The cage rotors 34a, 34b may be directly coupled to the motor shafts 32a, 32b as shown in FIG. 4. However, since the motor shafts 32a, 32b and the ball screw shaft 12 are concentric with each other with high accuracy, the motor shafts 32a, 32b may have spline grooves which are the same as those of the ball screw shaft 12, and the cage rotors 34a, 34b may be coupled to the spline grooves through a plurality of balls 36 (see FIG. 6). For allowing the balls 36 to engage in the helical spline grooves, the diameter of the balls 36 may be selected in order to increase the accuracy with which the balls 36 and the spline grooves are machined. The motor shaft with the spline grooves has externally threaded outer circumferential portions 38 at the respective opposite ends of the cage rotor 34b in the axial direction thereof, and stoppers 40a, 40b are fitted over the externally threaded outer circumferential portions 38 to secure the cage rotor 34b in position. An end stopper 42 is fitted over an end of the motor shaft with the spline grooves. Alternatively, cage rotors integrally formed by die casting, vacuum die casting, or the like may be coupled to the ball screw shaft 12 by force-fitting, staking, electron beam welding, or the like, or the cage rotors 34a, 34b may be integrally formed directly on the ball screw shaft 12 by die casting, vacuum die casting, or the like.

The angular displacement of the ball screw shaft 12 is detected by the encoder 21 that is mounted on an end of the ball screw shaft 12. The encoder 21 preferably comprises an absolute encoder or an absolute-signal-output integral encoder which comprises an integrating counter memory, and has a sensor signal processor, a serial signal generator, etc. (not shown).

As shown in FIG. 5, the controller 23, which is positioned near the motor 20a, comprises a drive module 44, a control module 46, and a communication interface 48. The communication interface 48 is connected to an external device (not shown) through connectors 49a, 49b (see FIG. 2).

The driver module 44 has drivers 50a, 50b for energizing the motors 20a, 20b, a driver controller 52 for controlling the drivers 50a, 50b, and a distributor 54 which interconnects the drivers 50a, 50b and the driver controller 52. The drivers 50a, 50b effects inverter control on the motors 20a, 20b based on PWM or digital control.

The control module 46 manages an actuator operating program, and transmits position and speed commands to the driver motor 44. The control module 46 also monitors feedback signals from the motors 20a, 20b and the components of the driver module 44.

The communication interface 48 allows mutual communications between the control module 46 and a LAN 56 or an external controller, a PC, a computer, or a communication network represented by an Ethernet, a token ring, a MAP, a PC LAN, a WAN, an OSI, or the like through a serial interface represented by RS232C or RS422 or a parallel interface represented by GP-IB, BCD, a Centronics parallel interface, or the like.

The components of the controller 23 may be of an integral structure for a reduced size. Alternatively, the components of the controller 23 may be separable so that they can be shared by many types of actuators for versatility and low cost. For example, the control module 46 may be implemented by an ASIC, a one-chip multi-CPU, a DSP, or the like for fully digitally performing control functions to achieve both sophisticated functioning and low cost. Software switching may be employed to control various induction motors, AC servomotors, DC servomotors, stepping motors, pneumatic actuators, and air balancers singly and in combination, and also to perform end effector control, power control, position and speed control, multiaxis control such as for X-, Y-, Z-axes, θ, etc., and apparatus control such as for conveyors, lifters, etc. to achieve both sophisticated functioning and low cost. Controlled motors and corresponding interface format may be determined from an impedance, a circuit configuration, or the like, or an identification memory, a bar code, an ID tag, or the like based on the data carrier technology, and automatically controlled by software. This allows a large amount of labor to be saved and results in an intelligent system when a network or a line is constructed. Signals may be transmitted over power supply lines connected to the motors, so that a large number of signal lines can be saved. Active noise control may be relied upon to process noise produced by the actuators.

The encoder 21 and the controller 23 have respective casings that are provided by the frame 18. However, these casings and the frame 18 may be separate from each other depending on the arrangement of the actuator 10. The separate casings and frame 18 may be interfitted by circular or polygonal fitting members or pins, and electric power lines, signal lines, a bus, a LAN, and sensors may be connected by connectors at the same time, and the joined components may be fixed to each other by staking, electron beam welding, or the like. Alternatively, the controller and the motors may be constructed as modules, and may be added or removed as required.

The above structural details of the actuator 10 are realized by the motors 20a, 20b which are simple in structure. The simplified actuator 10 is low in cost and compact in structure.

The linear guide 14 and the ball screw shaft 12 are equivalent to a cam follower or a sliding guide made of a self-lubricating material such as polyimide, Teflon, nylon, polyacetal, or the like, and a timing belt, a wire rope, or a perforated metallic belt made of SUS 301, 304, 430, 63SK, phosphor copper, nickel, or the like.

The actuator 10 may employ a single induction motor, rather than the separate induction motors, for a further structural simplification. It is preferable to improve the holding capability of the actuator at the time it is stopped, with a hydraulic, pneumatic, electromagnetic, piezoelectric, or electric brake system. Braking members of the brake system should preferably be made of a heat-resistant material such as CFRP, ceramics, or the like.

The actuator 10 according to the first embodiment, which is of the basic structure described above, operates as follows:

Drive forces produced by the two motors 20a, 20b, as the main and auxiliary motors, are transmitted through the ball screw shaft 12 to the ball screw bushing 28, which converts the rotary motion of the ball screw shaft 12 into linear motion for thereby displacing the table 16.

For normally actuating the table 16, the main and auxiliary motors 20a, 20b produce drive forces in the same direction. Therefore, the actuator 10 produces an output power which is equal to the sum of the drive forces produced by the motors 20a, 20b.

When the table 16 is decelerated while it is being displaced, one or both of the main and auxiliary motors 20a, 20b operate as an induction brake. If a greater deceleration is required, it is necessary to cause both the motors 20a, 20b to positively generate a decelerating torque. When the table 16 is stopped, the motors 20a, 20b can be controlled to generate opposite torques for thereby holding the table 16 stopped under the differential force to position the table 16 highly accurately.

If a rotary actuator incorporates an induction motor, then it is possible to construct an integral articulation, and the rotary actuator can be greatly reduced in size and weight. For a rotary actuator having a plurality of articulations or a multiaxis actuator having X-, Y-, Z-axes, the weight of a drivable component largely affects the speed and acceleration of the actuator. If a relatively light induction motor is employed, it is possible to increase the accuracy of the above positioning, speed, acceleration, etc.

An actuator according to a second embodiment in which a timing belt 90 is used as a power transmitting means and a timing belt pulley and an induction motor are integral with each other will be described with reference to FIGS. 7 through 12. Those components of the embodiment described below which are identical to those of the first embodiment are denoted by identical reference numerals, and will not be described in detail.

Figure 7:
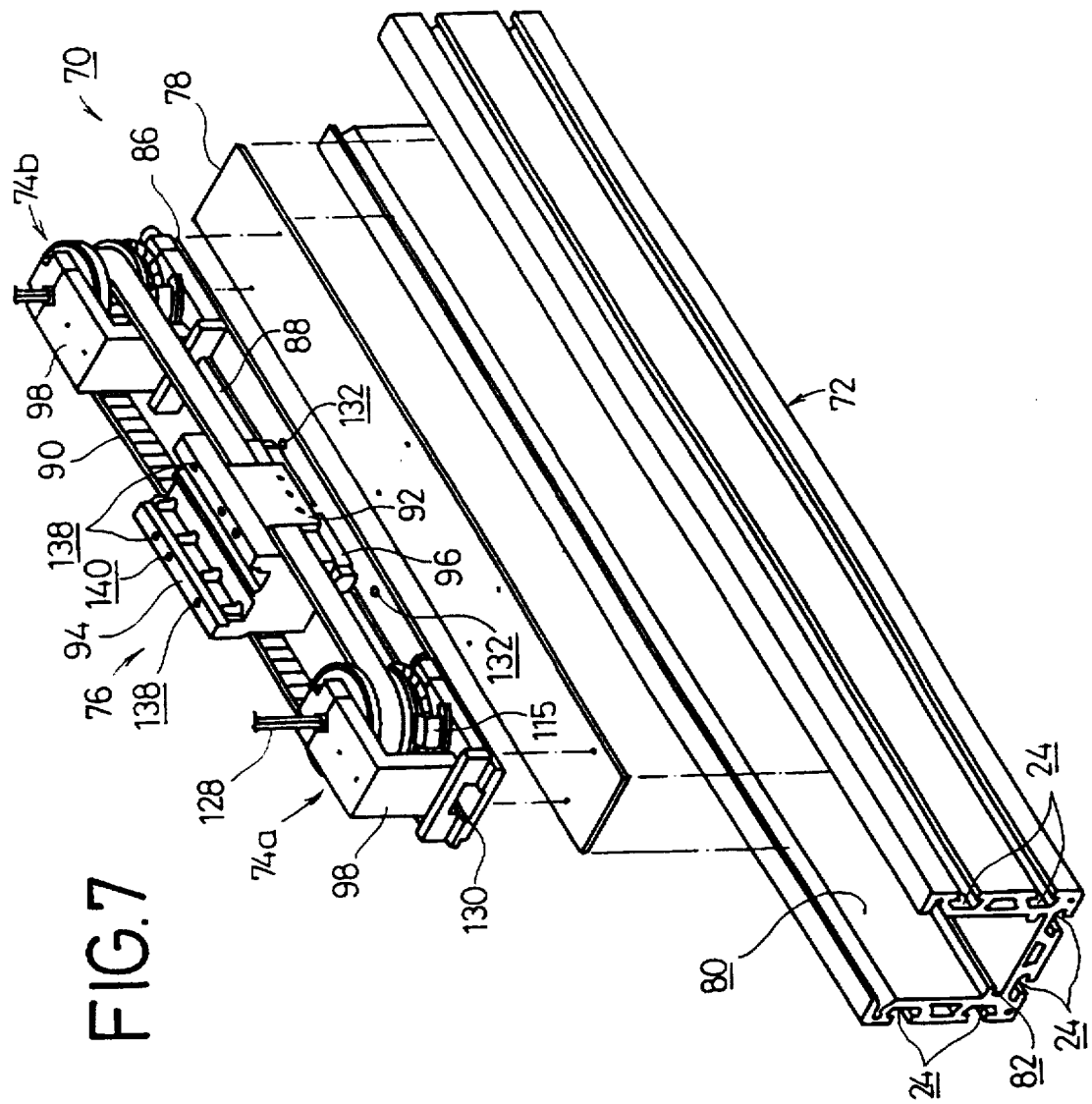
FIG. 7 is an exploded perspective view of a second embodiment of an actuator used in the actuator structural body according to the present invention.

As shown in FIG. 7, an actuator 70 comprises a frame 72 serving as a structural member, a drive mechanism 76 having pulley-combined induction motors (hereinafter referred to as "motors") 74a, 74b as main and auxiliary motors, and a joint plate 78 by which the drive mechanism 76 is joined in the frame 72. A controller 23 for controlling the drive mechanism 76 is disposed closely to the motor 74a.

The frame 72 is formed of a light metal such as an alloy of Al, Mg, or the like or a bearing steel by extrusion or drawing, or of a metal, a ceramic material, or the like by injection molding, vacuum casing, or a lost-wax process. If necessary, a cladding layer may be formed on an inner wall surface of the frame 72 by explosion, thereby to achieve a desired surface hardness on the frame 72. The frame 72 has grooves 24 of substantially T-shaped cross section being defined in three outer surfaces thereof for joining other frames, panels, or the like or housing leads or the like therein. The frame 72 has an opening 80 which houses therein the drive mechanism 76, the controller 23, and the joint plate 78. The frame 72 also has slots 82 defined in the bottom thereof for joining and fixing the drive mechanism 76, one of the slots 82 having a clearance 84 for allowing the joint plate 78 to be inserted easily from the opening 80 in the frame 72 (see FIG. 12).

The drive mechanism 76 has a base plate 86 which supports the motors 74a, 74b mounted thereon at its opposite ends in confronting relationship to each other with a guide rail 88 extending between the motors 74a, 74b, a timing belt 90 trained around the motors 74a, 74b that are spaced a given distance from each other, a belt holder 92 for holding the timing belt 90, a table 94 that is linearly displaceable in response to angular movement of the timing belt 90 which is held by the belt holder 92, and a guide block 96 interposed between the guide rail 88 and the table 94. The base plate 86, the motors 74a, 74b, and the guide rail 88 are connected to each other by screws (not shown), but may be interconnected by T bolts or the like received in a T slot or the like defined in the base plate 86. The motors 74a, 74b disposed on the opposite ends of the base plate 86 in confronting relationship to each other will be described below. Since the motors 74a, 74b are substantially identical in structure to each other, only the motor 74a will be described in detail, and the other motor 74b will not be described in detail.

Figure 8:
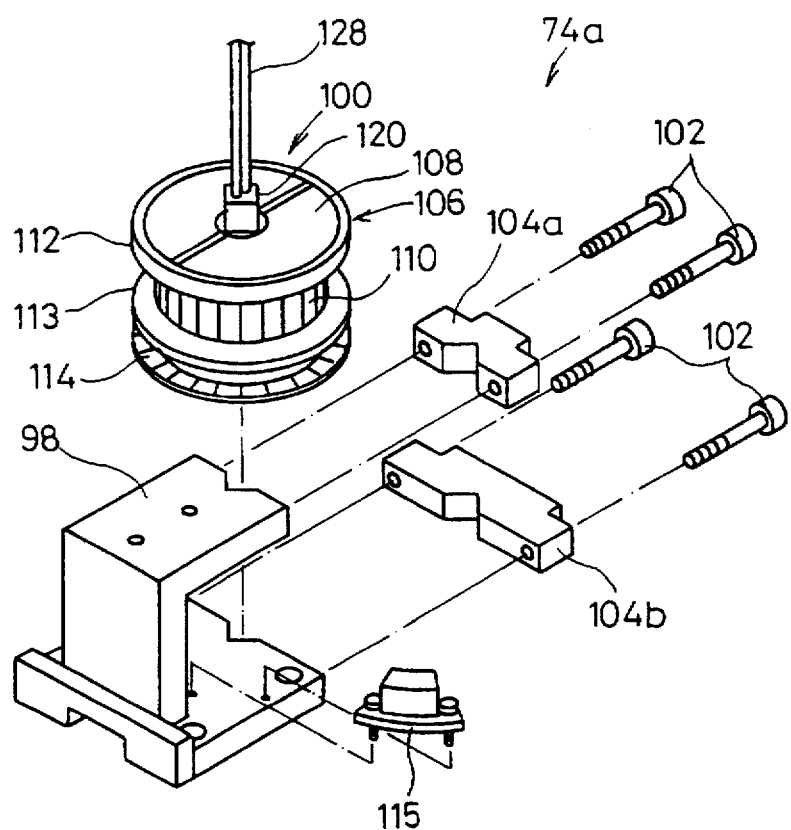
FIG. 8 is an exploded perspective view of a pulley-combined induction motor in the actuator shown in FIG. 7.
Figure 9:
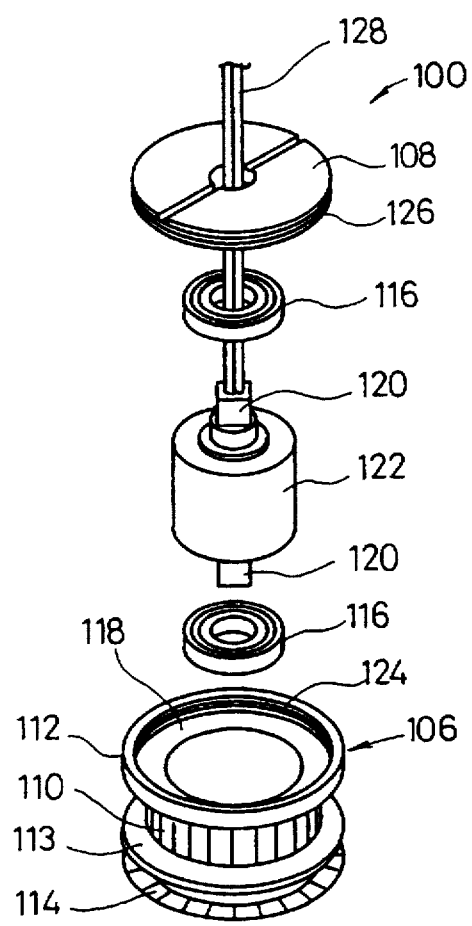
FIG. 9 is an exploded perspective view of the pulley-combined induction motor in the actuator shown in FIG. 7.
Figure 10:
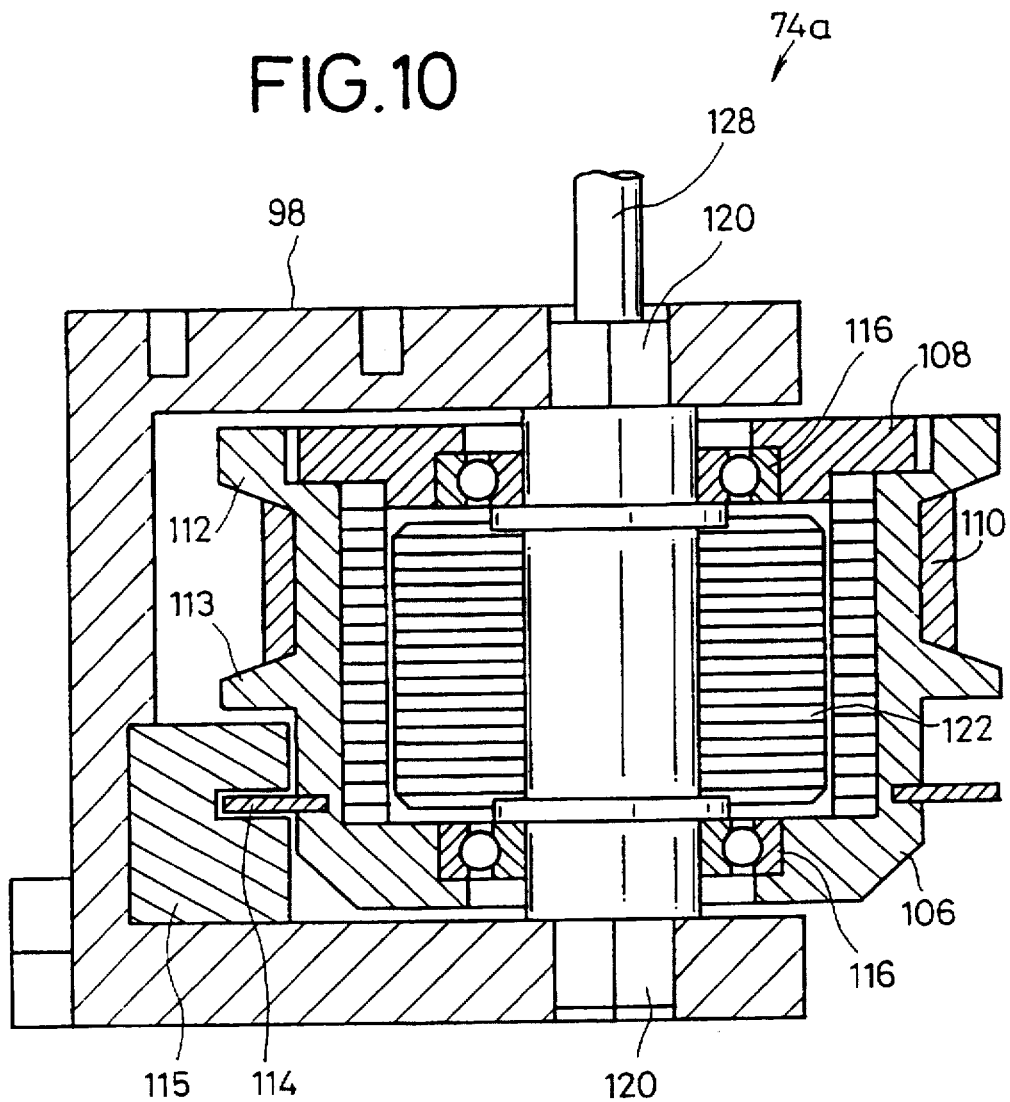
FIG. 10 is an exploded perspective view of the pulley-combined induction motor in the actuator shown in FIG. 7.

As shown in FIGS. 8 through 10, the motor 74a basically comprises an outer frame 98 of substantially channel-shaped cross section, a rotor assembly 100 rotatably mounted in the outer frame 98, and fixing members 104a, 104b for fixing the rotor 100 to the outer frame 98 through screws 102.

The rotor assembly 100 comprises a substantially cylindrical first housing 106 having an opening, and a disk-shaped second housing 108 connected to the first housing 106 over the opening thereof. The first housing 106 has, on its outer circumferential surface, teeth 110 for driving the timing belt 90, flanges 112, 113 for preventing the timing belt 90 from being dislodged, and an encoder rotor 114 for enabling an encoder sensor 115 to detect an angular displacement of the rotor assembly 100 with light, magnetism, a CCD-PICKUP, laser, or the like. The first housing 106 has a bearing-fixing hole (not shown) defined in an inner bottom surface thereof, and the outer circumference of a bearing 116 is fixedly disposed in the bearing-fixing hole. A rotor 118 is disposed on an inner circumferential surface of the first housing 106 and fixed in surrounding relationship to a stator 122 that is supported on a fixed shaft 120. The second housing 108 has an externally threaded outer circumferential surface 126 which is threadedly fitted in an internally threaded surface 124 in the opening of the first housing 106, so that the first and second housings 106, 108 are fastened to each other.

Leads of the stator 122 extend through the fixed shaft 120 out of an end of the fixed shaft 120. The fixed shaft 120 has flanges on its respective opposite portions, and a pair of bearings 116 such as cross roller bearings, angular bearings, Ex-Cell-O bearings, conical roller bearings, or the like is positioned on the flanges in confronting relationship to each other. The fixed shaft 120 has opposite ends each having a substantially square cross section for preventing the rotor assembly from rotating when it is mounted on the motor frame.

The motors 74a, 74b, which are of the basic structure described above, are fixed to the respective outer frames 98 by the fixing members 104a, 104b that engage the opposite ends of the fixed shaft 120 which each have a substantially square cross section. When the motors 74a, 74b are energized, the first and second housings 106, 108 are rotated to cause the teeth 110 to drive the timing belt 90. The encoder sensor 115 is mounted on the outer frame 98 for detecting the angular displacement of the motor in coaction with the encoder rotor 114 on the outer circumferential surface of the first housing 106.

The joint plate 78 and the base plate 86 are formed of a light metal such as an alloy of Al, Mg, or the like or a bearing steel by extrusion or drawing, or of a metal, a ceramic material, or the like by injection molding, vacuum casing, or a lost-wax process. The base plate 86 has a longitudinal groove 130 (see FIG. 7) for positioning the guide rail 88 when it is attached. The base plate 86 and the guide rail 88 may be integrally formed of bearing steel or the like, with the guide rail being ground at its sliding surface by electrolytic grinding, chemical grinding, or the like, or may be made of a light metal such as an alloy of Al, Mg, or the like or a ceramic material by extrusion, drawing, vacuum die casting, a lost-wax process, or metallic or ceramic injection molding, with bearing steel joined to a sliding surface of the guide rail. The base plate 87 has attachment holes 132 defined therein for joining itself to the joint plate 78.

Figure 11:
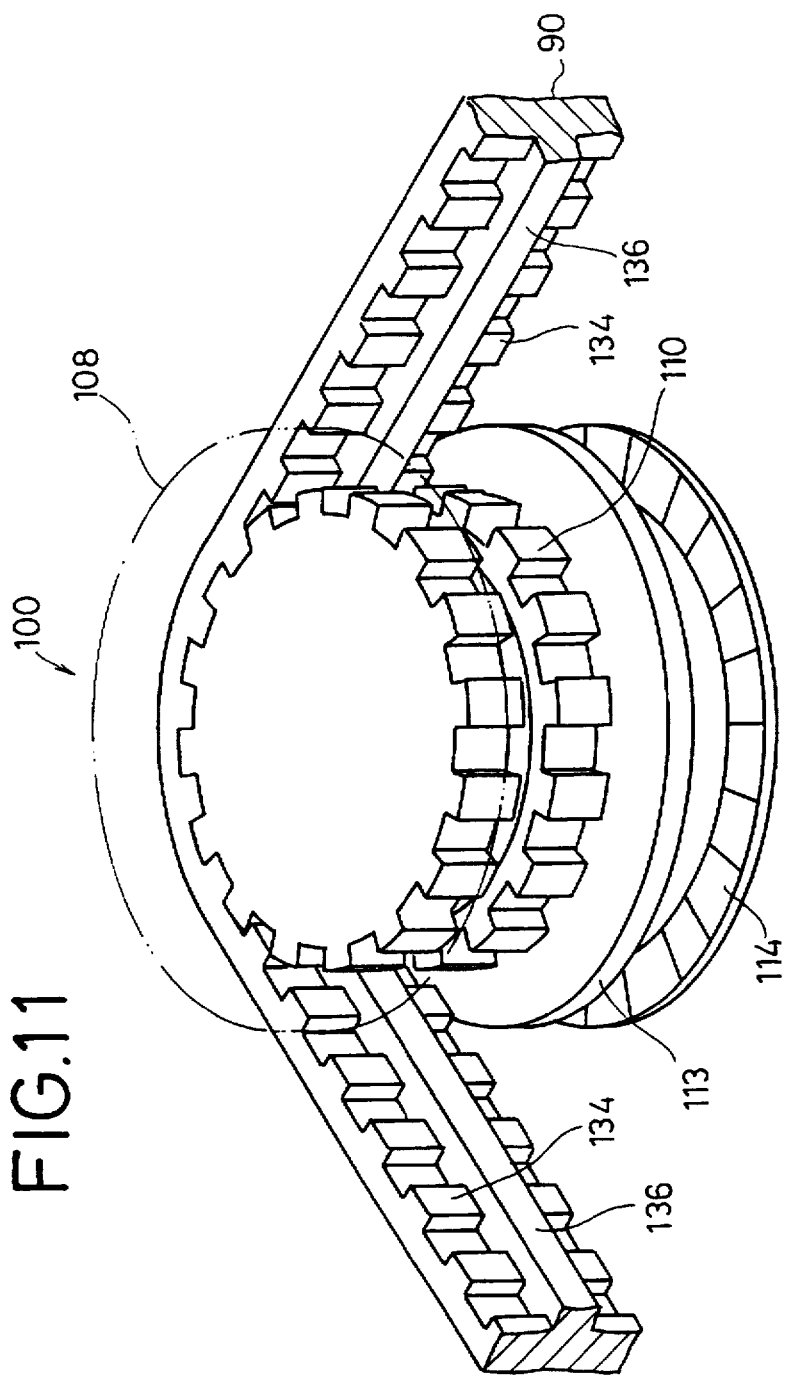
FIG. 11 is a perspective view showing the relationship between a timing belt and the pulley-combined induction motor in the actuator shown in FIG. 7.
Figure 12:
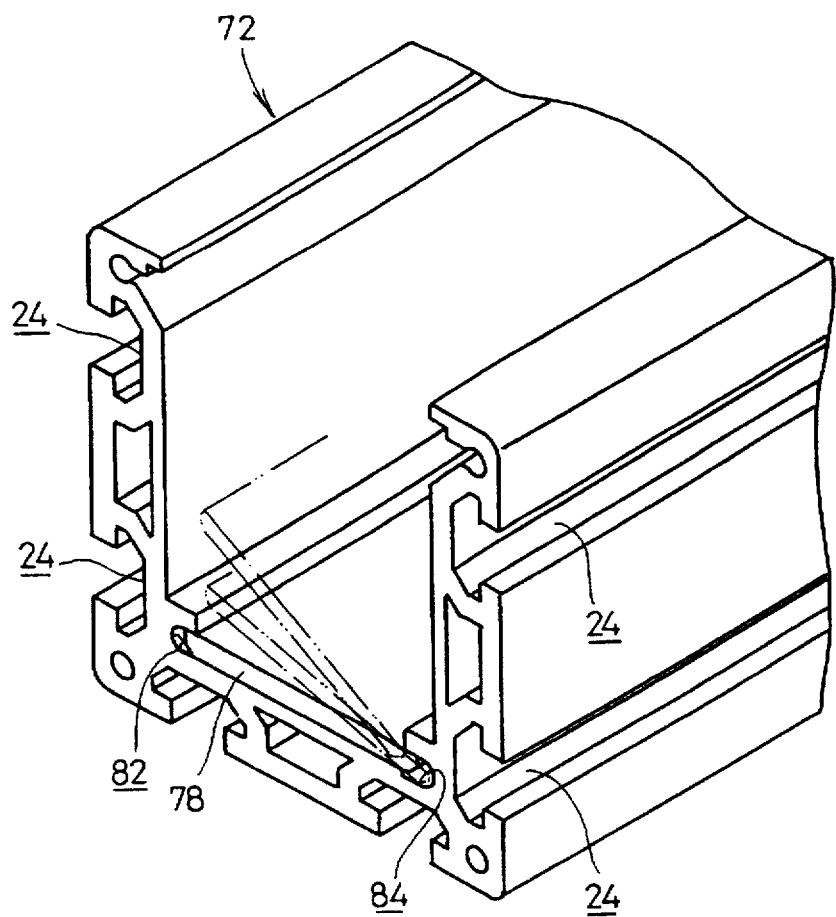
FIG. 12 is a view illustrative of the manner in which a joint plate is inserted into a frame.

The timing belt 90 which serves as a power transmitting member transmits rotative forces generated by the motors 74a, 74b to the table 94. The power transmitting member may alternatively comprise a fitting steel belt, a chain, a wire rope, or the like. If it is necessary to position the table 94 with accuracy, then a synchronous transmitting mechanism such as a chain or the like is preferable as the power transmitting member. As shown in FIG. 11, the timing belt 90 has belt teeth 134 held in mesh with the teeth 110 of the motors 74a, 74b, and a longitudinal ridge 136 on its center to prevent the timing belt 90 from moving tortuously and also from being worn at its sides. If the timing belt 90 is made of polyurethane, then it is possible for the timing belt 90 to prevent dust from being produced. Dust produced by movable elements including the power transmitting members, the motors 74a, 74b, the linear guide, etc. is prevented from being scattered around because the components are housed and sealed in the frame 72. If air in the is discharged out by positively evacuating the frame, then the actuator lends itself to use in the fabrication and precision experimentation of semiconductors or the like in a clean room, and the biological or chemical experimentation of genes of the like.

The table 94 is formed of a light metal such as an alloy of Al, Mg, or the like or a bearing steel by extrusion or drawing, or of a metal, a ceramic material, or the like by injection molding, vacuum casing, or a lost-wax process. The table 94 has screw holes 138 for attaching a workpiece thereto and holes 140 for attaching and positioning a workpiece thereon, the holes 138, 140 being defined on opposite sides thereof. A magnet (not shown) is coupled to the table 94, and sensors inserted in the grooves 24 of substantially T-shaped cross section which are defined in the side surfaces of the table 94 detects magnetic fluxes from the magnet for detecting the position of the table 94. The sensor may function simply as a limit switch, or a linear magnetic encoder, a linear optical encoder, or the like may be employed to detect the position of the table 94 more accurately to produce position and speed feedback information. In such a case, the encoder 21 for detecting the rotational speed of the motors 74a, 74b in the first embodiment does not need to be provided, and the position and speed can be controlled with increased accuracy because the power transmitting system including the ball screw, the timing belt, etc. is contained in the feedback loop.

The timing belt 90 is coupled to the table 94 by fixing opposite ends of the timing belt 90, together with the belt holder 92 which is shaped complementarily to the belt teeth 34 of the timing belt 90, to the sides of the table 94 with screws, staking, or the like.

The guide rail 88 is joined to the upper surface of the base plate 86, serving as a coupling member, by bolts. The guide block 96 is movable as a rolling guide on the guide rail 88 through balls, cylindrical rollers, cross rollers, or the like interposed therebetween. The linear guide may comprise, other than the rolling guide, a sliding plane guide having a guide rail and a guide block which are made of a low-friction, self-lubricating material such as polyimide, Teflon, nylon, polyacetal, or the like. Alternatively, the movable components such as the table, etc. may be formed partly or wholly of such an alloy or resin. Similarly, the guide rail 88 and the base plate 86 as a coupling member may be integrally formed with each other.

The motors 74a, 74b and the power transmitting members such as the timing belt 90, etc. are generally connected to each other by belt driving pulleys (not shown) connected to the drive shafts of the motors 74a, 74b for transmitting drive forces from the motors to the timing belt 90. However, the belt driving pulleys connected to the drive shafts of the motors 74a, 74b would tend to increase the overall length of the motors 74a, 74b and the drive shafts thereof, causing the motors 74a, 74b to project from the frame 72. In order to house the motors 74a, 74b within the frame 72 without projecting from the outer side surfaces of the frame 72, orthogonal means would be required between the motors 74a, 74b and the rotatable shafts of the belt driving pulleys, resulting in a complex structure. According to the present invention, therefore, the motors 74a, 74b comprise induction motors of simple structure, and are made integral with the belt driving pulleys, so that the drive unit is rendered small in size. With such a simple arrangement, the motors 74a, 74b are housed in the frame 72 such that they do not project from the outer side surfaces of the frame 72, but have surfaces lying flush with the outer side surfaces of the frame 72. However, the motors 74a, 74b may be used such that they project from the outer side surfaces of the frame 72.

In this embodiment, the two main and auxiliary motors 74a, 74b are controlled by the controller 23, and may be superimposed by the frame 72 as with the first embodiment. However, the main and auxiliary motors 74a, 74b may be housed as blocks in the frame 72. The structure and operation of the controller 23 are the same as those of the controller according to the first embodiment, and will not be described in detail below.

Figure 13:
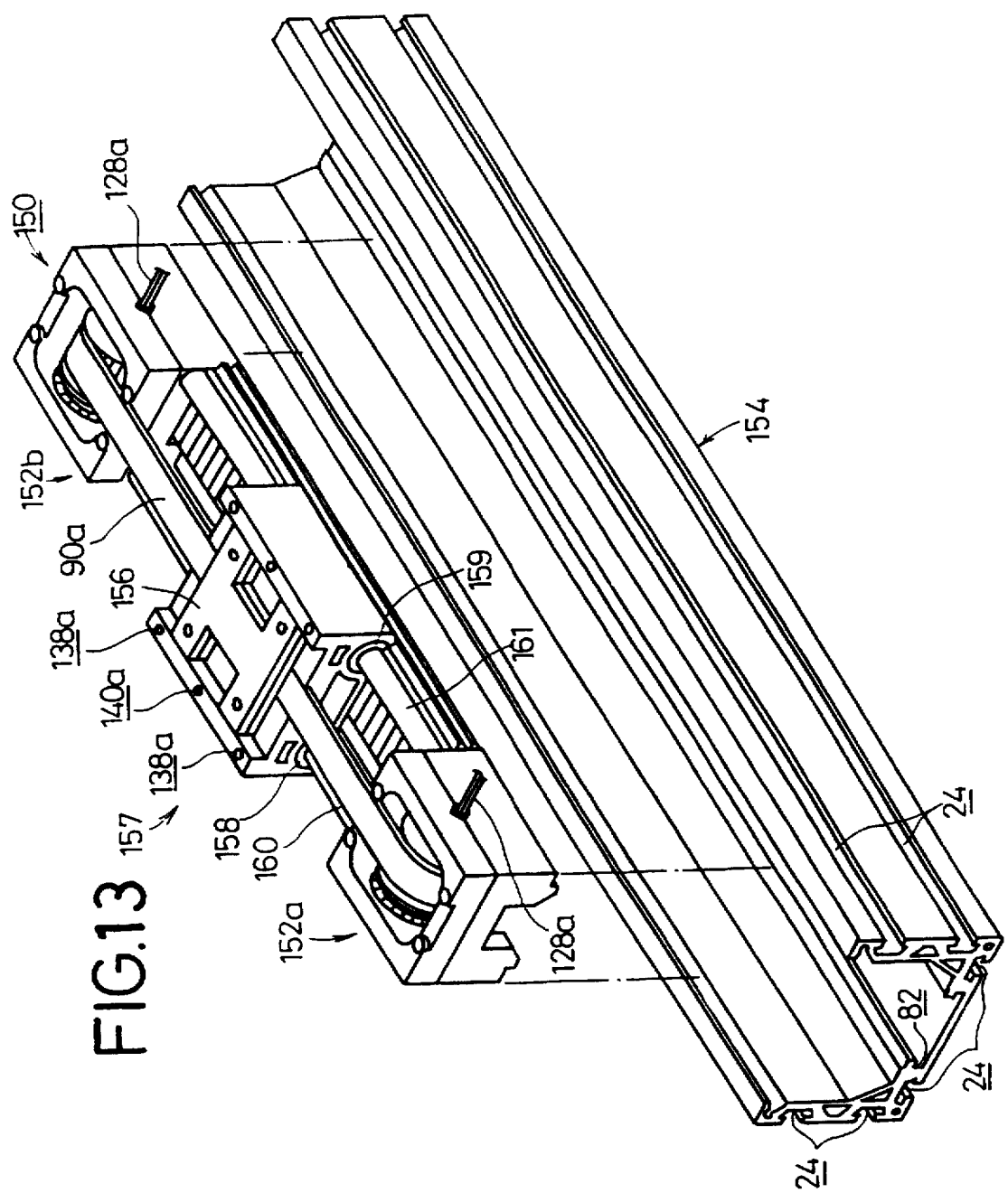
FIG. 13 is an exploded perspective view of a third embodiment of an actuator used in the actuator structural body according to the present invention.
Figure 14:
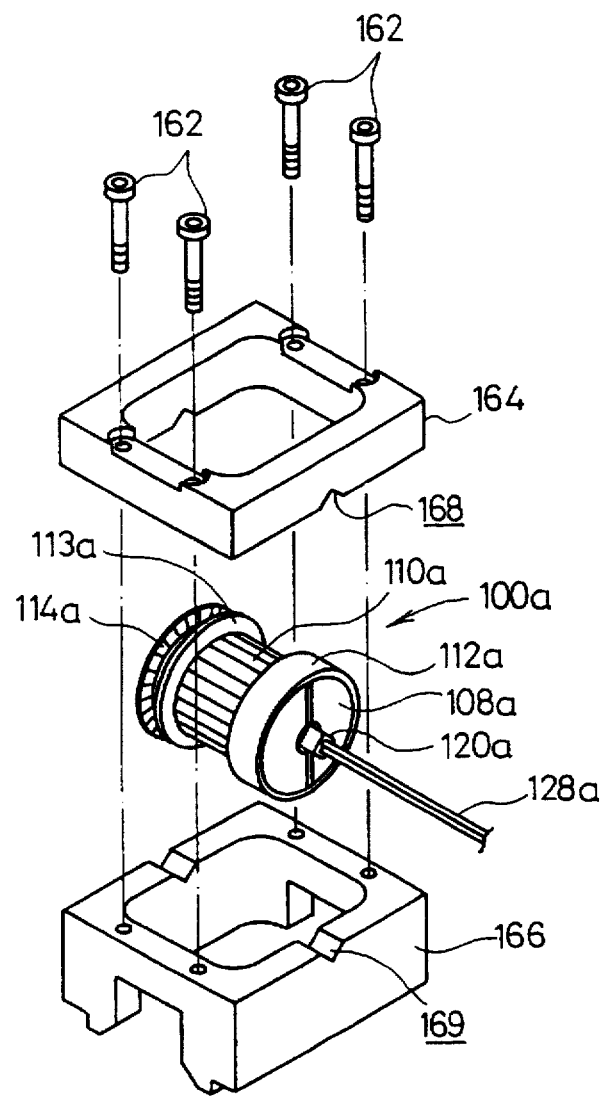
FIG. 14 is an exploded perspective view of a pulley-combined induction motor in the actuator shown in FIG. 13.
Figure 15:
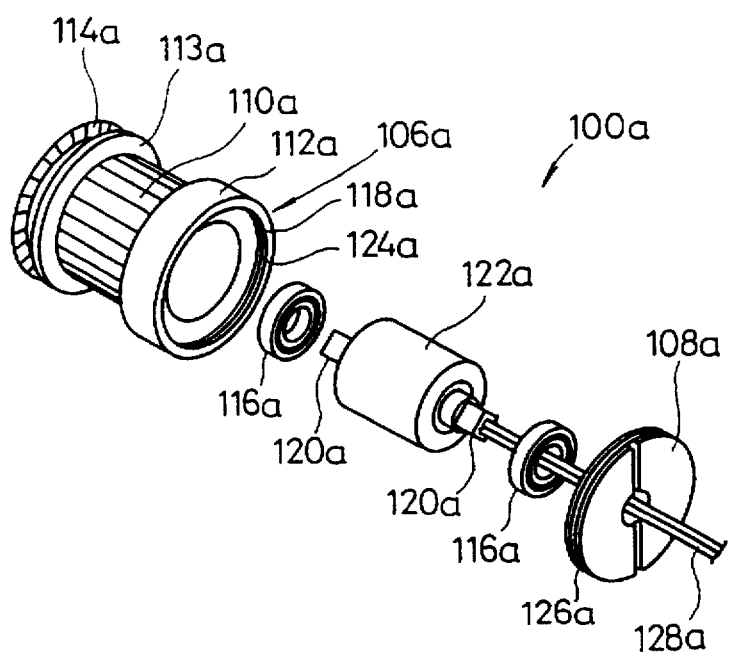
FIG. 15 is an exploded perspective view of the pulley-combined induction motor in the actuator shown in FIG. 13.
Figure 16:
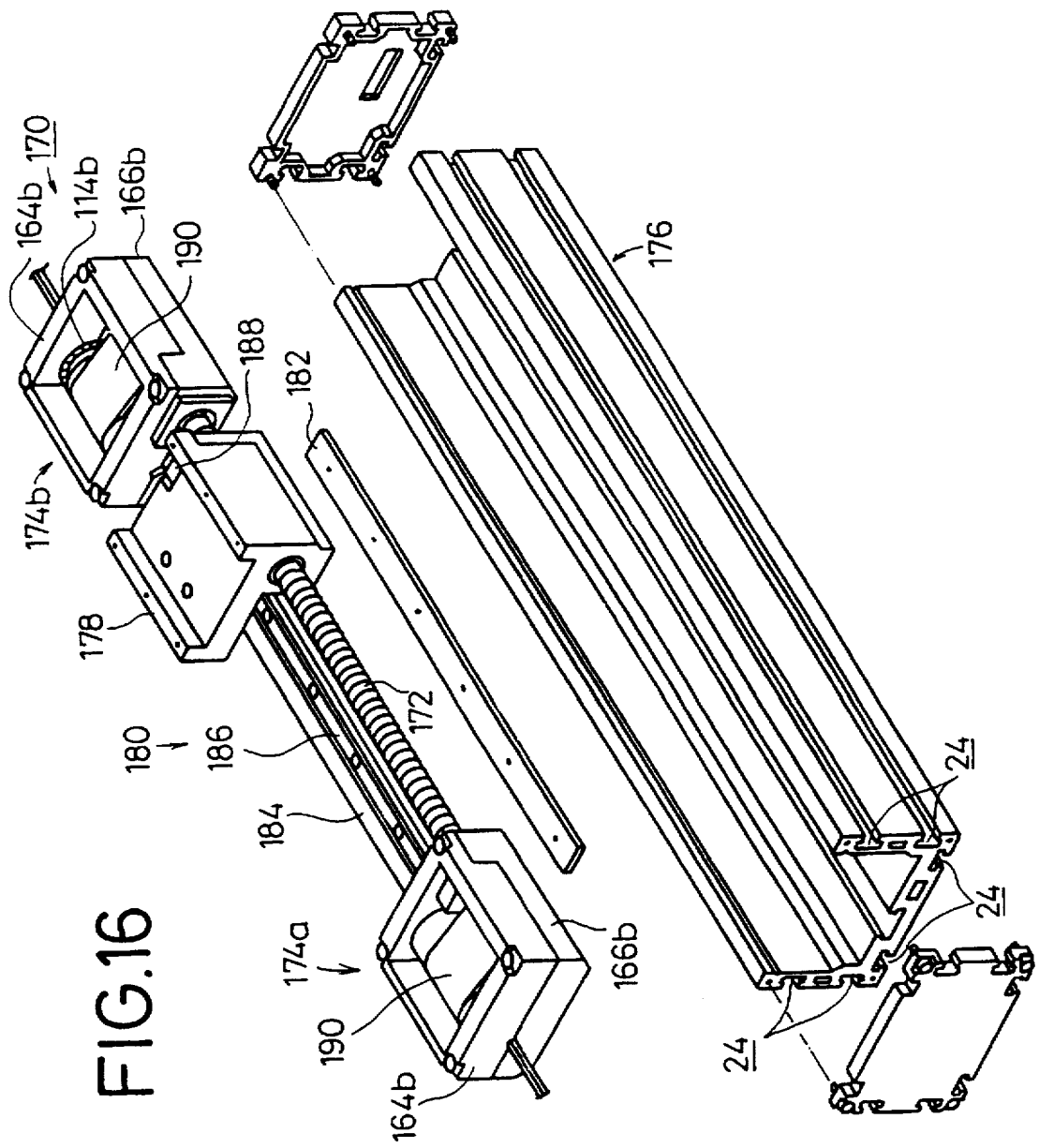
FIG. 16 is an exploded perspective view of a fourth embodiment of an actuator used in the actuator structural body according to the present invention.
Figure 17:
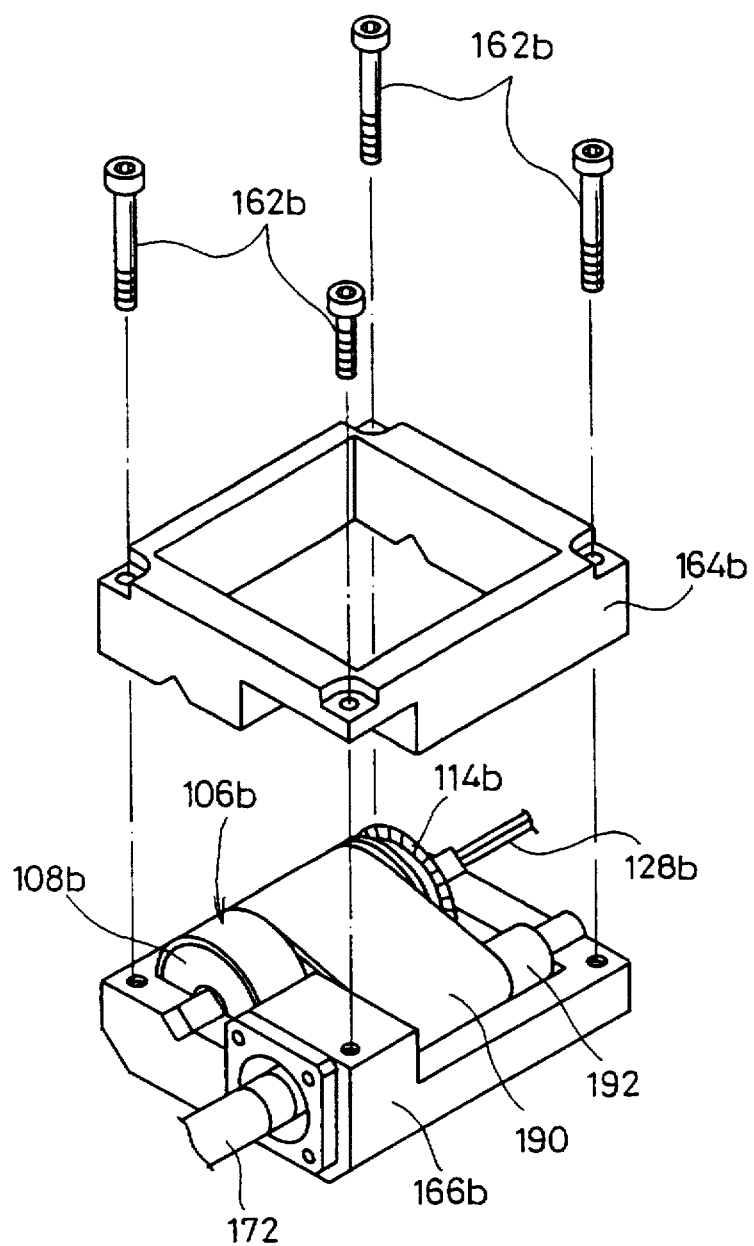
FIG. 17 is an exploded perspective view of a pulley-combined induction motor in the actuator shown in FIG. 16.
Figure 18:
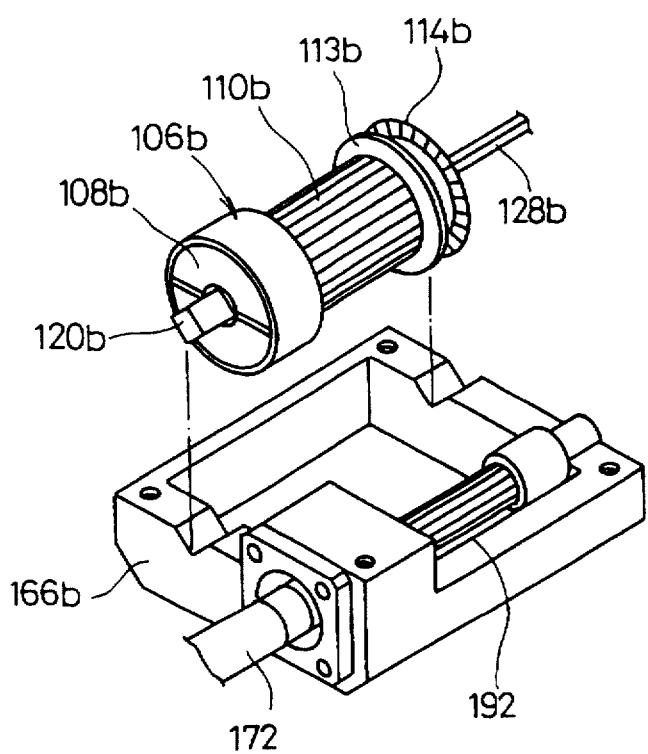
FIG. 18 is an exploded perspective view of the induction motor in the actuator shown in FIG. 16.

A third embodiment is illustrated in FIGS. 13 through 15. An actuator 150 according to the third embodiment has a timing belt 90a as a power transmitting means and motors 152a, 152b, as with the second embodiment, which make up a small-size power unit. Those components which correspond to those of the second embodiment are denoted by identical reference numerals with a suffix "a", and will not be described in detail below.

The actuator 150 comprises a frame 154 serving as a structural member, and a drive mechanism 157 having a table 156 that is displaceable by the timing belt 90a which is moved by the motors 152a, 152b.

The table 156 is formed of a light metal such as an alloy of Al, Mg, or the like or a bearing steel by extrusion or drawing, or of a metal, a ceramic material, or the like by injection molding, vacuum casing, or a lost-wax process. Linear guide bearings 158, 159 disposed in the bottom of the table 156 substantially parallel to each other are in the form of hollow cylinders that are partly open, and the hollow cylinders have a plurality of passages defined in their inner surfaces which accommodate steel balls held in rolling contact with two guide shafts 160, 161 for endless circulatory motion. The linear guide bearings 158, 159 may be replaced with a plane guide made of a low-friction, self-lubricating material such as polyimide, Teflon, nylon, polyacetal, or the like. Alternatively, the table 156 may be formed partly or wholly of such a material.

As shown in FIG. 14, each of the motors 152a, 152b comprises a first fixing member 164, a second fixing member 166, and a rotor assembly 100a fixed to the first and second fixing members 164, 166 by screws 162. The first and second fixing members 164, 166 have recesses 168, 169 which support therein fixed shafts 120a, 120b at the opposite ends of the rotor assembly 100a. Operation and advantages of the actuator according to the third embodiment are the same as those of the actuator according to the first embodiment, and will not be described in detail below.

FIGS. 16 through 19 show a fourth embodiment. An actuator 170 according to the fourth embodiment has a ball screw shaft 17 as a power transmitting means and motors 174a, 174b, which make up a small-size power unit. Those components which correspond to those of the second embodiment are denoted by identical reference numerals with a suffix "b", and will not be described in detail below.

The actuator 170 comprises a frame 176 serving as a structural member, and a drive mechanism 180 having a table 178 that is displaceable by the ball screw shaft 172 which is rotated by the motors 174a, 174b.

The drive mechanism 180 is fixed to the bottom of the frame 176 by a joint plate 182, and a base plate 184 is joined to an upper surface of the joint plate 182. A guide rail 186 is fastened to an upper surface of the base plate 184. The base plate 184 and the guide rail 186 may be integrally formed with each other.

The table 178 is fixedly mounted on a guide block (not shown) which moves linearly on the guide rail 186. A ball screw nut 188 is secured to the table 178, and the ball screw shaft 172 is threadedly fixed in the ball screw nut 188. The ball screw shaft 172 and the ball screw nut 188 convert rotative drive forces from the motors 174a, 174b into linear drive forces for linearly displacing the table 178. The axis of the ball screw nut 188 is positioned out of alignment with the axis of the guide rail 186 to reduce the height of the table 178. The axes of the ball screw shaft 172 and the guide rail 186 are spaced from the central axis of the actuator 170.

Generally, the ball screw shaft 172 and the motors 174a, 174b are connected to each other by an Oldham joint, a flexible joint, a universal joint made of rubber or the like that is positioned between ends of the ball screw shaft 172 and ends of the shafts of the motors 174a, 174b. Alternatively, the ball screw shaft 172 and the motor shafts may be made integral with each other using the motors 20a, 20b indicated by the first embodiment. With the axis of the ball screw shaft 172 spaced from the central axis of the actuator 170, however, the motors 174a, 174b whose shafts are aligned with the ball screw shaft 172 would project from the upper surface of the frame 176. To prevent the motors 174a, 174b from projecting from the frame 176, it is customary to space the axis of the ball screw shaft 172 from the axes of the motor shafts, and connect the ball screw shaft 172 and the motor shafts with gears. Such an arrangement, however, result in a complex power unit structure. According to this embodiment, the axis of the ball screw shaft 172 is spaced from the axes of the motor shafts, the ball screw shaft 172 and the motor shafts are connected by timing belts 190, and pulley-combined induction motors are employed, as with the second and third embodiments, resulting in a small-size, simple power unit.

The motors 174a, 174b are supported by respective fixing members 166b which hold respective ends of the ball screw shaft 172 through bearings (not shown). Driven pulleys 192 are connected to the respective ends of the ball screw shaft 172 for transmitting rotational drive forces from the motors 174a, 174b to the ball screw shaft 172 through the timing belts 190.

In the actuators 70, 150, 170 according to the second through fourth embodiments, respectively, induction motors and drive pulleys are made integral with each other based on the simple structure of the induction motors, resulting in a small-size drive unit, and the motors are housed in the frame without projecting from the outer side surfaces of the frame. The actuators 70, 150, 170 have the grooves 24 of substantially T-shaped cross section defined in their outer surfaces for allowing themselves to be incorporated in production lines in factories or the like, and are also compatible with each other. Consequently, the actuators 70, 150, 170 can be used to install thereon frames and panels of other actuators, protective metal screens, handrails, etc., and also to secure thereto wires, pipes, solenoid-operated valves, ejector units with solenoid-operated valves, and their manifolds. As a results, the frames of the actuators 70, 150, 170 can be used as structural members for constructing an actuator structural body (described later on), and can easily be incorporated into an actuator structural body without using conventional beams, panels, or the like for attachment. When the attached position of an actuator needs to be changed in an actuator structural body which has been constructed, it has heretofore been necessary to change the position of a beam or drill a hole again in a panel with conventional actuators. According to the present invention, however, it is only necessary to loosen attachment bolts as fastening members, moving the actuator a required distance in the frame, and thereafter tighten the attachment bolts again. Therefore, the process is simple and can be carried out in a smaller number of steps. In the event of a trouble or an inspection for maintenance, since the actuator can easily be removed from the actuator structural body, the inspection process can efficiently be carried out. The actuator can also be replaced with another actuator for a quick servicing process. Since a plurality of actuators can be assembled in a single elongate frame, the combination of actuators can be made compact.

A plurality of actuators and an air balancer which are coupled together into an actuator structural body will be described below.

As shown in FIG. 20, a first assembly of an actuator structural body 200 comprises a plurality of columnar members (structural members) 202 which constitute a skeleton, first through fourth actuators 204, 206, 208, 210, an air balancer (hereinafter referred to as a "balancer") 212 associated with the second actuator 206, a working table 214, workpieces 216, a workpiece storage box 218, a workpiece holder plate 220, movable bodies 222, 224, 226, 228, a cylinder 232 to which a suction pad 230 as a workpiece gripping means is coupled, a cylinder 236 having a cylinder rod 234 as it projects, electric actuator control boxes 238, a filter regulator lubricator controller 240, and other non-illustrated components including a compressor, a dehumidifier, an after-cooler, etc. The actuators 204, 206, 208, 210 shown in FIG. 20 are of a basic structure which is identical to that of the actuators according to the first through fourth embodiments described above.

The non-illustrated components including a compressor, a dehumidifier, an after-cooler, etc. are assembled in an integral structure and inserted in the blocks of the actuators 204, 206, 208, 210. In this arrangement, they are integrally arranged or connected and wired in the columnar members. It is possible to employ a suction device such as a known compressor, a scroll compressor, or the like to circulate a vacuum pressure for use. The compressor, the dehumidifier, the after-cooler, the known compressor, the scroll compressor, etc. may be dispersed and housed in motor boxes of the actuators, valve units, or the like.

The first actuator 204 serves to linearly move the second actuator 206 and the balancer 212 which are mounted on an upper surface of the movable body 222. The second actuator 206 connected perpendicularly to the first actuator 204, and the balancer 212 associated with the second actuator 206 serve to vertically move the third actuator 208 mounted on the movable body 224. The cylinder 232 with the suction pad 230 connected thereto is joined to the movable body 226 disposed on the third actuator 208 which is connected perpendicularly to the second actuator 206 and the balancer 212 associated with the second actuator 206. The cylinder 236 is joined to the movable body 228 disposed on the fourth actuator 210 for conveying and positioning the workpieces 216. A motor box 242 is disposed at a junction between the first actuator 204 and the columnar member 202, and a valve unit 244 is disposed at a junction between the fourth actuator 210 and the columnar member 202. The motor box 242 and the valve unit 244 may be shaped so as to lie flush with the upper surfaces of the first and fourth actuators 204, 210, without projecting therefrom. Some of the electric actuator control boxes 238 may be dispersed and housed in the motor box 242 and the valve unit 244.

The actuator structural body 200 operates as follows: Compressed air is supplied through fluid passages in the columnar members 202 to the cylinder 232 coupled to the third actuator 208. When the compressed air is supplied, the cylinder rod of the cylinder 232 is displaced downwardly, and the suction pad 230 attracts a workpiece 216 in the workpiece storage box 218. Compressed air is supplied again to displace the cylinder rod upwardly, and while the cylinder rod is being displaced upwardly, the movable body 224 on the balancer 212 which is associated with the second actuator 206 is moved upwardly, therebymoving the third actuator 208 upwardly. The movable body 222 on the first actuator 204 is moved to move the second actuator 206 connected to the movable body 222 and the balancer 212 associated with the second actuator 206. The first actuator 204 and the third actuator 208 stop moving when the workpiece 206 attracted by the suction pad 230 has moved near a position above a desired position. The movable body 224 on the second actuator 206 and the balancer 212 associated therewith, and the cylinder rod of the cylinder 232 are lowered to insert the workpiece 216 into a hole 246 defined in the workpiece holder plate 220. At this time, the cylinder rod 234 of the fourth actuator 210 can be displaced to position the workpiece 216 in the hole 246. The fourth actuator 210 can convey the workpiece 216 to the working table 214 with the movable body 238 and the cylinder 236. The workpiece storage box 218 and the workpiece holder plate 220 are positioned on the working table 216 by a positioning means (not shown).

Joint means for connecting the columnar members 202, the actuators 204, 206, 208, 210, the balancer 212, etc. will be described below with reference to FIGS. 21A, 21B through 25.

Figure 22:
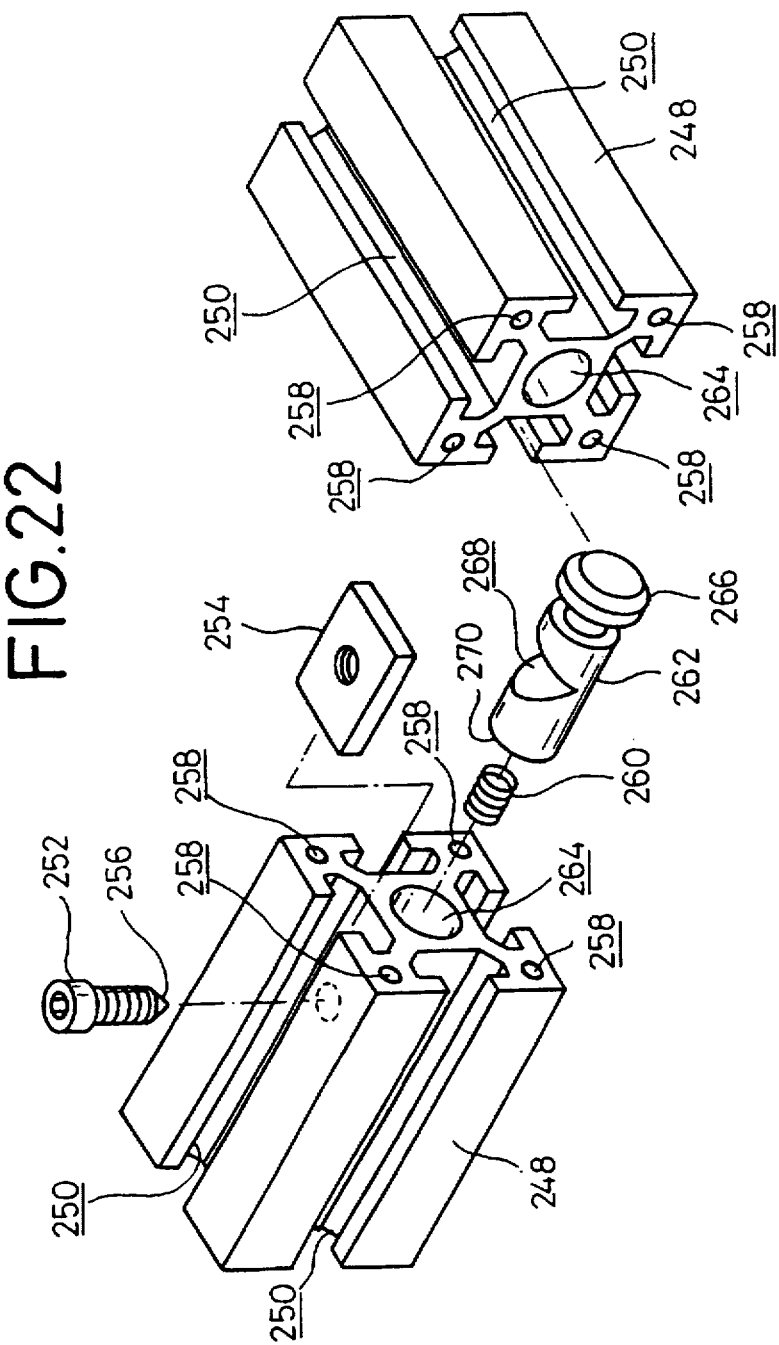
FIG. 22 is a perspective view of the joint means shown in FIG. 21B.

FIGS. 21A, 21B, and 22 show a first embodiment of the joint means. FIG. 21A is a fragmentary front elevational view of columnar members connected to each other, FIG. 21B is a side elevational view, partly in cross section, of the connected columnar members shown in FIG. 21B, and FIG. 22 is an exploded perspective view of the joint means.

In FIGS. 21A and 21B, each of columnar members 248 which are substantially identical to each other has linear grooves 250 defined longitudinally in side surfaces thereof. A plate 254 which can be secured by a screw 252 is slidably disposed in one of the grooves 250. The screw 252 has a conical tip 256. Each of the columnar members 248 has fluid passages 258 serving as passages for delivering a fluid such as air, oil, water, or the like, which are defined in respective four corners thereof, and a hole 264 defined substantially centrally therein for inserting a bolt 262 with a spring 260. The bolt 262 has a head 266 shaped complementarily to the cross-sectional shape of the grooves 250. The head 266 is loosely fitted substantially perpendicularly into one of the grooves 250 from one end of the columnar member 248. The bolt 262 also has a V-shaped notch 268 defined in an intermediate portion thereof, and a circular recess 270 defined in an end thereof remote from the head 266 for receiving the spring 260.

For connecting the columnar members 248 to each other, the plate 254 is inserted into one of the grooves 250 from an end of one of the columnar members 248, and the spring 260 and the bolt 262 is inserted longitudinally into the hole 264 of the columnar member 248. The head 266 of the bolt 262 is loosely fitted substantially perpendicularly into one of the grooves 250 at one end of the other columnar member 248. Then, the screw 252 is threaded through the groove 250 into the plate 254. The columnar members 248 are now fixedly connected substantially perpendicularly to each other by the bolt 262. Specifically, as shown in FIG. 21B, a slanted surface of the tip 256 of the screw 252 is brought against a slanted surface of the V-shaped notch 268, displacing the head 266 of the bolt 262 in the direction indicated by the arrow A. The displacement of the head 266 causes the reverse side of the head 266 that is loosely fitted in the groove 250 to be held against surfaces of the groove 250, thus securing the columnar members 248. In this manner, the columnar members 248 can easily be joined to each other, and it becomes possible to transmit a fluid pressure signal through the fluid passages 258 in the columnar members 248.

For disconnecting the columnar members 248 from each other, the screw 252 is loosened, allowing the bolt 262 to be displaced in the direction indicated by the arrow B under the resiliency of the spring 260. Upon displacement of the bolt 262, the reverse side of the head 266 is spaced from the surfaces of the groove 250, and the head 266 is again loosely fitted in the groove 250. With the head 266 being loosely fitted in the groove 250, the head 266 of the bolt 262 which has been inserted from one of the columnar members 248 into the other can be slidingly moved in the groove 250. The other columnar member 248 can thus be removed by moving itself along the groove 250. The first embodiment of the joint means has been described with respect to the joining of the columnar members 248. However, the joint means may be used to join a columnar member 248 and any of the actuators 204, 206, 208, 210 or the balancer 212 to each other, though details of such joining will not be described.

Figure 23:
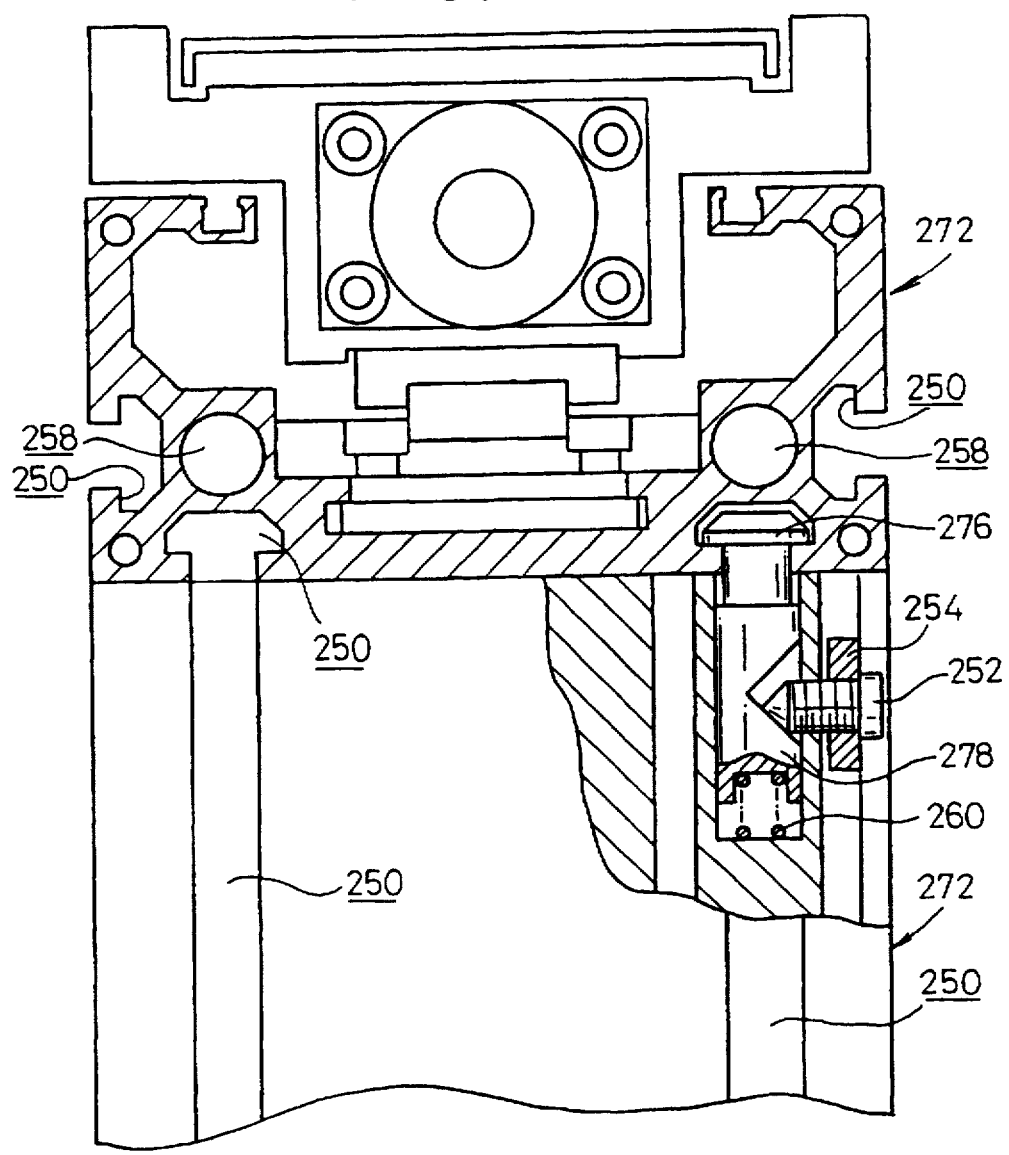
FIG. 23 is a partly cross-sectional view of a second embodiment of the joint means.

A second embodiment of the joint means shown in FIG. 23 differs from the above embodiment in that parallel grooves 250 are defined in respective side surfaces of a columnar member 272, and there are disposed two bolts 278 integral with heads 276 loosely fitted in the grooves 250. Those parts of the second embodiment and other embodiments of the joint means which are substantially identical to those of the first embodiment are denoted by identical reference numerals, and will not be described in detail below.

Figure 24:
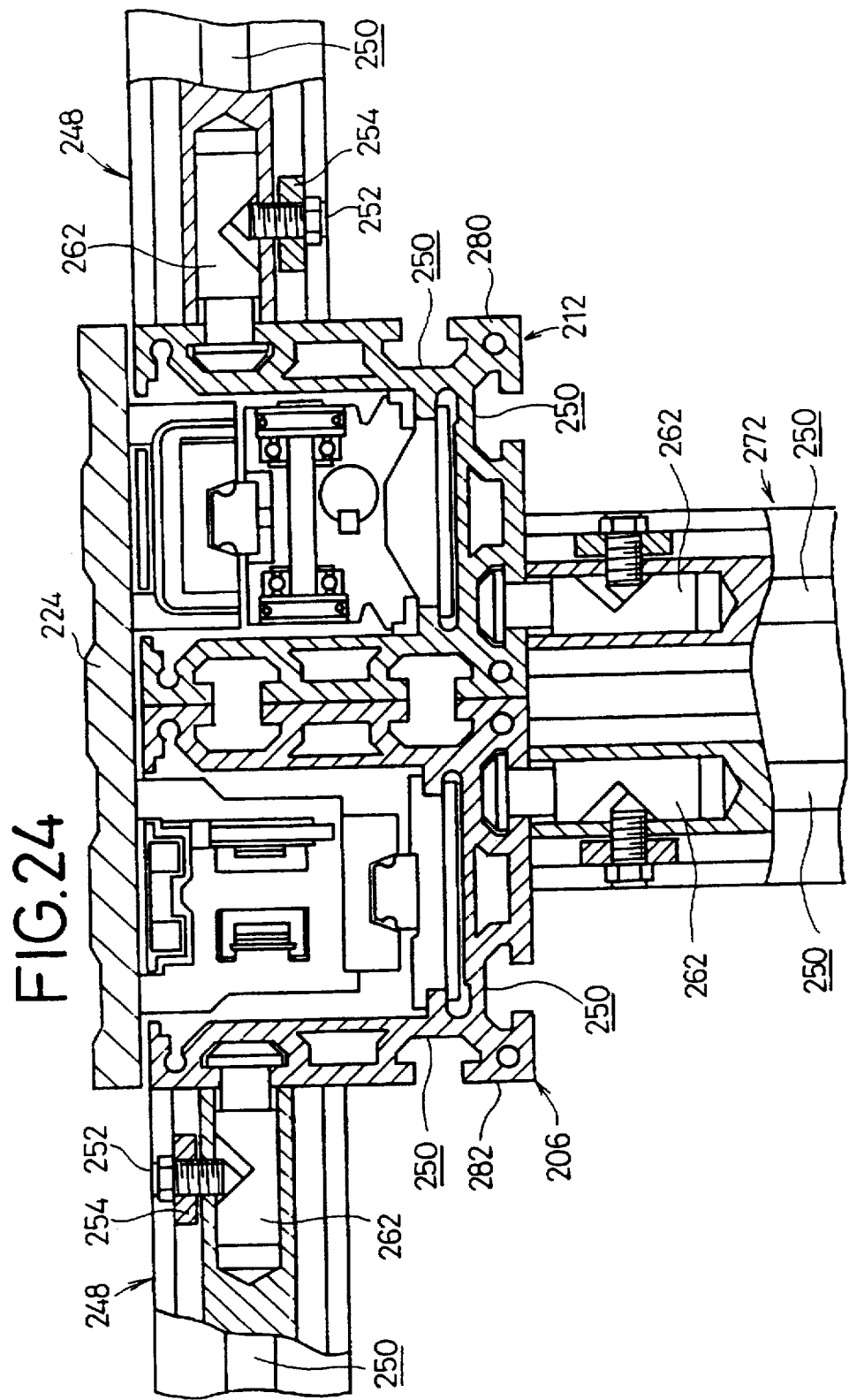
FIG. 24 is a partly cross-sectional view of a third embodiment of the joint means.

According to third and fourth embodiments of the joint means shown in FIGS. 24 and 25, columnar members are joined to each other in three directions that extend substantially perpendicularly to each other. In the third embodiment shown in FIG. 24, columnar members 248 according to the first embodiment of the joint means are connected to respective side surfaces of the balancer 212 and the second actuator 206 shown in FIG. 20, and a columnar member 272 is connected substantially perpendicularly to the columnar members 248 across respective frames 280, 282 of the balancer 212 and the second actuator 206 by two bolts 262 which correspond to respective parallel grooves 250 defined in the bottoms of the frames 280, 282. In the fourth embodiment shown in FIG. 25, columnar members 248, 286 are joined respectively to an actuator 284 and the balancer 212 associated therewith. Further details of the fourth embodiment will not be described below.

A fifth embodiment of the joint means will be described below with reference to FIGS. 26 through 28.

FIG. 26 is a perspective view of the joint means and a columnar member, FIG. 27 is a partly cross-sectional view of columnar members joined by the joint means, and FIG. 28 is a perspective view of the columnar members joined by the joint means.

In FIG. 26, a connecting block (hereinafter referred to as a "connecting block") 290 connected to an end of a columnar member 288 which is cut substantially perpendicularly to the longitudinal direction thereof is formed by die casting or precision casting, preferably vacuum die casting, vacuum casting, a lost-wax process, extrusion, drawing, metallic powder injection molding, or ceramic forming. The block 290 has a substantially cylindrical protrusion 292 disposed substantially centrally on a surface thereof which is to be joined to a columnar member 288. The protrusion 292 is fitted with a fitting dimensional tolerance in a through hole 294 which is defined axially in one of columnar members 288 to be joined to each other, the through hole 294 serving as a fluid passage. Therefore, even if the end of the columnar member 288 is not cut perpendicularly to the longitudinal direction thereof, since the protrusion 292 extends perpendicularly to the contacting surface of the block 290 and the through hole 294 extends parallel to the longitudinal direction of the columnar member 288, the contacting surface of the block 290 is corrected into a position in which it lies perpendicularly to the longitudinal direction of the columnar member 288.

The block 290 has teeth 296a–296d disposed in facing pairs and surrounding the protrusion 292. The teeth 296a–296d have respective substantially circular holes 298a–298d defined therein. The teeth 296a–296d are inserted into respective grooves 300 of substantially T-shaped cross section in the columnar member 288, and setscrews 302 are threaded through the respective holes 298a–298d into biting engagement with inner portions 304 of the grooves 300, causing elastic deformation or plastic deformation, preferably plastic deformation, for securing connecting the block 290 to the columnar member 288. Since tip ends 305 of the teeth 296a–296d spread outwardly in directions opposite to the directions in which the setscrews 302 are threaded, the setscrews 302 are forced to bite into the inner portions 304 for securely preventing the block 290 from being dislodged from the columnar member 288 (see FIG. 28). To prevent the block 290 from being displaced due to different distances by which the setscrews 302 are threaded in, the protrusion 292 is inserted in the through hole 294, and the teeth 296a–296d on the end surface of the block 290 are inserted longitudinally into the respective grooves 300 in the columnar member 288. The block 290 can thus reliably be positioned with respect to the columnar member 288.

A substantially T-shaped bolt 306 and a spring 308 are inserted into the block 290 attached to the columnar member 288, and a head 310 of the bolt 306 is inserted longitudinally into a companion columnar member 288 to be connected and then turned about 90° to prevent the bolt 306 from being removed from the companion columnar member 288. The bolt 306 is securely held in position by a setscrew 312 against angular movement or wobbling movement under the bias of the spring 308, so that the block 290 is reliably and easily joined to the columnar member 288 (see FIG. 27). When the setscrew 312 is loosened for removing the block 290 from the joined companion columnar member 288, the bias of the spring 308 acts in a direction to move the bolt 306 away from a surface of the companion columnar member 288, which can easily be removed for reconstruction.

Plastic deformation or elastic deformation, preferably elastic deformation, of a portion of the columnar member 288 connected to the head 310 of the bolt 306 inserted in the block 290 will be described with reference to FIGS. 29A and 29B. When the bolt 306 is inserted into the block 290, a reverse side 314 of the head 310 of the bolt 306 is held against a flat surface 316 of the groove 300 of substantially T-shaped cross section. Another surface of the columnar member 288 which is opposite to the flat surface 316 and held against the block 290 has a step 318 which allows edges 320 to be deformed against the block 290 when the reverse side 314 of the head 310 presses the flat surface 316.

Figure 31:
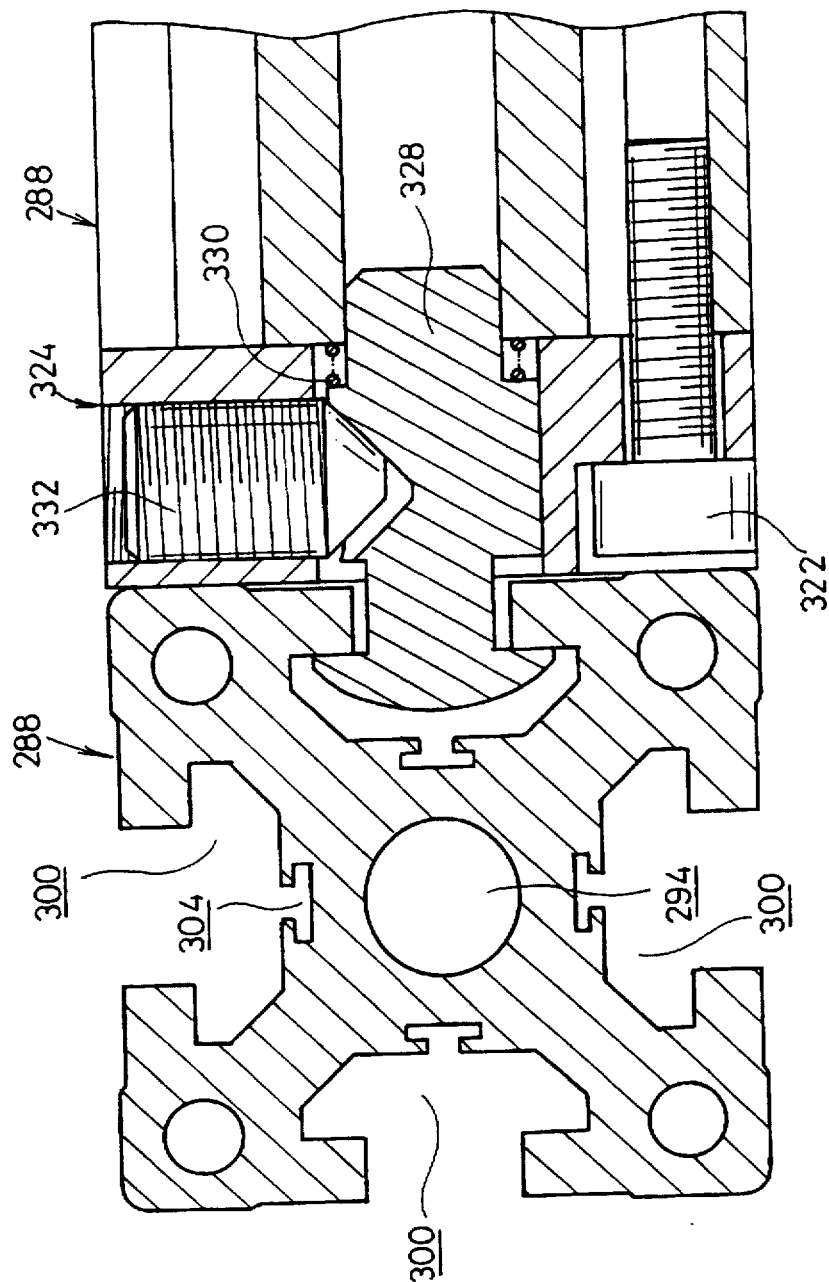
FIG. 31 is a partly cross-sectional view illustrative of a joined state of the joint means shown in FIG. 30.

A sixth embodiment of the joint means for joining columnar members 288 as shown in FIGS. 30 and 31 will be described below.

A rectangular block 324 is fastened to the surface of a cut end of a columnar member 288 by four self-tapping screws 322 with hexagonal sockets. The rectangular block 324 has a through hole 326 defined therein. When a bolt 328 and a spring 330 are inserted into the columnar member 288 through the through hole 326 and a setscrew 332 is threaded into the rectangular block 324, the columnar member 288 and another columnar member 288 are joined to each other. When the columnar members 288 are to be joined to each other, the bolt 328 is required to be pressed against the bias of the spring 330, preventing a notch in the bolt 328 from being angularly displaced or wobbling. The spring 330 also serves to cause the bolt 328 to move the columnar members 288 away from each other when the setscrew 332 is loosened again after the columnar members 288 have been joined to each other.

The rectangular block 324 has holes 334 defined in respective four corners thereof for receiving the respective self-tapping screws 322 with hexagonal sockets. The through hole 294 defined substantially centrally in the columnar member 288 and opening at an end surface thereof is used as a fluid passage for transmitting any of various fluids such as compressed air. A gasket groove which will be difficult to machine subsequently is defined in the end surface of the columnar member 288 which faces the block 324, and then sealed. With a sheet-like gasket being used in the gasket groove, the junction between the columnar member 288 and the block 324 is prevented from being lowered in rigidity and the structural member is prevented from suffering dimensional changes when it is joined, and any of various fluids in the columnar member 288 is prevented from leaking and the fluid can flow into and out of the opening of the through hole 294 at the end surface of the columnar member 288. Gasket grooves and seal members may be provided between the columnar member 288, the rectangular block 324, and another columnar member 288 join ed thereto, so that fluid passages may be established in those columnar members 288.

A structural body comprising a plurality of columnar members 336 with reinforcing members or other columnar members attached thereto will be described below.

Figure 32:
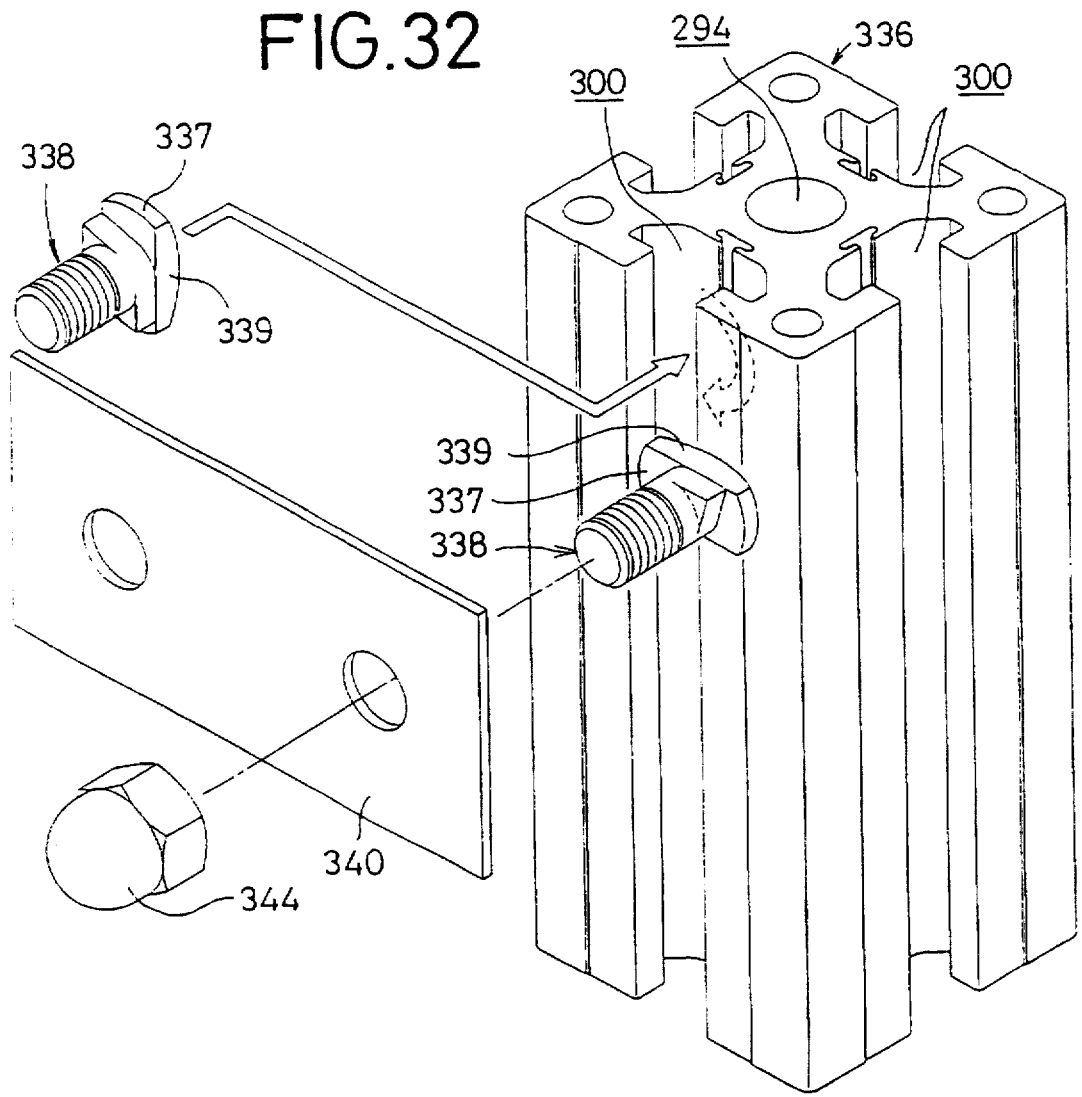
FIG. 32 is a perspective view showing a reinforcing member attached to a joint of the actuator structural body.
Figure 33:
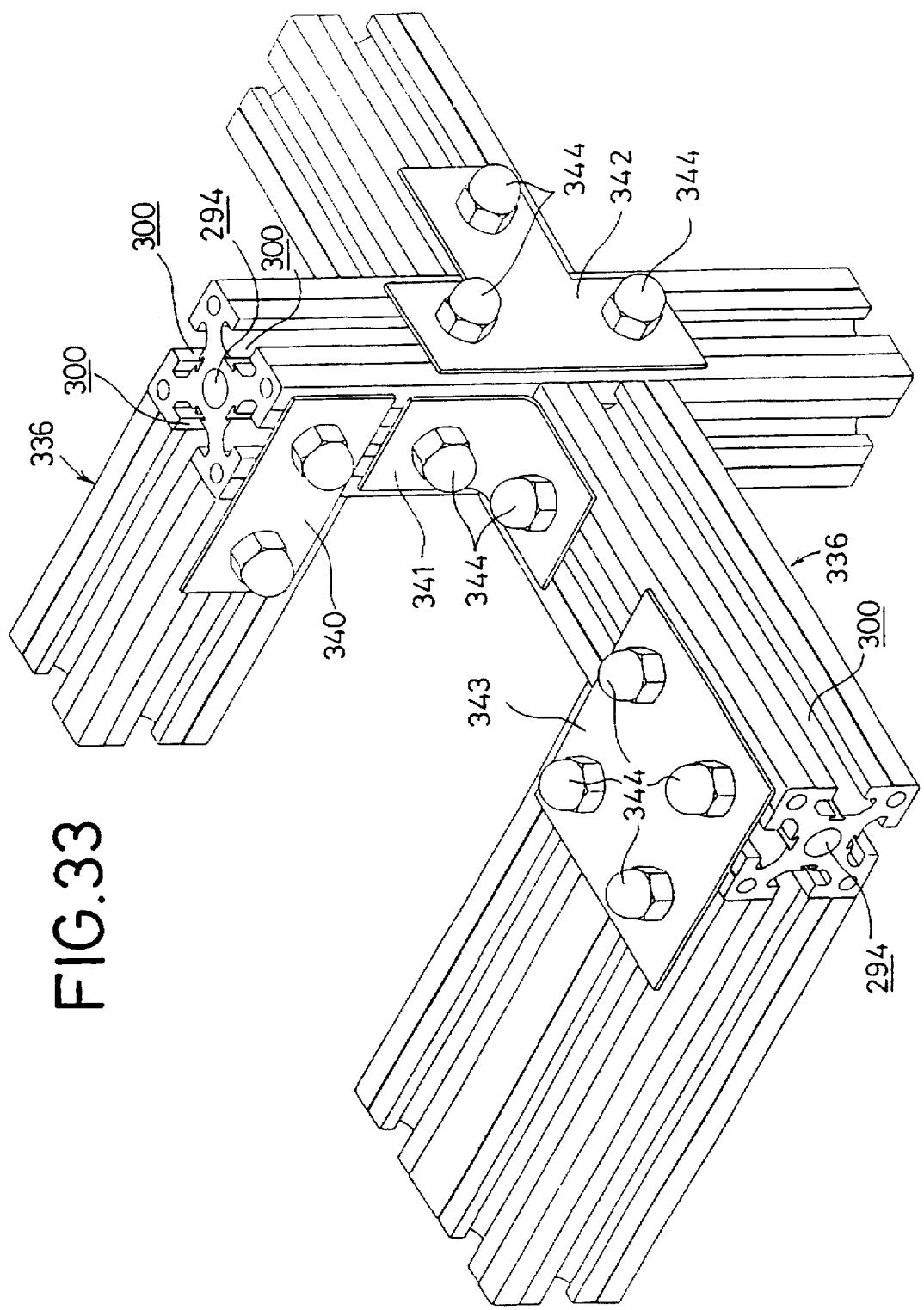
FIG. 33 is a perspective view showing reinforcing members shown in FIG. 32 that are attached in position.

As shown in FIGS. 32 and 33, bolts 338 are inserted in grooves 300 of substantially T-shaped cross section which are defined in side surfaces of columnar members 336. At this time, longer sides 339 of heads 337 of the bolts 338 are inserted longitudinally into the grooves 300, and thereafter the heads 337 are turned about 900° for protection against angular displacement, so that the bolts 338 are fixedly mounted in the grooves 300 at desired positions therein. After the bolts 338 have been fixedly mounted in the grooves 300 in the side surfaces of the columnar members 336, reinforcing members 340, 341, 342, 343 shaped complementarily to respective the junctions are fastened by nuts 344 threaded over the bolts 338. When the bolts 338, the reinforcing members 340, 341, 342, 343, etc. are used, the joints of the constructed structural body are reinforced, increasing the overall rigidity of the structural body. The accuracy of the structural body in use at the time actuators, etc. are connected is prevented from being reduced, and other columnar members 336, etc. may be joined for easily expanding the equipment.

End surfaces of other various columnar members are shown in FIGS. 34 through 38.

Figure 34:
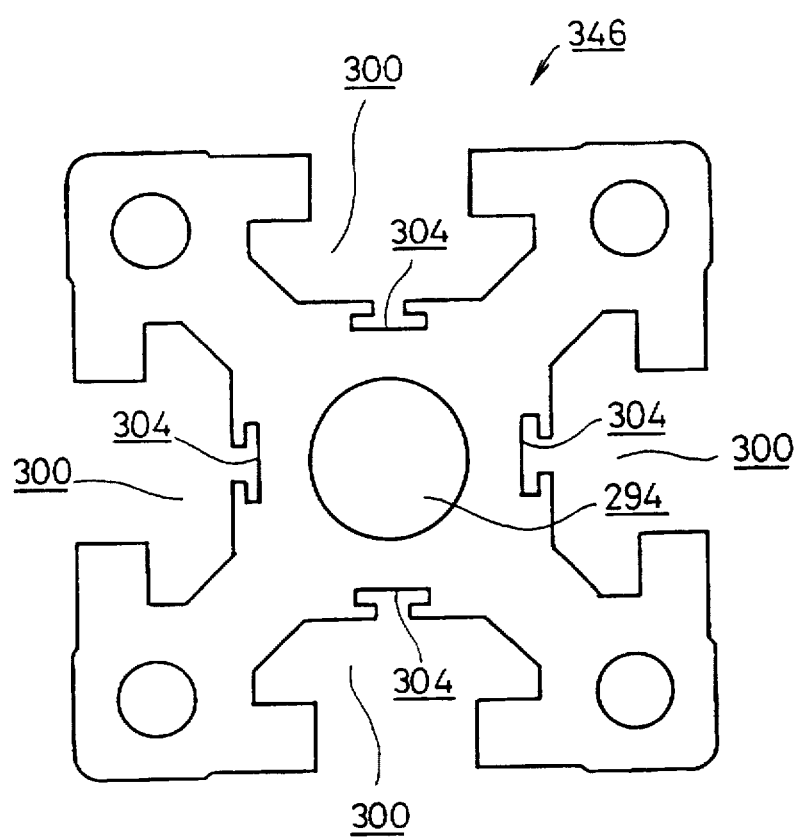
FIG. 34 is a side elevational view of an end surface of a columnar member used in the actuator structural body according to the present invention.
Figure 35:
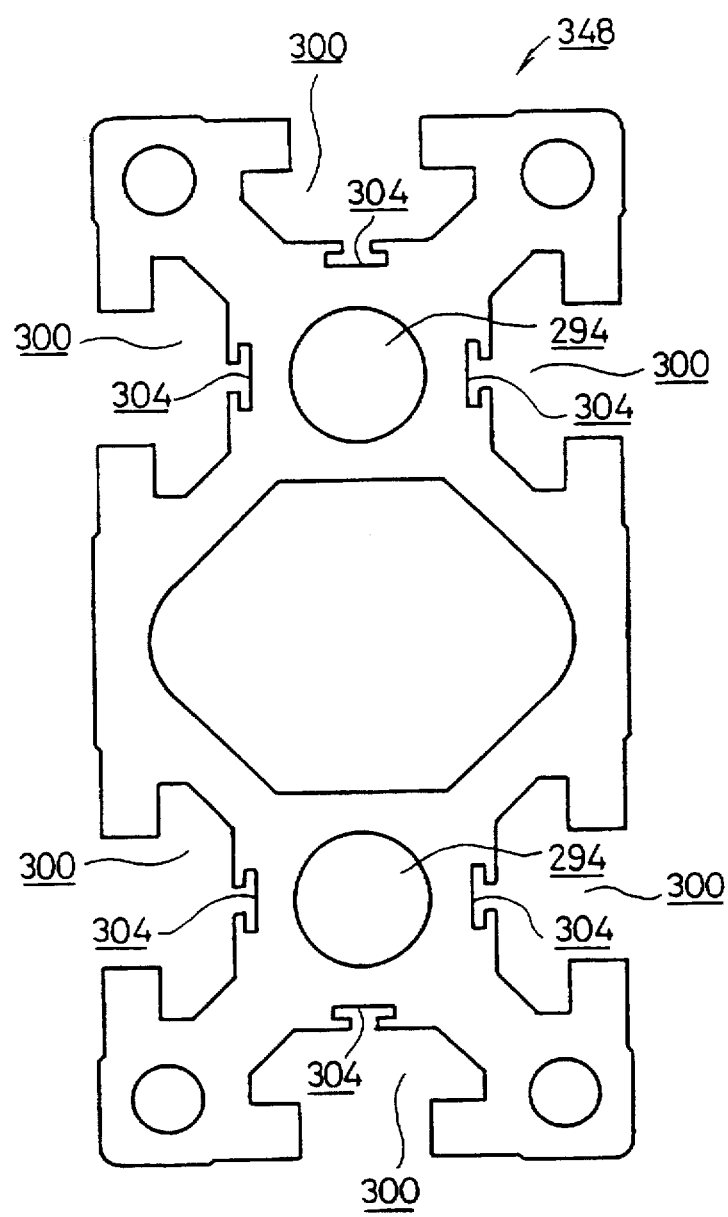
FIG. 35 is a side elevational view of an end surface of a columnar member.
Figure 36:
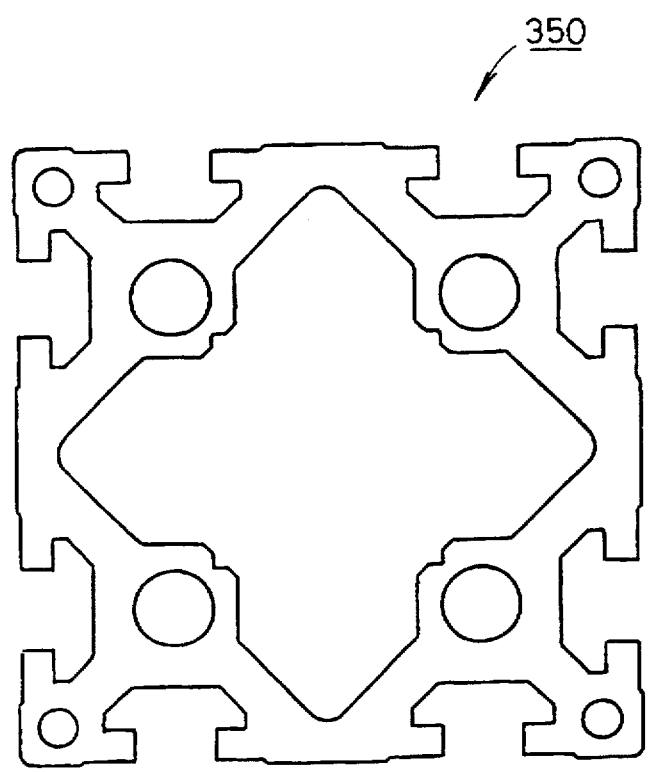
FIG. 36 is a side elevational view of an end surface of a columnar member.
Figure 37:
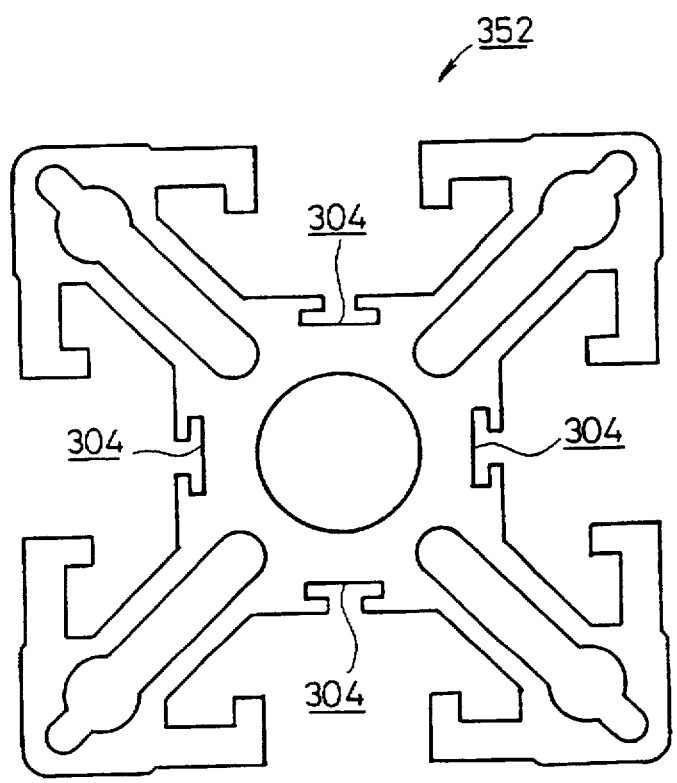
FIG. 37 is a side elevational view of an end surface of a columnar member.
Figure 38:
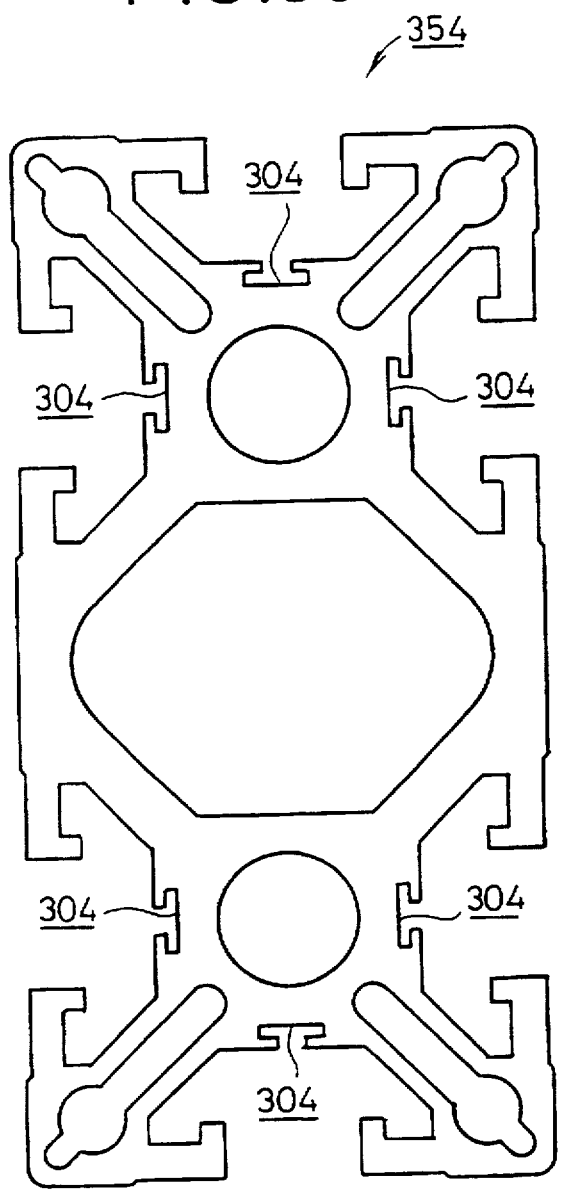
FIG. 38 is a side elevational view of an end surface of a columnar member.

FIGS. 34 through 36 show respective columnar members 346, 348, 350 which are suitable for use in regions where strong loads are applied, of a structural body which has been assembled to desired configuration. FIGS. 37 and 38 show respective columnar members 352, 354 which are made light in weight by spaces defined therein. The columnar members 346, 348, 350, 352, 354 are formed of a light metal such as aluminum alloy, magnesium alloy, aluminum, silicon, or the like, and are surface-treated by an oxide coating (Alumite coating), a hard oxide coating (hard Alumite coating), a titanium coating, a cermet coating, a PVD coating, a CVD coating, or the like for increasing their mechanical strength and reducing scratches which will be produced on their surfaces when various members are attached thereto or detached therefrom. The columnar members 346, 348, 350, 352, 354 may be colored by a paint coating, or preferably a colored oxide coating (Alumite coating), for equipment identification or insulation.

Each of the columnar members may be marked with data, such as a bar code, representing a serial number, a date, a product number, a length, a manufacturer, a selling company, a user, etc. by laser trimming, ink jet printing, or the like. When the columnar members are installed, the data are registered in computer data bases associated with conveying, machining, and assembling equipment. Therefore, the columnar members and actuators that belong to all the equipment used in coordinated production such as CIM or the like can easily be managed. At the time the equipment is modified or expanded, the data in the CIM data base can easily be reconstructed.

Figure 39:
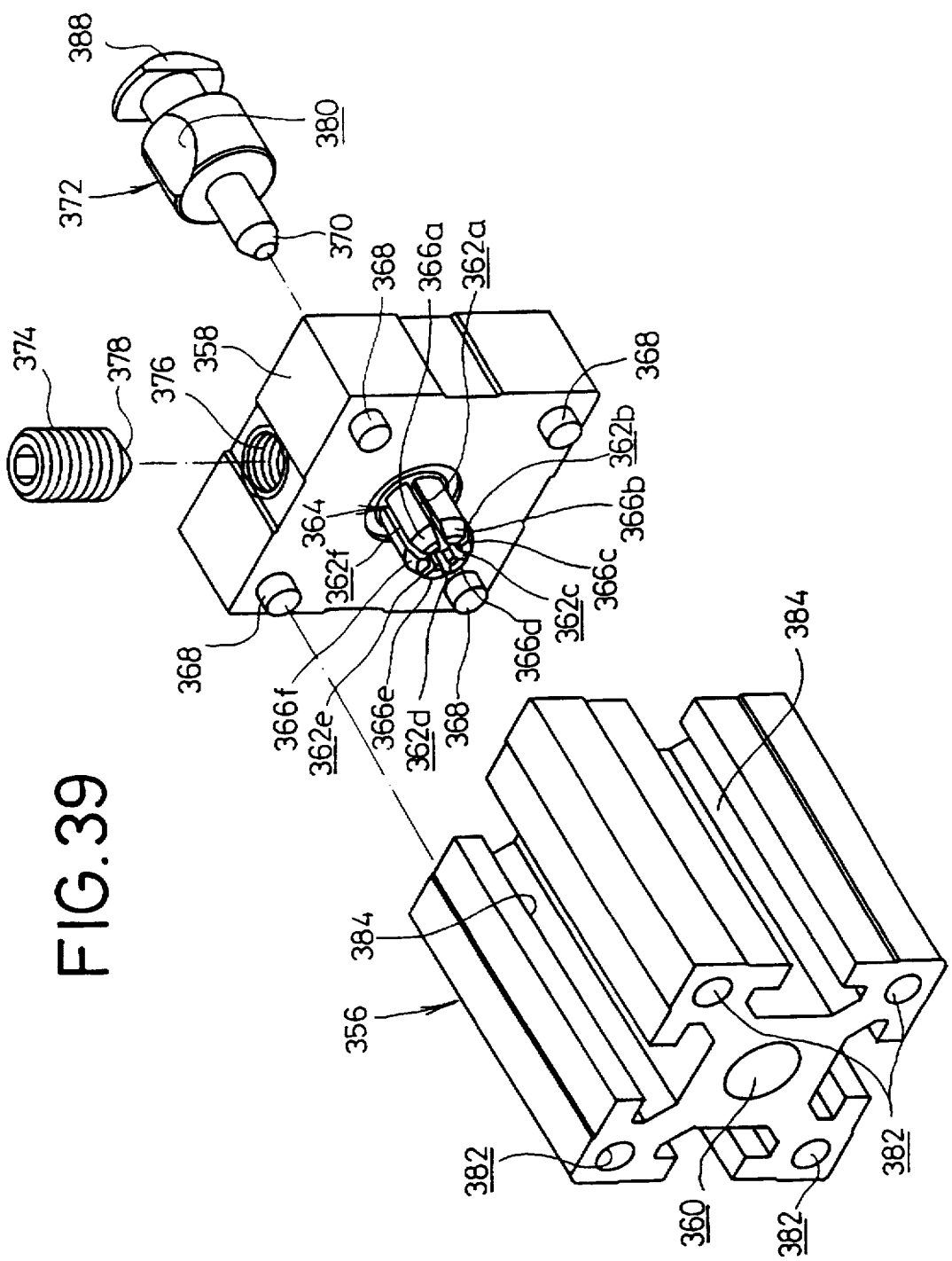
FIG. 39 is a perspective view of a seventh embodiment of the joint means.
Figure 40A:
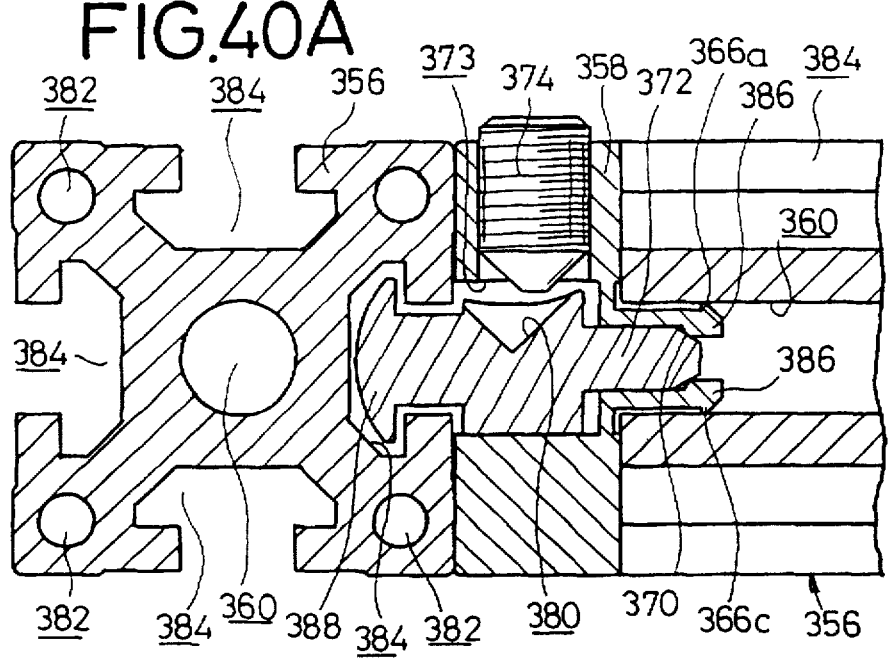
FIGS. 40A and 40B are views illustrative of a joined state of the joint means shown in FIG. 39.
Figure 40B:
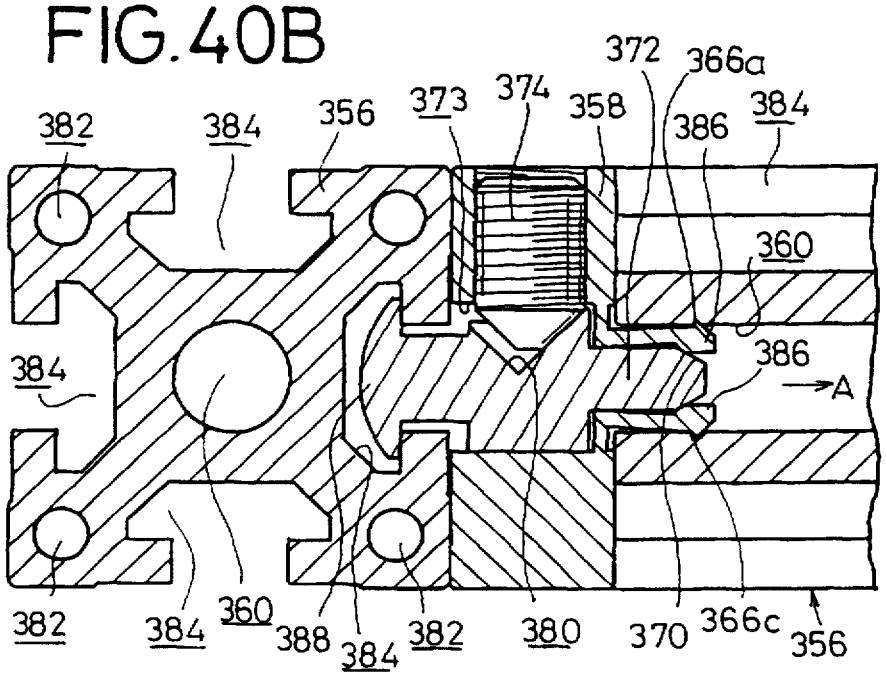

A seventh embodiment of the joint means is shown in FIGS. 39 and 40A, 40B. Those components of embodiments described below which are identical to those of the seventh embodiment are denoted by identical reference numerals, and will not be described in detail.

As shown in FIG. 39, for joining columnar members 356 to each other, a connecting block 358 is attached to the surface of a cut end of one of the columnar members 356. The connecting block 356 has a protrusion 364 inserted in a substantially central through hole 360 defined in the surface of the cut end of the columnar member 356. The protrusion 364 has a plurality of slits 362a~362f defined therein. The slits 362a~362f divide the protrusion 364 into a plurality of arms which have respective teeth 366a~366f on the outer circumferential surfaces of their tip ends. The connecting block 356 also has joint pins 368 disposed respectively on its four corners in the vicinity of the protrusion 364. The connecting block 356 further has a hole 373 defined in a side surface thereof remote from the protrusion 364 for inserting therein a bolt 372 of substantially T-shaped cross section which has a tapered tip 370. An internally threaded hole 376 for threadedly receiving an externally threaded setscrew 374 is defined in an upper surface of the connecting block 358. The setscrew 374 has a tapered tip 378 which engages in a tapered notch 380 defined in the bolt 372. The columnar member 356 has grooves 384 of substantially T-shaped cross section which are defined in respective side surfaces thereof.

The connecting block 358 is mounted on the surface of a cut end of the columnar member 356 by inserting the joint pins 368 of the connecting block 358 into the respective holes 382 in the four corners of the columnar member 356 and also inserting the protrusion 364 into the through hole 360. Then, the tapered tip 370 of the bolt 372 is held against an inner circumferential surface of a tip end 386 of the protrusion 364 (see FIG. 40A). The bolt 372 has a head 388 engaging in one of the grooves 384 of another columnar member 356. Thereafter, the setscrew 374 is threaded into the internally threaded hole 376 in the connecting block 358 until the tapered tip 378 presses a slanted surface of the tapered notch 380, displacing the bolt 372 in the direction indicated by the arrow A. When the bolt 372 is displaced in the direction indicated by the arrow A, the head 388 of the bolt 372 pulls one of the columnar members 356 to the other columnar member 356 in its axial direction, thus joining the columnar members 356 to each other (see FIG. 40B). Since the tapered tip 370 of the bolt 372 spreads the tip end 386 of the protrusion 364 radially outwardly, the teeth 366a–366f on the outer circumferential surface of the tip end 386 bite into an inner circumferential surface of the through hole 360, preventing the bolt 372 from being pulled out of the through hole 360. In this manner, the columnar members 356 can easily be joined to each other.

Figure 42A:
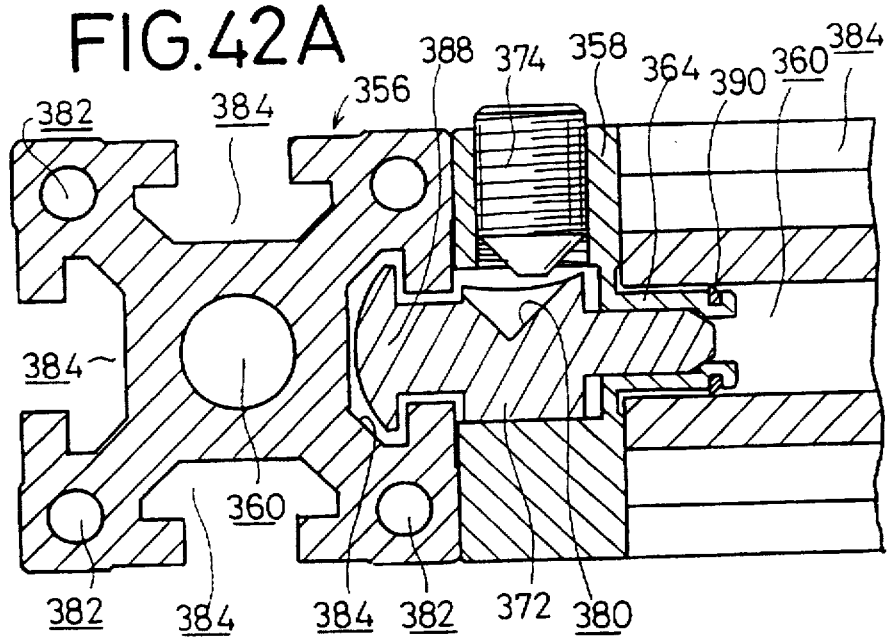
FIGS. 42A and 42B are views illustrative of a joined state of the joint means shown in FIG. 41.
Figure 42B:
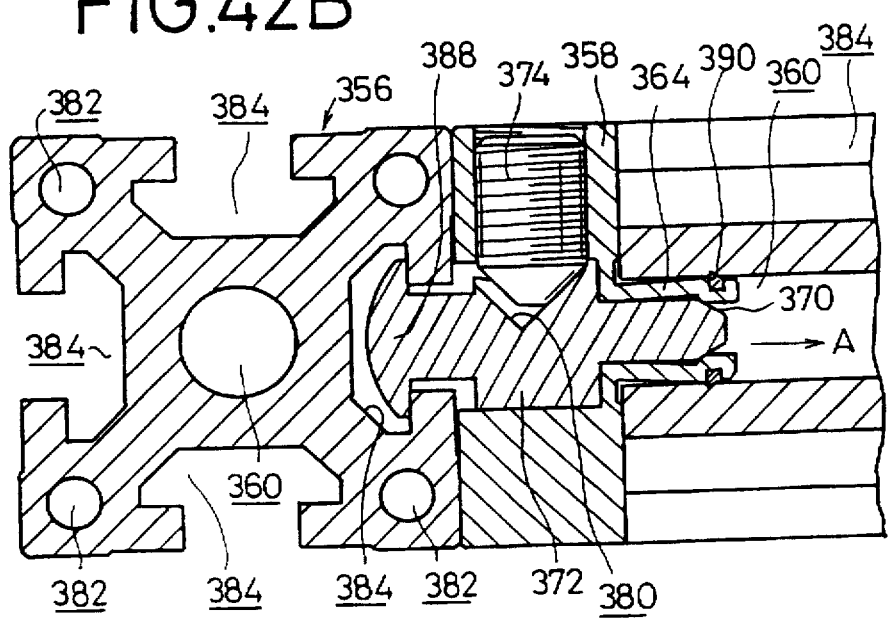

An eighth embodiment of the joint means is shown in FIGS. 41 and 42A, 42B.

The eighth embodiment differs from the seventh embodiment in that no teeth 366a–366f are provided on, but a C-ring 390 is fitted over, the outer circumferential surface of the tip end of the protrusion 364 of the connecting block 358, the C-ring 390 having spaced sharp teeth 392 on its outer circumferential surface. Because the C-ring 390 with the teeth 392 is mounted on the tip end of the protrusion 364, when the columnar members 356 which have been joined are to be separated from each other, the bolt 372 is pulled out, allowing the C-ring 390 that has been spread radially outwardly due to elastic deformation to be contracted into its original condition, whereupon the columnar members 356 can easily be disconnected from each other. Other structural details and joining operation of the joint means according to the eighth embodiment are the same as those of the joint means according to the seventh embodiment, and will not be described in detail below.

Figure 43:
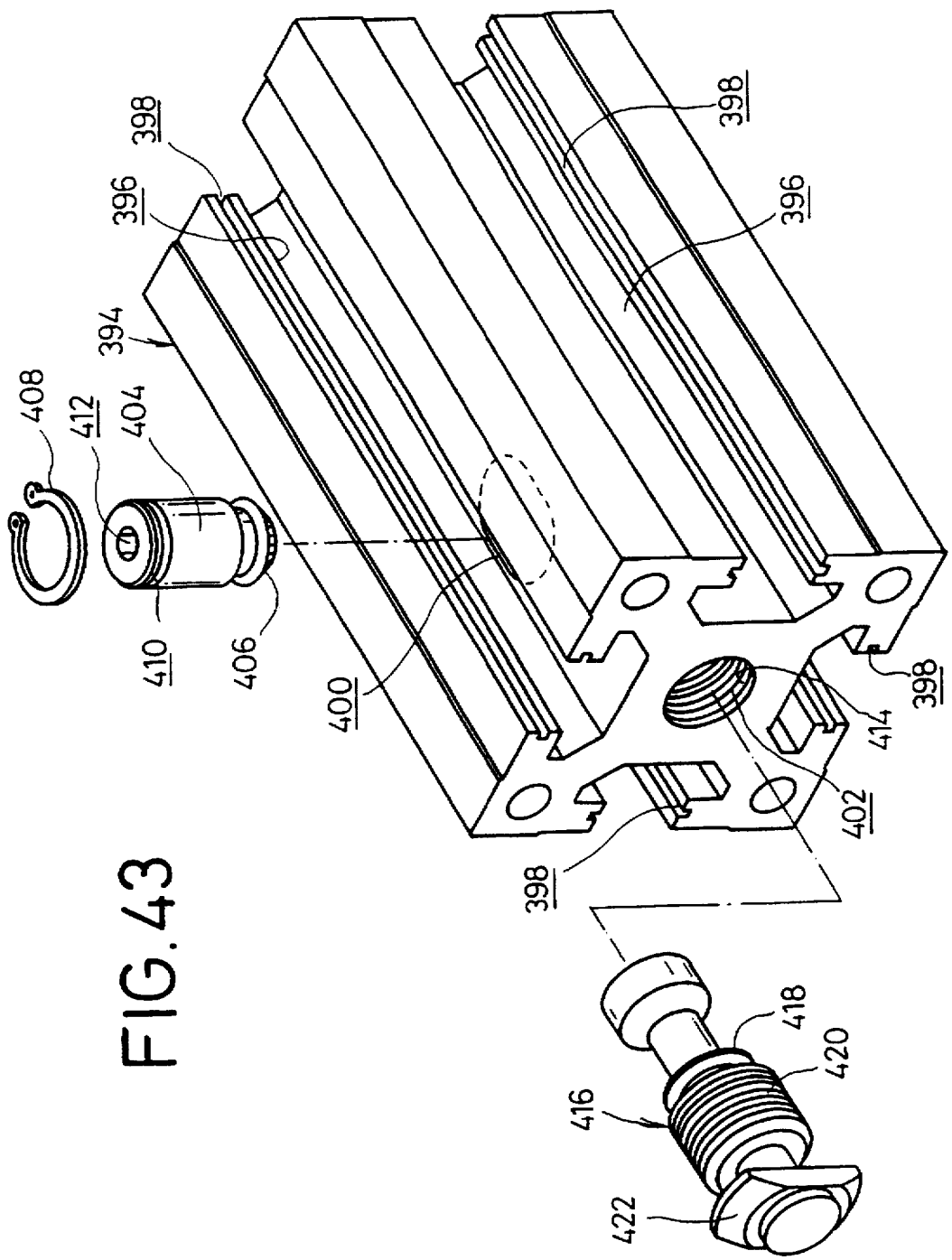
FIG. 43 is a perspective view of a ninth embodiment of the joint means.
Figure 44A:
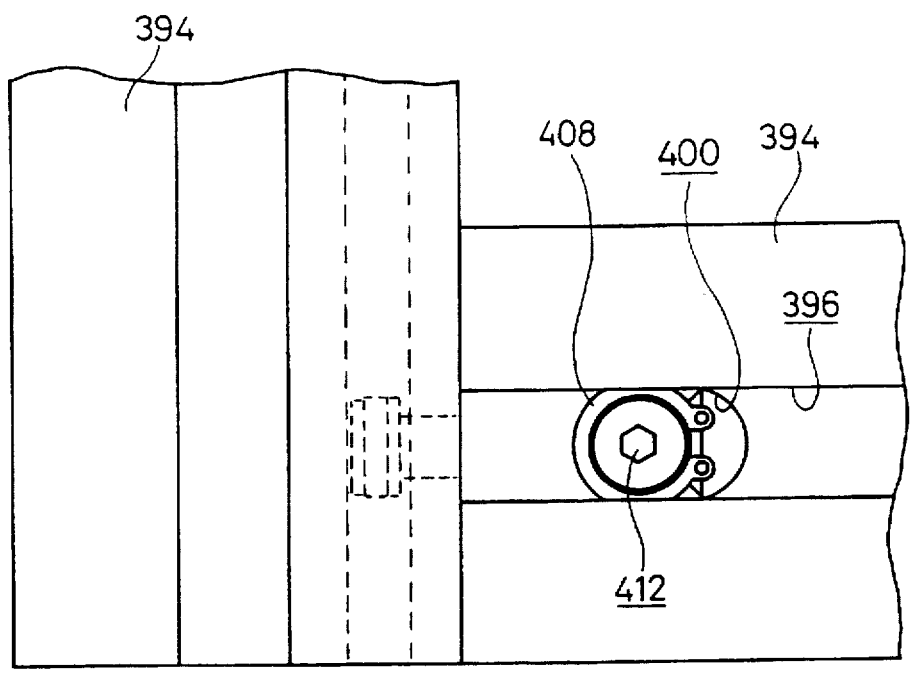
FIGS. 44A and 44B are side elevational and longitudinal cross-sectional views illustrative of a joined state of the joint means shown in FIG. 43.
Figure 44B:
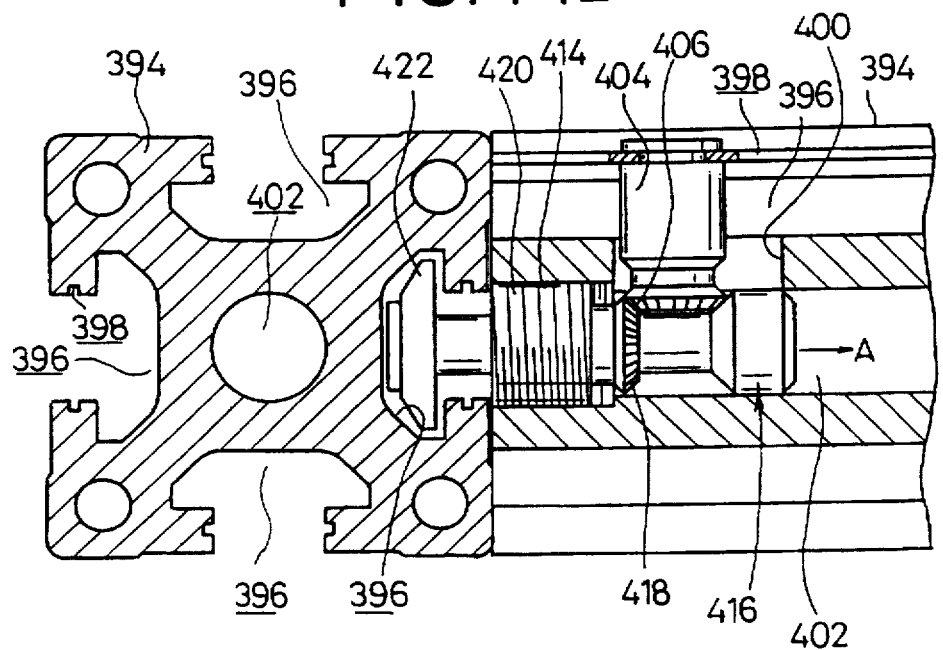

A ninth embodiment of the joint means is shown in FIGS. 43 and 44A, 44B.

Each of columnar members 394 in this embodiment has grooves 396 of substantially T-shaped cross section which are defined in outer side surfaces, respectively. Each of the grooves 396 has a pair of confronting linear grooves 398 defined in its inlet region and extending longitudinally of the columnar member 394. Each of the columnar members 394 also has a through hole 400 of substantially oblong cross section defined in the bottom of one of the grooves 396 and extending perpendicularly in communication with a through hole 402 defined axially in the columnar member 394. A holder 404 which is inserted in the through hole 400 has a first bevel gear 406 integrally disposed on a lower portion thereof, an annular groove 410 defined in an upper portion thereof for receiving a C-ring 408 therein, and a substantially hexagonal hole 412 defined in an upper end surface thereof. The columnar member 394 has an internally threaded portion 414 in the vicinity of an inlet of the through hole 402 at the surface of a cut end of the columnar member 394, and a bolt 414 is fitted in the through hole 402 through the internally threaded portion 414. As shown in FIG. 43, the bolt 416 has a second bevel gear 418 held in mesh with the first bevel gear 406 of the holder 404, an externally threaded portion 420 threaded in the internally threaded portion 414 of the through hole 402, and a head 422 engaging in one of the grooves 496 of the other columnar member 394 to be joined, the second bevel gear 418, the externally threaded portion 420, and the head 422 being integrally formed with each other.

For joining the columnar members 394 to each other, the head 422 of the bolt 416 is placed into one of the grooves 496 in one of the columnar members 394, and the bolt 416 is fitted into the through hole 402 in the other columnar member 394. Then, the holder 404 is inserted into the oblong through hole 400 defined in the bottom of one of the grooves 496 in the other columnar member 394, and the C-ring 408 fitted in the annular groove 410 of the holder 404 is mounted in the linear grooves 398 that are defined in the inlet of the groove 396, so that the holder 404 is retained against removal (see FIG. 44A). The holder 404 is then rotated in a given direction with a hexagonal wrench, for example, inserted into the hole 412 of substantially hexagonal cross section which is defined in the upper end surface of the holder 404. When the holder 404 is thus rotated, the first bevel gear 406 integral with the lower portion thereof is also rotated, rotating the second bevel gear 418 held in mesh with the first bevel gear 406. The rotation of the second bevel gear 418 threads the bolt 416 in the direction indicated by the arrow A, pulling one of the columnar members 394 toward the other columnar member 394 in its axial direction (see FIG. 44B). The columnar members 394 can therefore easily be joined to each other, and can be joined to each other reliably with a weaker torque through the first and second bevel gears 406, 418 than they are joined with each other through the contact between the tip end of the setscrew and the slanted surface of the notch in the bolt as with previous embodiments. The joint means according to the ninth embodiment is also advantageous in that any loosening of the joint between the columnar members 394 due to vibrations or shocks is reduced.

Figure 45:
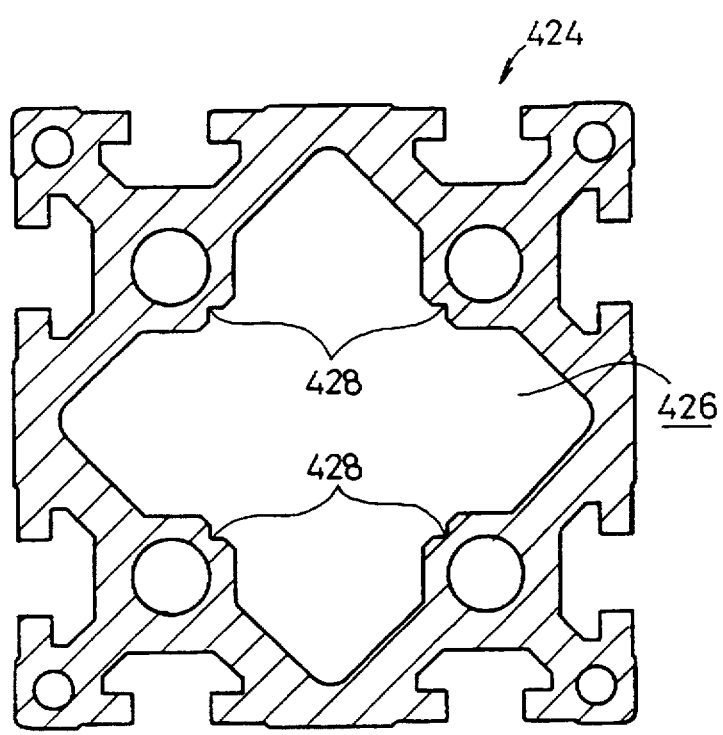
FIG. 45 is a cross-sectional view showing a through hole in a columnar member.

Applications to various pieces of equipment for conveying, machining, and assembling workpieces through the use of a through hole 426 defined centrally in a columnar member 424 having a cross-sectional shape shown in FIG. 45 will be described below.

Figure 46:
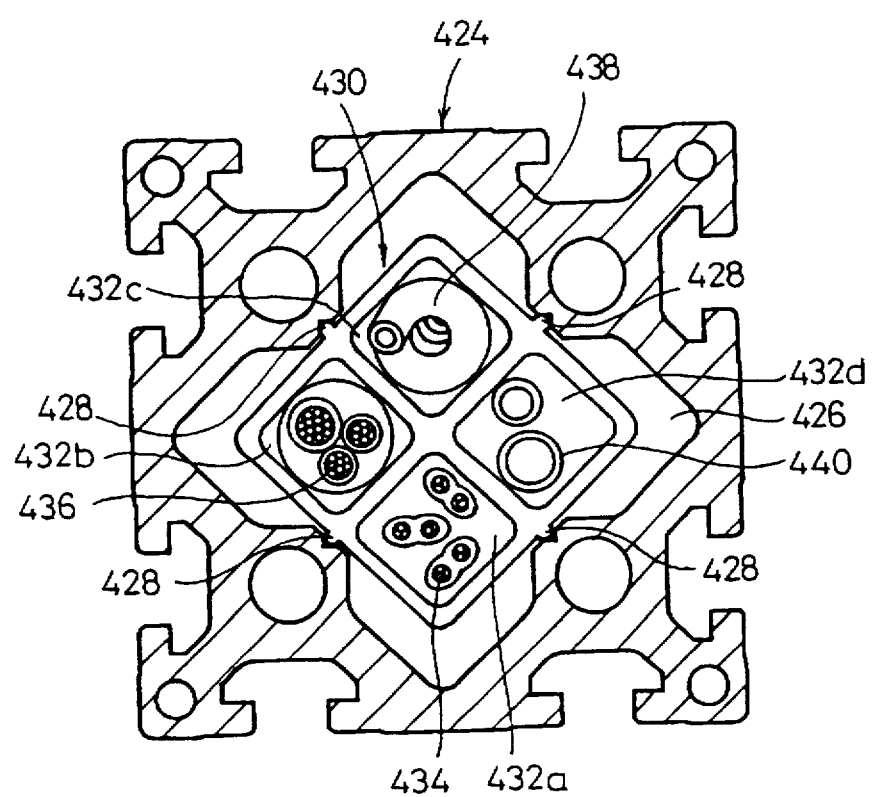
FIG. 46 is a cross-sectional view showing the through hole in the columnar member with wires, cables, and pipes inserted therein.

In FIG. 46, four grooves 428 are defined in respective inner wall surfaces of the through hole 426 in the columnar member 424. A perforated member 430 having ridges that engage in the respective grooves 428 is inserted into the through hole 426. The perforated member 430 is extrusion-molded of resin, aluminum, magnesium alloy, or the like, for example, and has a plurality of separate holes 432a–432d defined therein. The holes 432a–432d house wires 434, coaxial and optical fiber cables 436, an air pipe 438, and liquid pipes 440 respectively therein. Therefore, the columnar member 424 is sightly in appearance even if those wires, cables, and pipes are housed therein. The wires, cables, and pipes are prevented from being entangled in the holes 432a–432d and do not affect other members in the event of a leakage or breakage in the wires, cables, and pipes.

Figure 47:
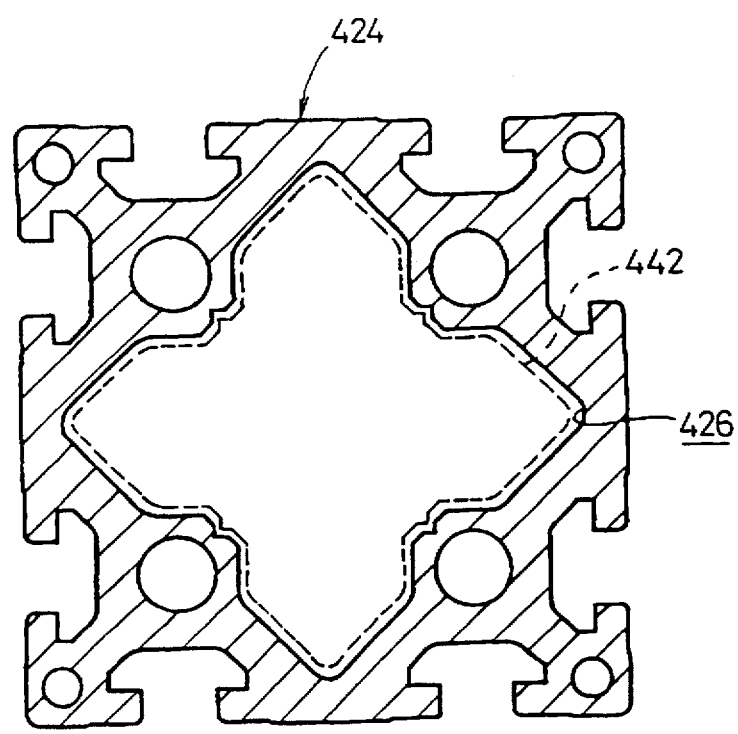
FIG. 47 is a cross-sectional view showing the through hole in the columnar member with an energy transmission passage provided therein.

As shown in FIG. 47, the inner wall surface of the through hole 426 may be coated to use the same as an energy transmission passage 442 for transmitting microwaves or the like.

Figure 48:
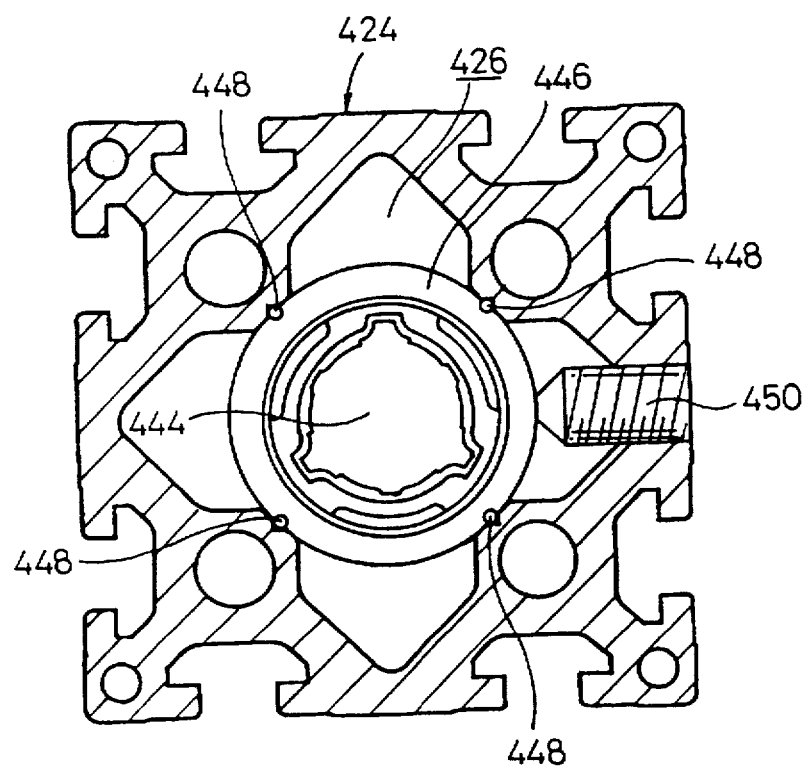
FIG. 48 is a cross-sectional view showing the through hole in the columnar member with a ball spline and a spline nut inserted therein to cause the columnar member to function as a movable body.

As shown in FIG. 48, a ball spline 444 may be employed, and the columnar member 424 itself may function as a movable body which is relatively movable through a spline nut 446. The spline nut 446 is installed in place by inserting pins 448 in grooves defined therein, bringing the pins 448 into engagement with the columnar member 424 for preventing the spline nut 446 from turning with respect the columnar member 424, and threading a setscrew 450 into the columnar member 424 from an outer side surface thereof for retaining the spline nut 446 against removal.

Figure 49A:
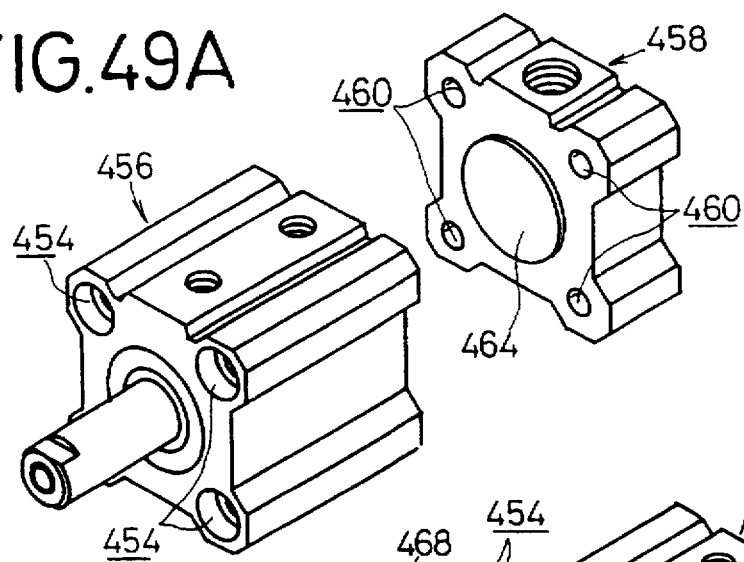
FIGS. 49A through 49C are perspective views showing a tenth embodiment of the joint means.
Figure 49B:
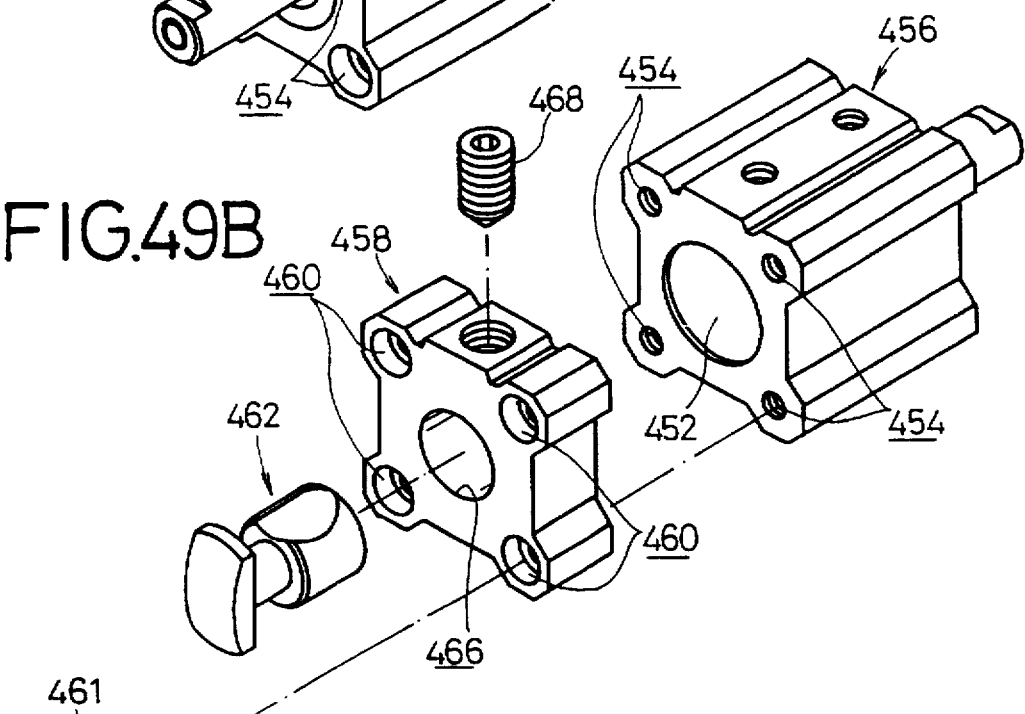
Figure 49C:
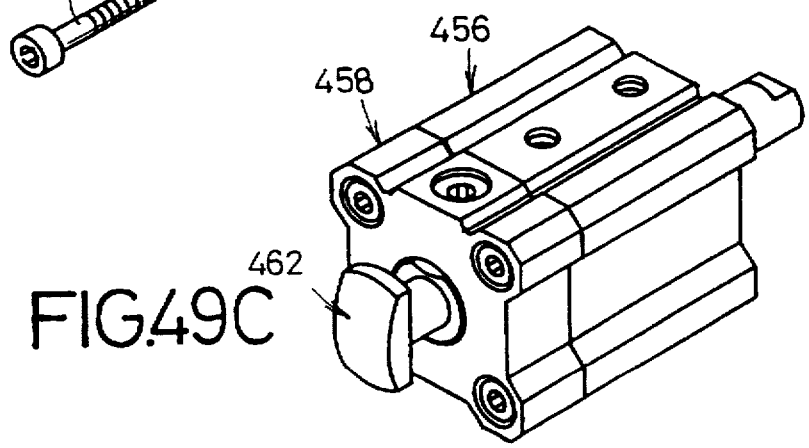

A tenth embodiment of the joint means is shown in FIGS. 49A through 49C. According to the tenth embodiment, a cylinder attachment block can easily be attached to any of various pieces of equipment for conveying, machining, and assembling workpieces, which are constructed of columnar members having grooves of substantially T-shaped cross section.

In FIGS. 49A through 49C, a pneumatic cylinder 456 having a circular recess 452 defined in a head-side end thereof and internally threaded through holes 454 defined in respective four corners thereof has heretofore been installed on any of various pieces of equipment by a bracket, bolts, or the like.

A connecting block 458 is joined to the pneumatic cylinder 456 by bolts 461 inserted into through holes 460 defined in respective four corners of the connecting block 458. When joining the connecting block 458 to the pneumatic cylinder 456, a circular land 464 on the connecting block 458 is inserted into the circular recess 452 in the pneumatic cylinder 456, thus positioning the connecting block 458 with respect to the pneumatic cylinder 456. After the connecting block 458 is joined to the pneumatic cylinder 456, a bolt 462 of substantially T-shaped cross section is inserted into a hole 466 defined in the connecting block 458. The inserted bolt 462 can easily be tightened or loosened by a setscrew 468. The pneumatic cylinder 456 and the connecting block 458 are formed by die casting or precision casting, preferably vacuum die casting, vacuum casting, a lost-wax process, extrusion, drawing, metallic powder injection molding, or ceramic forming.

An eleventh embodiment of the joint means is shown in FIGS. 50A and 50B. According to the eleventh embodiment, columnar members 470, 472 of different types are joined to each other, and a vacuum ejector system 475 with solenoid-operated valves 474 is joined to one of the columnar members 472.

FIG. 50B shows a side elevation of the columnar member 472. The columnar member 472 has attachment through holes 476, fluid passage through holes 478, and grooves 480 of substantially T-shaped cross section. The columnar member 472 is joined to the other columnar member 470 through a connecting block 482 which is sealed by gaskets or the like. For installing the solenoid-operated valves 474 and a pneumatic device such as the vacuum ejector system 475 on the columnar member 472, which may be used in any of various pieces of equipment, horizontal air outlet holes are defined in outer side surfaces of the columnar member 472. The vacuum ejector system 475 with the solenoid-operated valves 474 is then joined to the columnar member 472. The fluid passage through holes 478 are internally threaded at an open end of the columnar member 472, and connected to pipes for supplying and discharging compressed air. In this manner, the columnar member 472 may be used in the same manner as a manifold block. The compressed air can be supplied and discharged through the fluid passage through holes 478. The columnar member 472, the solenoid-operated valves 474, and the vacuum ejector system 475 are formed by die casting or precision casting, preferably vacuum die casting, vacuum casting, a lost-wax process, extrusion, drawing, metallic powder injection molding, or ceramic forming, and may integrally formed with each other in certain instances.

In the joint means for use in the actuator structural body, the ends of columnar members, an air balancer, and actuators may be formed into a polygonal cross-sectional shape such as a square or hexagonal cross-sectional shape for thereby increasing the number of side surfaces. The ends of the columnar members, the air balancer, and the actuators may also be formed into a circular or substantially circular cross-sectional shape. Desired grooves may be defined in the side surfaces, bolts may be loosely fitted in the grooves, and fastened to join the columnar members, the air balancer, and the actuators so as to extend in many directions.

The actuator structural member is constructed of the actuators and the columnar members that are joined by the joint means. A balancer mounted on one of the actuators which extends substantially vertically for reducing loads on the actuator will be described below.

Figure 51:
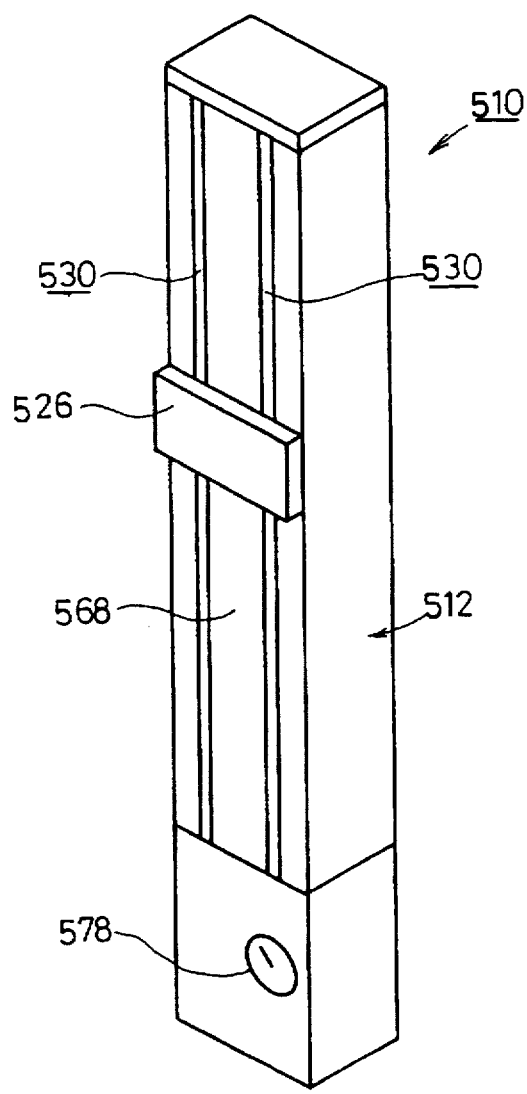
FIG. 51 is a perspective view of a first embodiment of a balancer used in the actuator structural body according to the present invention, the balancer being housed in a frame with a drive table mounted thereon.
Figure 52:
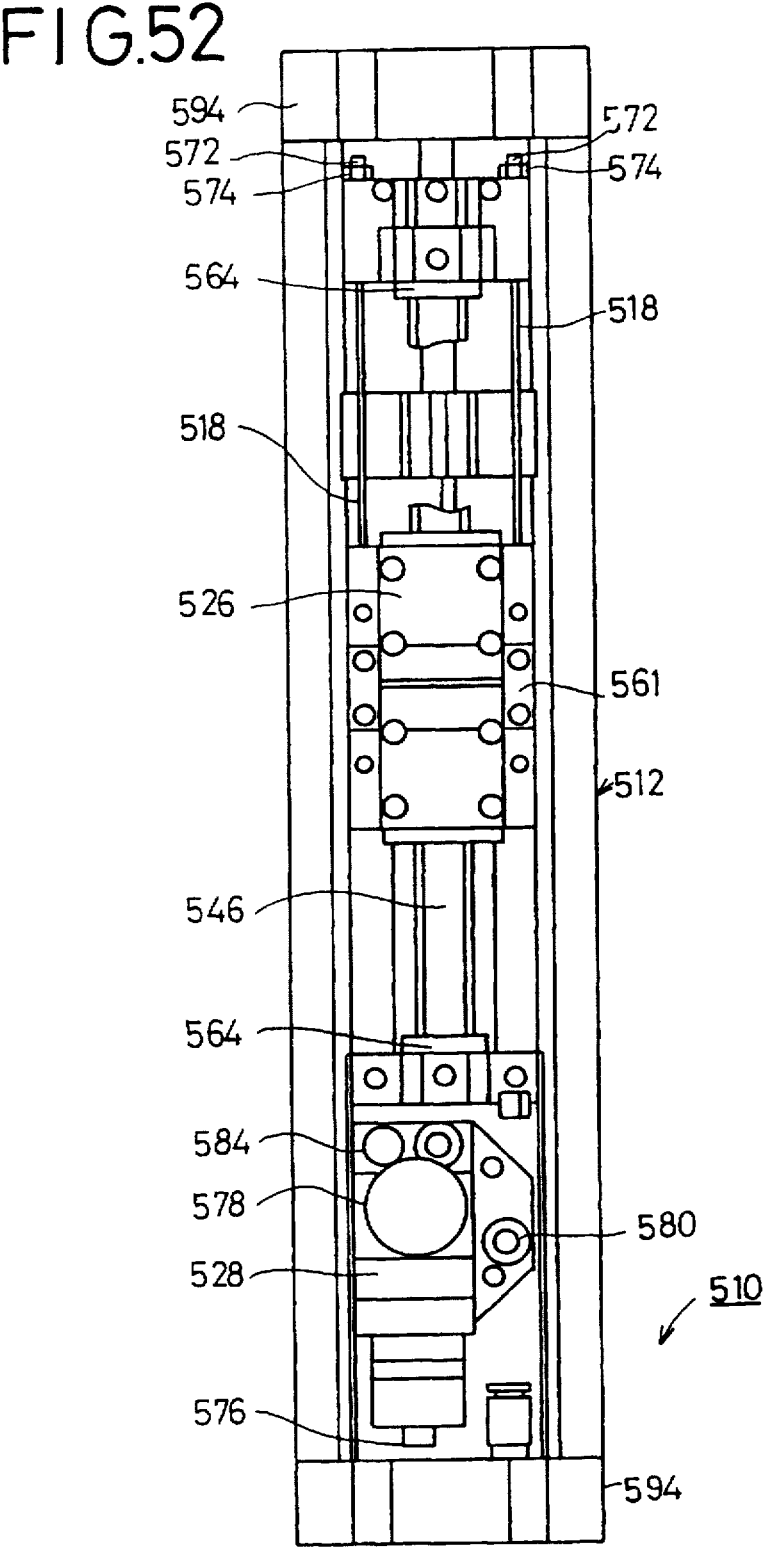
FIG. 52 is a front elevational view of the balancer shown in FIG. 51, with a cover opened.
Figure 53:
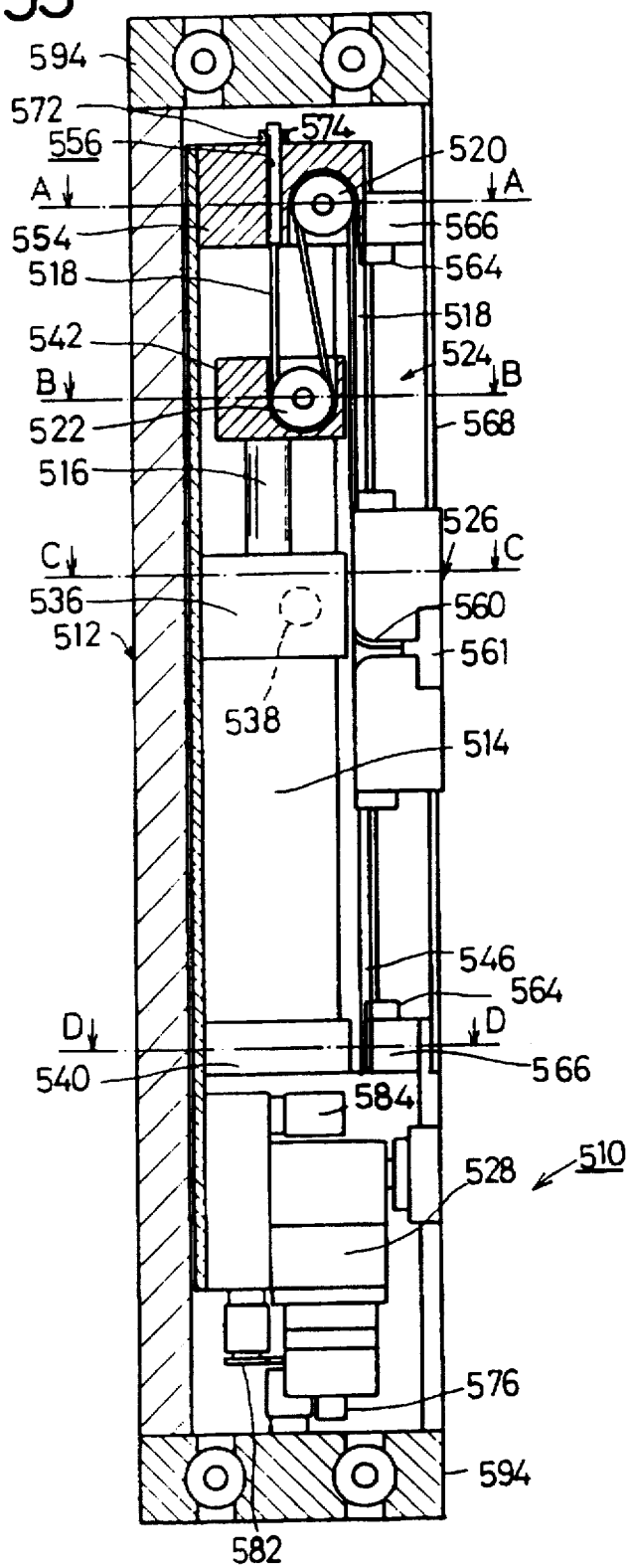
FIG. 53 is a side elevational view, partly in cross section, of the balancer shown in FIG. 52.
Figure 54:
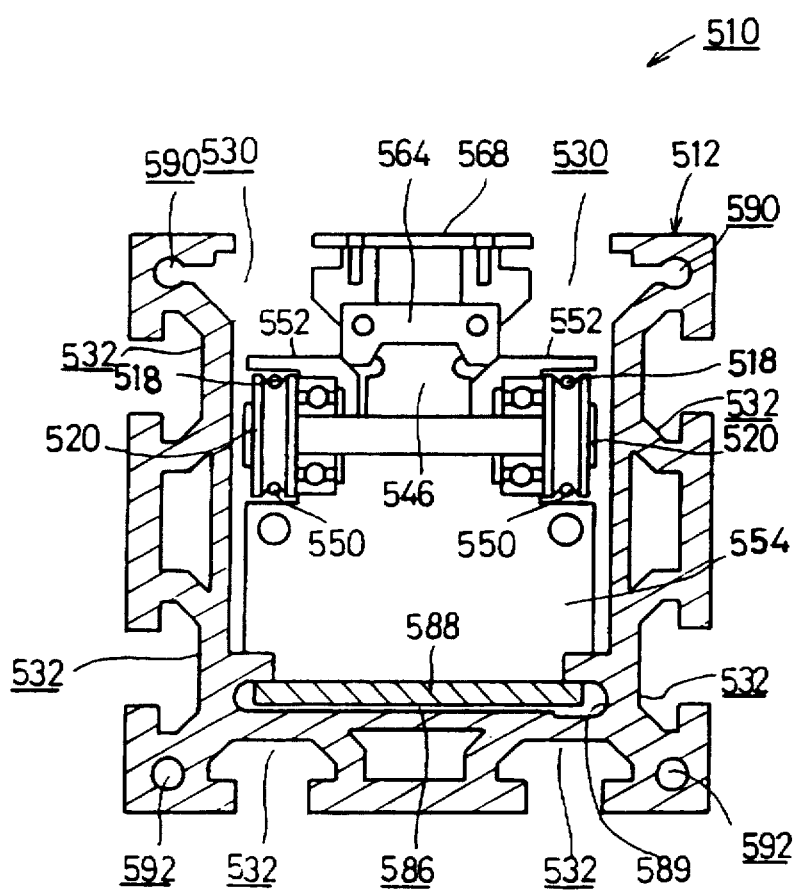
FIG. 54 is a cross-sectional view taken along line A—A across the balancer shown in FIG. 53.

FIG. 51 is a perspective view of a first embodiment of a balancer housed in a frame with a drive table mounted thereon, FIG. 52 is a front elevational view of the balancer shown in FIG. 51, with a cover opened, FIG. 53 is a side elevational view, partly in cross section, of the balancer shown in FIG. 52, and FIGS. 54 through 57 are cross-sectional views taken along lines A—A, B—B, C—C, and D—D of FIG. 53.

A balancer 510 according to the first embodiment basically comprises an outer frame 512, a cylinder 514 housed in a recess in the frame 512, a transmitting mechanism 524 having fixed pulleys 520 and drive pulleys 522 which transmit extension and contraction of a cylinder rod (hereinafter referred to as a "rod") 516 and are connected to wire ropes 518, a drive table 526 linearly displaceable by the transmitting mechanism 524, and a precision pressure-reducing valve 528 connected to a source of compressed air (not shown) for controlling the pressure of compressed air supplied to the cylinder 514.

Specifically, the recess in the frame 512 has an opening 530 defined in a side surface of a linearly extending column, and the frame 512 has grooves 532 of substantially T-shaped cross section that are defined in other side surfaces thereof than the side surface in which the opening 530 is defined. The grooves 532 serve to connect the balancer 510 to an actuator 534 (see FIGS. 60A~60E) or another balancer through a joint means, described later on.

The cylinder 514 housed in the recess in the frame 512 has a single-acting single rod 516 with members for preventing the drive pulley 522 from turning around the rod 516, a cylinder rod cover 536 disposed near the rod 516, and a drive port 538 defined in the vicinity of the cylinder rod cover 536 for supplying compressed air into a cylinder chamber (not shown). A cylinder cover 540 is disposed remotely from the rod 516.

Figure 55:
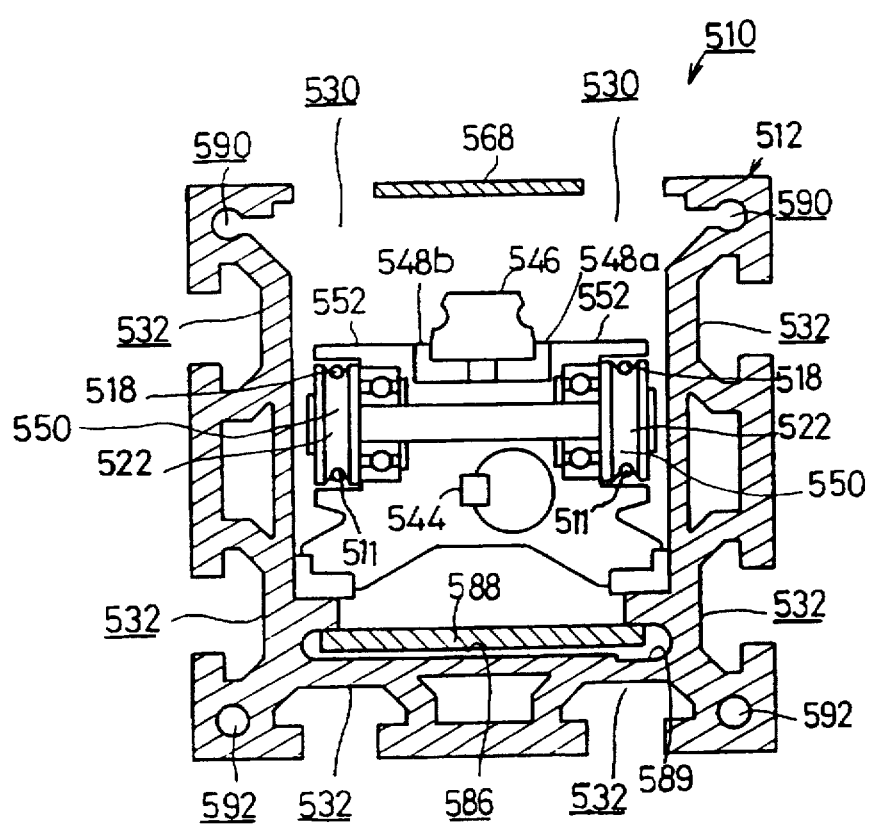
FIG. 55 is a cross-sectional view taken along line B—B across the balancer shown in FIG. 53.
Figure 56:
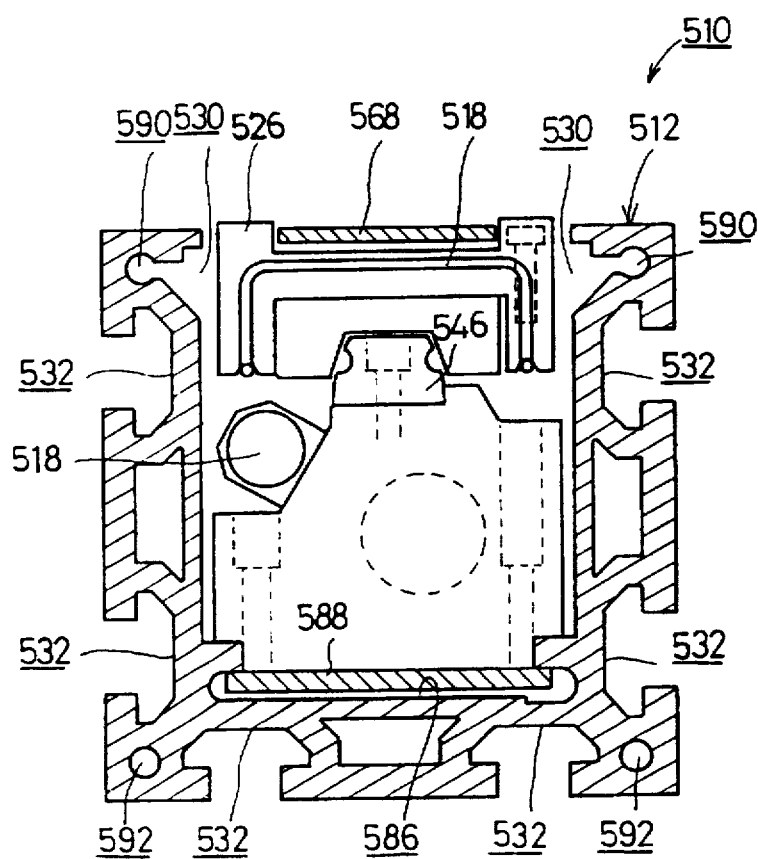
FIG. 56 is a cross-sectional view taken along line C—C across the balancer shown in FIG. 53.
Figure 57:
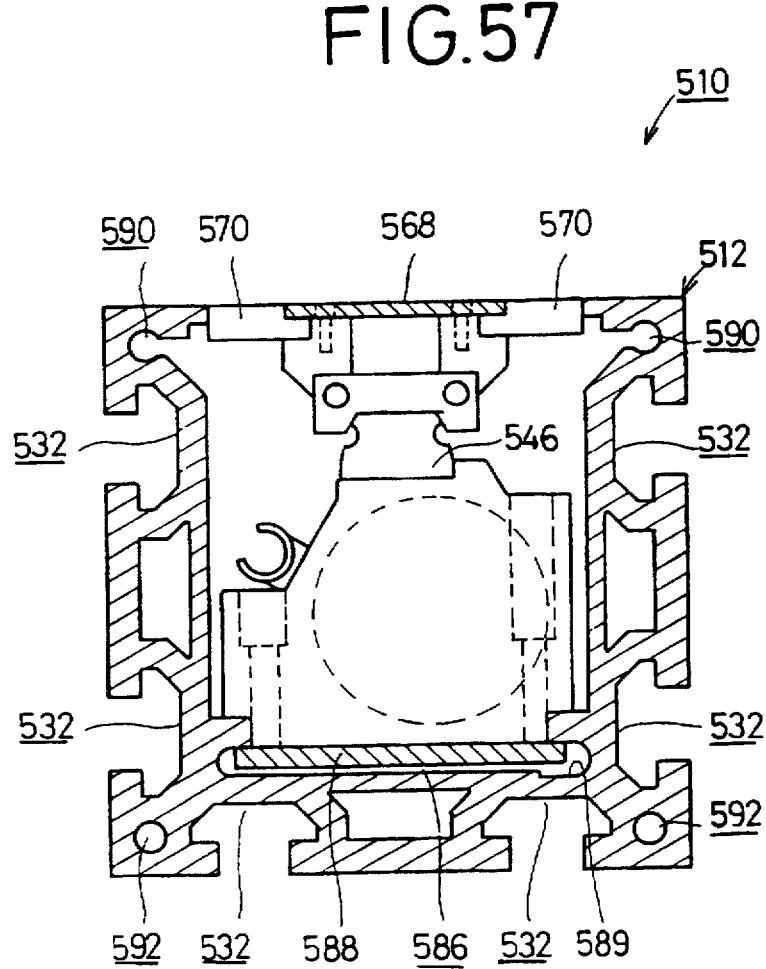
FIG. 57 is a cross-sectional view taken along line D—D across the balancer shown in FIG. 53.

The transmitting mechanism 524 for transmitting linear motion of the cylinder 514 has the drive pulleys 522 disposed in a pulley box 542 coupled to the distal end of the rod 516, and the fixed pulleys 520 operatively connected to the drive pulleys 522 through the wire ropes 518 and fixed to the frame 512. As shown in FIG. 55, the rod 516 and the pulley box 542 are held together by a key 544 for preventing them from turning with respect to each other. The pulley box 542 has guide blocks 548a, 548b held against the frame 512 and a lower surface of a guide rail 546, for preventing the pulley box 542 from turning. The guide blocks 548a, 548b are made of a self-lubricating resin such as Duracon or the like, an oleoresin, a self-lubricating soft metal, an oil-impregnated soft metal, a low-friction resin such as Teflon, or a low-friction metal.

The pulley box 542 is preferably extruded of a metal, but may be formed by drawing, metallic injection molding, ceramic injection molding, or plastic injection molding. A cylinder with guides for preventing itself from turning, or an elliptical or oblong piston cylinder may be employed for stabilizing the stroke of the pulley box 542. The pulley box 542 may be guided directly by a cam follower, a linear bearing, or the like.

The drive pulleys 522 have respective grooves defined in their outer circumferential surfaces for receiving the wire ropes 518, and are covered with a hood 552 of the pulley box 542. The hood 552 serves to prevent the wire ropes 518 from being dislodged from the grooves 550 of the drive pulleys 52. A pulley box 554 with the fixed pulleys 520 housed therein is fixedly positioned at an end of the stroke of the drive pulleys 522. The fixed pulleys 520 housed in the pulley box 554 have respective grooves 550 for receiving the wire ropes 518, and the pulley box 554 has a hood 552 for preventing the ropes 518 from being dislodged from the grooves 550.

The pulley box 554, to which ends of the wire ropes 518 are fixed, has holes 556 defined therein for adjusting the stroke of the drive pulleys 522. The pulley box 554, the cylinder rod cover 536, and the cylinder cover 540 are fixed to the guide rail 546 for the drive table 526, and are rendered integral with the cylinder 514 and the pulley box 542 through the guide rail 546.

The drive table 526 is mounted on the guide rail 546 and has a groove 560 and a holder 561 for securing the wire ropes 518. If the balancer 510 is connected to the actuator 534, then the drive table 526 is joined to a table of the actuator 534 by a joint table 562 (see FIGS. 60A–60E). If the balancer 510 is used as being separate from the actuator 534 or used singly by itself, then the balancer 510 may directly carry a workpiece. The drive table 526 is formed of the same material in the same manner as the drive pulley box 542.

The balancer 510 according to this embodiment has the drive table 526, the guide rail 546, and the frame 512, which are highly rigid, in order to reinforce the body rigidity and the moment-resistant rigidity of the guide rail at the time the actuator 534 is moved over a vertical stroke, and also to allow the balancer 510 to be used singly.

However, if it is not necessary to avoid a reduction in the service life caused by insufficient parallelism between a guide rail of the actuator 534 and the guide rail 546 of the balancer 510 when they are installed, or to avoid insufficient rigidity at the time the actuator 534 is moved over a vertical stroke, or if it is not necessary to use the balancer 510 singly, or if drive units of the actuator 534 and the balancer 510 integrally on the common frame 512 (see a third embodiment described below), then the drive table 526, the guide rail 546, and the frame 512, which are highly rigid are not required. In such a case, the drive table 526 is connected to an actuator cable or a workpiece by a flexible joint only through vertical positioning for preventing the guide rail of the actuator 534 from being shortened in service life.

Alternatively, it is possible to guide the drive table 526 for movement over its stroke with a linear slide bearing, a cam follower, or the like as with the drive pulley box 542 for thereby intentionally lowering the rigidity to maintain a desired service life, reduce the weight, and lower the cost.

The drive table 526 may be dispensed with, and the wire ropes 518 may be fixed directly to the actuator 534 or a workpiece, so that the balancer 510 can greatly be reduced in weight and cost.

An end block 566 with a cushion 564 is disposed on an end of the guide rail 546 for the drive table 526 for preventing a workpiece from being dislodged due to the lack of a vertical resistive load which results from a failure such as a breakage of the wire ropes 518, the stoppage of air supplied to the cylinder 514, or the like.

The cushion 564 is made of urethane. However, a shock resistant or absorbing resin, a spring, a shock absorber, or the like may be used as the cushion 564 depending on a vertical load applied thereto.

To the end block 566, there are attached a drive unit cover 568 and pneumatic pressure regulator covers 570 of the balancer 510.

Drive forces produced by the cylinder 514 are transmitted to the drive table 526 by the wire ropes 518. At this time, a stroke which is twice the stroke of the cylinder 514 is imparted to the drive table 526 by the drive pulleys 522 and the fixed pulleys 520.

Therefore, the stroke of the cylinder 514 may be about one half of the stroke of the balancer 510. As a consequence, the balancer 510 can be reduced in size, and it is not necessary for the balancer 510 to have a projected portion when it operates over its stroke. The stroke of the cylinder 514, which is one half of the stroke of the balancer 510, allows the internal pressure of the cylinder 514 to change to a smaller degree when the cylinder 514 operates over its stroke. This is highly advantageous for the control of the internal pressure of the cylinder 514.

On the other hand, the output power of the cylinder 514 is twice the output power of the balancer 510. However, if the pneumatic pressure supplied to the cylinder 514 is increased to produce an increased output power, then the speed of flow of air can be increased under the high pneumatic pressure, which is advantageous for the control of the internal pressure of the cylinder 514.

The wire ropes 518 have externally threaded terminals 572 on their opposite ends which extend through the two fixing holes 556 in the fixed pulley box 554 and are fixed in position by nuts 574. The wire ropes 518 have intermediate portions placed in the fixing groove 560 in the drive table 524 and secured by the holder 561.

The stroke of the drive table 526 is adjusted by using wire ropes 518 having different lengths. The stroke of the drive table 526 can be finely adjusted by the externally threaded terminals 572 and the nuts 574. Alternatively, an adjusting mechanism for adjusting the stroke of the drive table 526 may be mounted on the drive table 526. Inasmuch as the wire ropes 518 have a relatively small cross-sectional area with respect to tensile loads imposed thereon and can be bent three-dimensionally, the pulleys can be desired and positioned with high freedom, making it possible to reduce the size of the double-speed mechanism.

The wire ropes 518 are in the form of twisted wires of stainless steel which are coated with polyurethane, Teflon, nylon, or the like that is impregnated with wear resistant oil. However, the wire ropes 518 may comprise twisted wires of tungsten, fibers of polyimide, twisted wires of amorphous metal, twisted wires of resin, twisted wires of a composite material, or the like.

If the wire ropes 518 are only required to be bent two-dimensionally, then they may be replaced with belts of amorphous metal, wire belts, chains, rubber belts, or the like. With the balancer 510 according to this embodiment, a vertical load is applied to the right as shown, subjecting the rod 516 to a tensile load at all times. Accordingly, the rod 516 is prevented from being buckled even when it is moved over a large stroke. Drive forces which are resistant to the vertical load are generated under the internal pressure of the cylinder 514, and have to be controlled at a constant level at all times.

The balancer 510 has the precision pressure-reducing valve 528 for adjusting the pneumatic pressure in the cylinder 514. The internal pressure of the cylinder 514 can be set to a desired level depending on the vertical load by an adjustment screw 576 of the precision pressure-reducing valve 528. The internal pressure of the cylinder 514 can be confirmed by a pressure gage 578. The drive port 538 of the cylinder 514 is connected to an output port 580 of the precision pressure-reducing valve 528. When the volume of the cylinder chamber in the cylinder 514 increases as the balancer 510 operates over its stroke and the internal pressure of the cylinder 514 drops below a preset pressure, the precision pressure-reducing valve 528 operates to supply compressed air from a compressed air supply port 582 quickly into the cylinder 514. When the volume of the cylinder chamber decreases and the internal pressure of the cylinder 514 rises above the preset pressure, compressed air in the cylinder 514 is discharged from a discharge port 584 into the atmosphere.

The precision pressure-reducing valve 528 may be replaced with a servovalve such as an electropneumatic proportional valve, a controller, and a sensor (not shown). In such a case, drive forces may be established and adjusted by a drive force sensor, or may automatically be controlled in a mode of setting a resistive load by a vertical load sensor. Alternatively, the internal pressure of the cylinder 514 may be controlled depending on a motor position or a motor load through communications with a motor controller (not shown) for the actuator 534.

Rather than controlling the internal pressure of the cylinder 514 at a constant level, the drive forces may intentionally be increased or reduced in the direction to drive the actuator 534 for thereby bearing not only the vertical load but also drive forces due to the vertical acceleration. The balancer 510 thus arranged is rendered more active, resulting in a pneumatic-electric composite system which is composed of the cylinder 514 and a motor.

Figure 58:
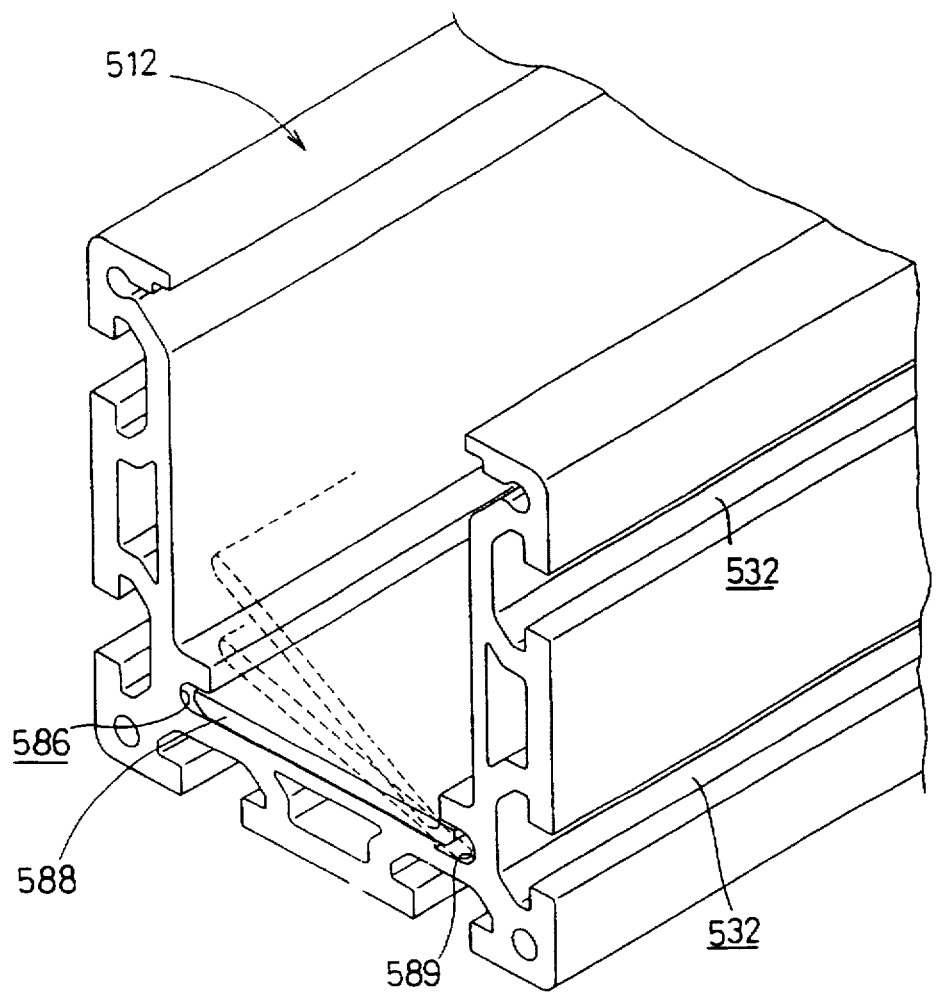
FIG. 58 is a schematic perspective view showing a clearance in the bottom of the frame.
Figure 60A:
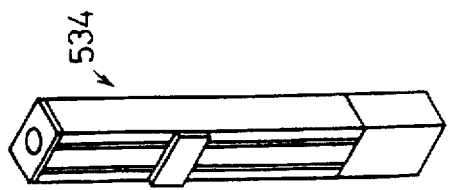
FIGS. 60A through 60E are schematic perspective views showing respective combinations of the balancer and the actuator.
Figure 60B:
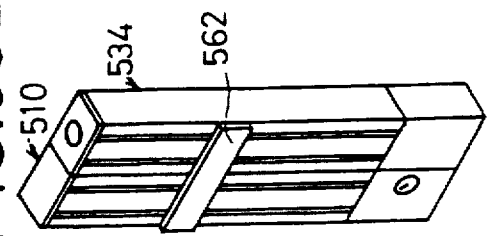
Figure 60D:
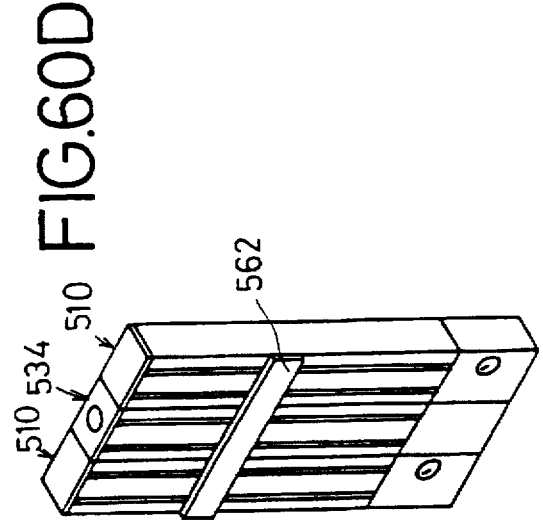
Figure 60C:
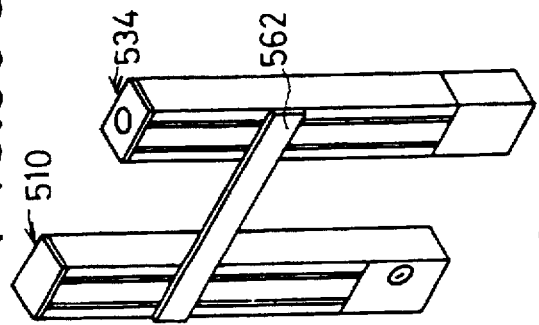
Figure 60E:
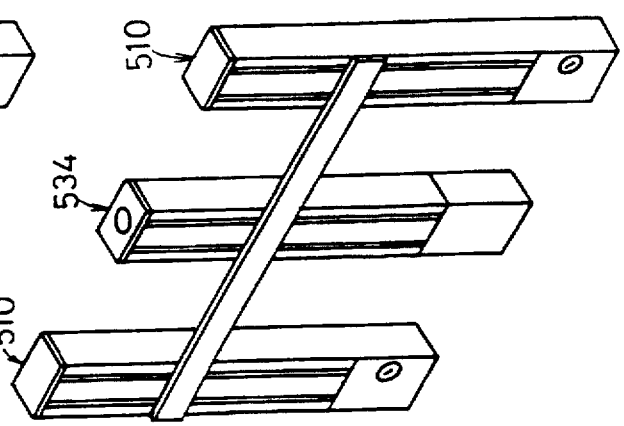

The balancer drive unit and the precision pressure-reducing valve 528 which are integrally combined with each other by the guide rail 546 are fastened by screws or the like to a plate 588 that is inserted in a rail-like groove 586 defined in the inner bottom of the frame 512. As shown in FIG. 58, the rail-like groove 536 has a clearance 589 for permitting the plate 588 to be inserted obliquely from the opening 530 in the frame 512. This arrangement allows structures on the plate 588 to be freely disposed, together with the plate 588, longitudinally in the frame 512. The clearance 589 is useful not only for adjusting the stroke of the balancer 510, but also for fixing the plate 588 at any desired position in the frame 512 which has a sufficient length or placing a plurality of plates at any desired positions in the frame 512.

The frame 512 has the grooves 532 or T slots defined in opposite outer side surfaces and an outer bottom surface, and can easily be installed by T bolts (described later on) to an attachment surface without limitations thereon. The frame 512 is made by extrusion, drawing, metallic injection molding, ceramic injection molding, or the like. End blocks 594 are fastened to opposite ends, respectively, of the frame 512 by screws threaded into cylindrical grooves 590 and holes 592.

As shown in FIG. 59, the balancer 510 can be joined to a frame 512 of the actuator 534 which is of the same shape as the frame 512 of the balancer 510 and has grooves 532 of substantially T-shaped cross section that are defined in an outer side surface thereof. Each of the end blocks 594 of the balancer 510 has two horizontal holes 591 for T bolts 593. The T bolts 593 have larger-diameter portions 595 fitted respectively in larger-diameter holes 597 defined in the end block 594. When nuts 599 with hexagonal holes which are inserted from holes remote from the larger-diameter holes 597 are threaded over the T bolts 593, the T bolts 593 join the balancer 510 and the actuator 534 to each other.

The larger-diameter holes 597 defined in the end block 594 are symmetrical with respect to a central axis of the end block 594. Therefore, the balancer 510 can be attached to either one of opposite side surfaces of the actuator 534. Attaching the actuator 534 and the balancer 510 to each other through the grooves 532 of substantially T-shaped cross section in the direction of their stroke requires the stroke of the actuator 534 and the balancer 510 to be adjusted.

FIGS. 60A through 60E show pneumatic double-speed balancers of compact configuration according to the present embodiment which are joined to various actuators by the process of variously and easily adjusting the stroke and the simple means for attaching them with the grooves 532 of substantially T-shaped cross section, the pneumatic double-speed balancers being capable of bearing vertical loads and imparting high frame and guide rigidity.

Based on the above features, the number of balancers 510 joined to the actuator 534 can be increased or reduced to largely adjust the ability to bear the vertical load. The balancer 510 may be used singly because of its high frame rigidity, guiding capability, and installability, or may be spaced from the actuator 534 in an arrangement depending on the load to be borne.

Figure 61:
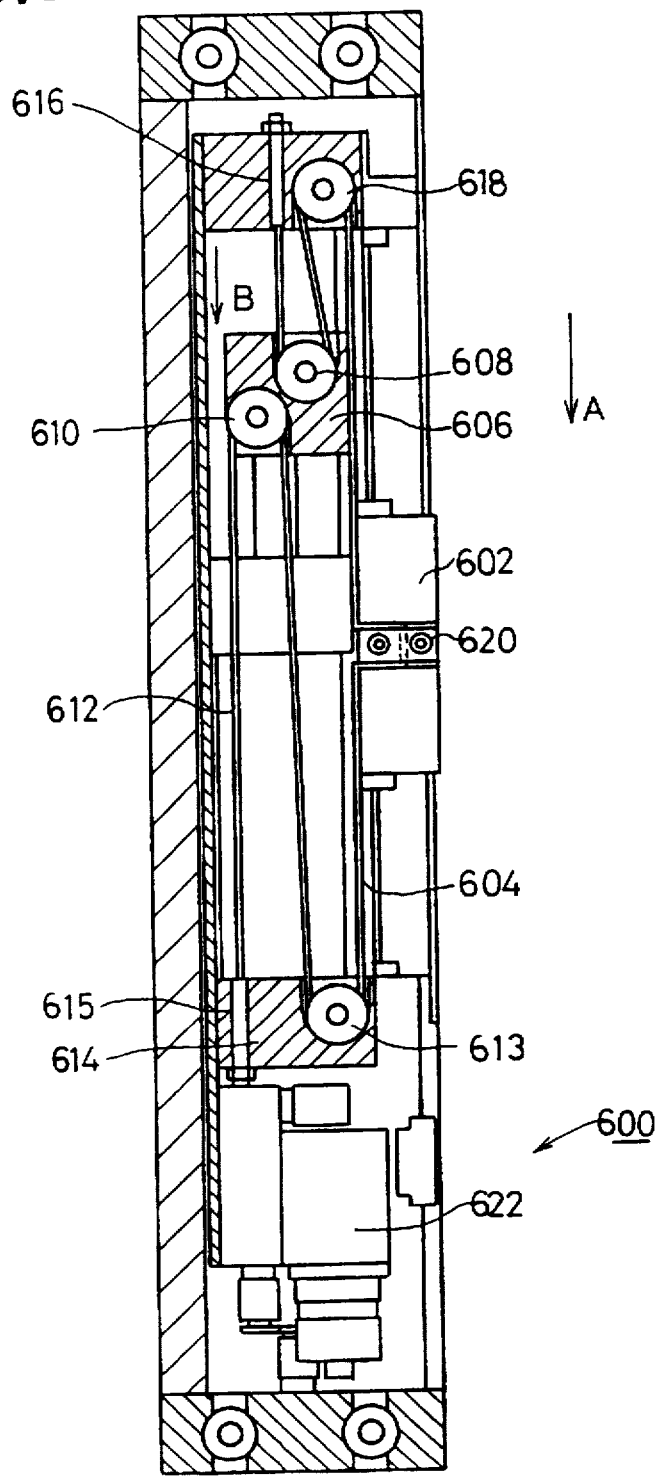
FIG. 61 is a partly cross-sectional view of a second embodiment of the balancer.

FIG. 61 shows a second embodiment of the balancer. Those components in this and following embodiments which are identical to those of the balancer according to the first embodiment are denoted by identical reference numerals, and will not be described in detail below. In a double-speed mechanism which employs pulleys, wire ropes 518 may be dislocated from the pulleys when they are slackened or subjected to a load in a direction opposite to the vertical load or not subjected to any load. According to the first embodiment, the wire ropes 518 are prevented from being dismounted from the pulleys by the hoods 552 covering the fixed pulleys 520 and the drive pulleys 522.

According to the second embodiment, a balancer 600 is of such a structure as to give tension to wire ropes 604 at all times irrespective of the position of a drive table 602 and the load condition, for thereby preventing the wire ropes 604 from being dislocated. A drive pulley box 606 has first and second drive pulleys 608, 610.

The balancer 600 includes a cylinder 612 having a head cover 614 serving as a second fixed pulley box which houses second fixed pulleys 613 and has second wire rope fixing holes 615.

The wire ropes 604 have ends fixedly mounted in first wire rope fixing holes 616, are trained around the first drive pulleys 608 and first fixed pulleys 618, and are fixed to a wire fixing block 620 of the drive table 602. The wire ropes 604 are also trained around the second fixed pulleys 613 and the second drive pulleys 610, and have opposite ends fixedly mounted in the second wire rope fixing holes 615.

The balancer 600 according to the second embodiment, which is of the above structure, operates as follows:

A vertical load is applied in the direction indicated by the arrow A in FIG. 61. Drive forces produced when the cylinder 612 pulls its cylinder rod are transmitted by the wire ropes 604 through the first drive pulleys 608 and first fixed pulleys 618 to the drive table 602 to move the drive table 602 over a stroke which is twice the stroke of the cylinder 612, as with the first embodiment.

At this time, the second drive pulleys 610 move toward the second fixed pulleys 613, causing the wire ropes 604 to extend by a length which is twice the stroke of the cylinder 612, i.e., which is equal to the distance that the drive table 602 moves, from the drive table 602 to the second fixed pulleys 613.

When the drive table 602 is moved in a direction opposite to the vertical load while no drive forces are being produced by the cylinder 612, the wire ropes 604 from the drive table 602 transmit forces through the second fixed pulleys 613 to the second drive pulleys 610 which move the drive pulley box 606 in the direction indicated by the arrow B. The first drive pulleys 608 now take up the wire ropes 604 by a length equal to the distance that the drive table 602 moves, from the drive table 602 to the first fixed pulleys 618.

Consequently, the wire ropes 604 are kept under tension at all times regardless of the load and the position of the drive table 602.

The stroke of the drive table 602 can greatly be varied with ease by varying the position in which the wire ropes 604 are fixed to the drive table 602.

If the ports of the cylinder 612 are modified to convert the cylinder 612 to the rod-pushing type, then the cylinder 612 can generate drive forces in the opposite direction, making it possible to use the balancer 600 upside down. This allows a precision pressure-reducing valve 622 and a stroke to be freely selected.

If the cylinder 612 is of the double-acting type, then it may be used as a rodless cylinder having a horizontal stroke, which may be incorporated in a pneumatic-electric composite drive system which is composed of a servovalve, a controller, and an electric actuator as shown in the first embodiment, for pneumatically moving a workpiece and electrically positioning the workpiece.

In such a case, the workpiece which is being moved may be decelerated by magnetic braking with a motor (not shown). The wire ropes of the double-speed mechanism may also be prevented from being dislocated from the pulleys by spring forces which cause the cylinder 612 to generate sufficient drive forces in a direction to tension the wire ropes 604 at all times. In FIG. 61, for example, a spring may be contained in the cylinder 612 to apply drive forces in a direction to contract the rodless cylinder for imparting rightward forces to the drive pulley box 606 at all times thereby to prevent the wire ropes 604 from being dislodged due to slackening. Alternatively, tensioners for tensioning the ropes or belts may be provided.

Since the vertical resistant load is borne by only the ropes or belts, an automatic brake system or the like is needed particularly when the balancer is subjected to heavy loads, for safety precautions in the event of a breakage of the ropes or belts.

Figure 62:
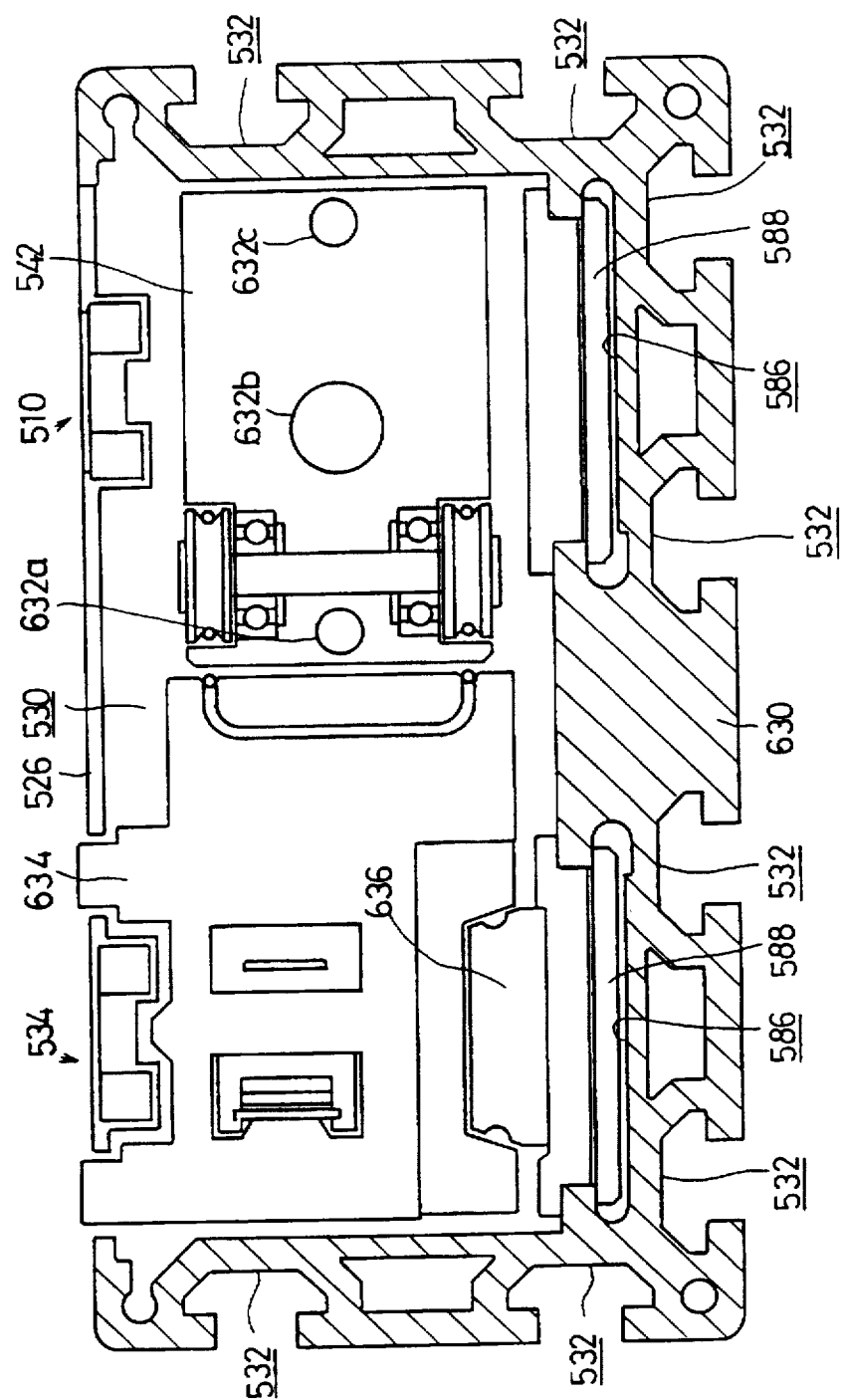
FIG. 62 is a partly cross-sectional view of a balancer and an actuator that are assembled together in a frame.

A third embodiment in which a balancer and a balancer drive unit are integrally disposed in a common frame is shown in FIG. 62.

In FIG. 62, the inner bottom surface of an opening defined in an integral common frame 630 has two substantially parallel grooves 586 for inserting plates 588 on which drive units of an actuator 534 and a balancer 510 are fixedly mounted. The drive units are fixedly disposed in the frame 630 through the plates 588. The frame 630 has grooves 532 of substantially T-shaped cross section which are defined in outer side surfaces thereof.

The balancer 510 has a pulley box 542 fixed to distal ends of rods 632a, 632b, 632c of cylinders with guides (not shown). The pulley box 542 is prevented from being turned by a mechanism (not shown). The balancer 510 has a drive table 634 shared by the actuator 534. Wire ropes 518 are affixed to the actuator drive table 634. A workpiece is vertically guided by a guide rail 636 of the actuator 534. Therefore, the guide rail 636 should preferably be of high rigidity.

According to this embodiment, the drive table 634 of the balancer 510, the guide rail 636, and the frame 630 are shared by the actuator 534, resulting a greatly reduced weight and cost. With the actuator 534 and the balancer 510 disposed in the common frame 630, the balancer 510 may be small in size with respect to the entire length of the actuator 534.

Arrangements in which actuators and the balancer 510 according to the first embodiment are juxtaposed are shown in FIGS. 63 through 68.

Figure 63:
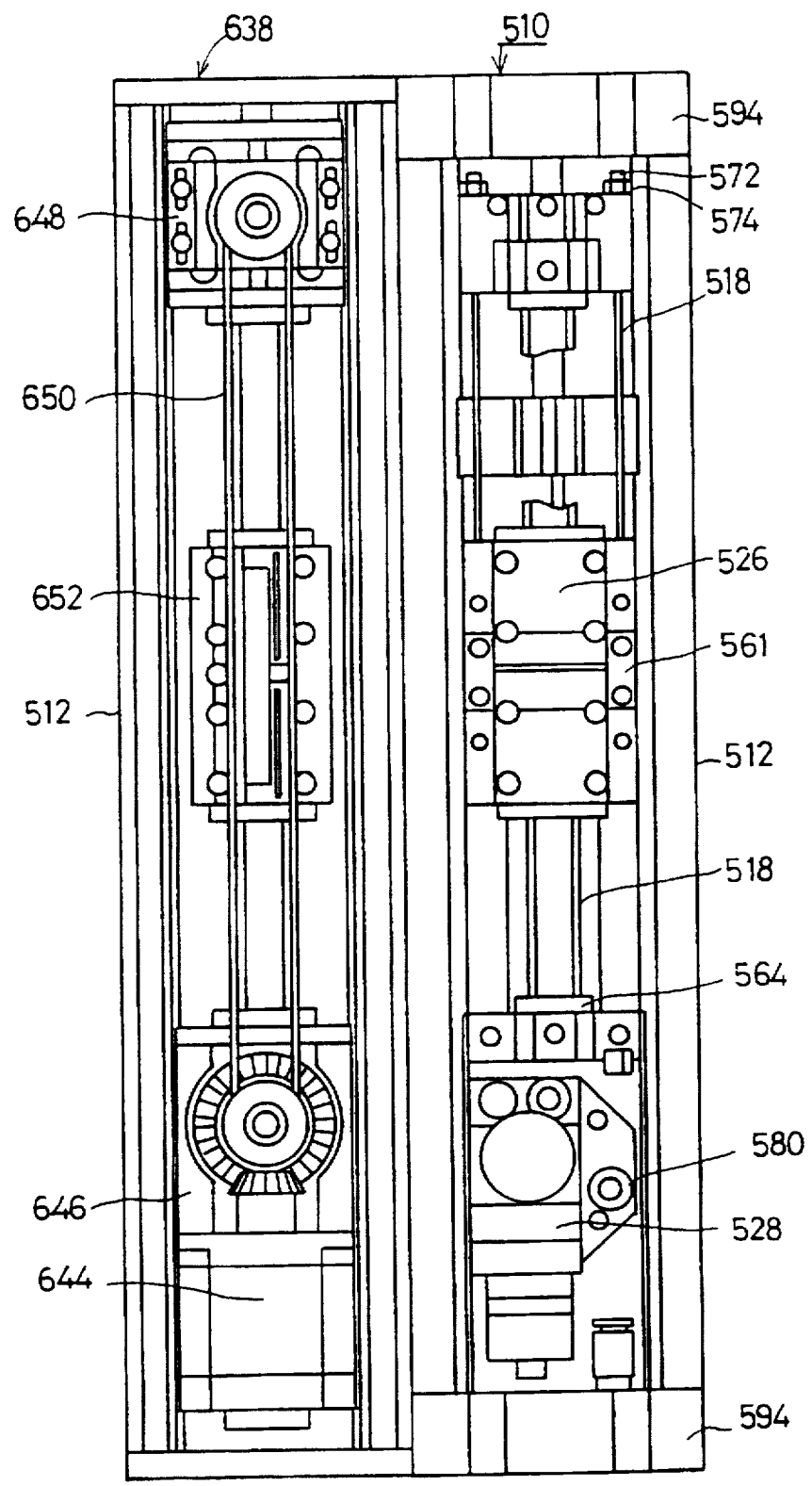
FIG. 63 is a front elevational view, partly cut away, of a balancer and an actuator that are juxtaposed, with a cover opened.
Figure 64:
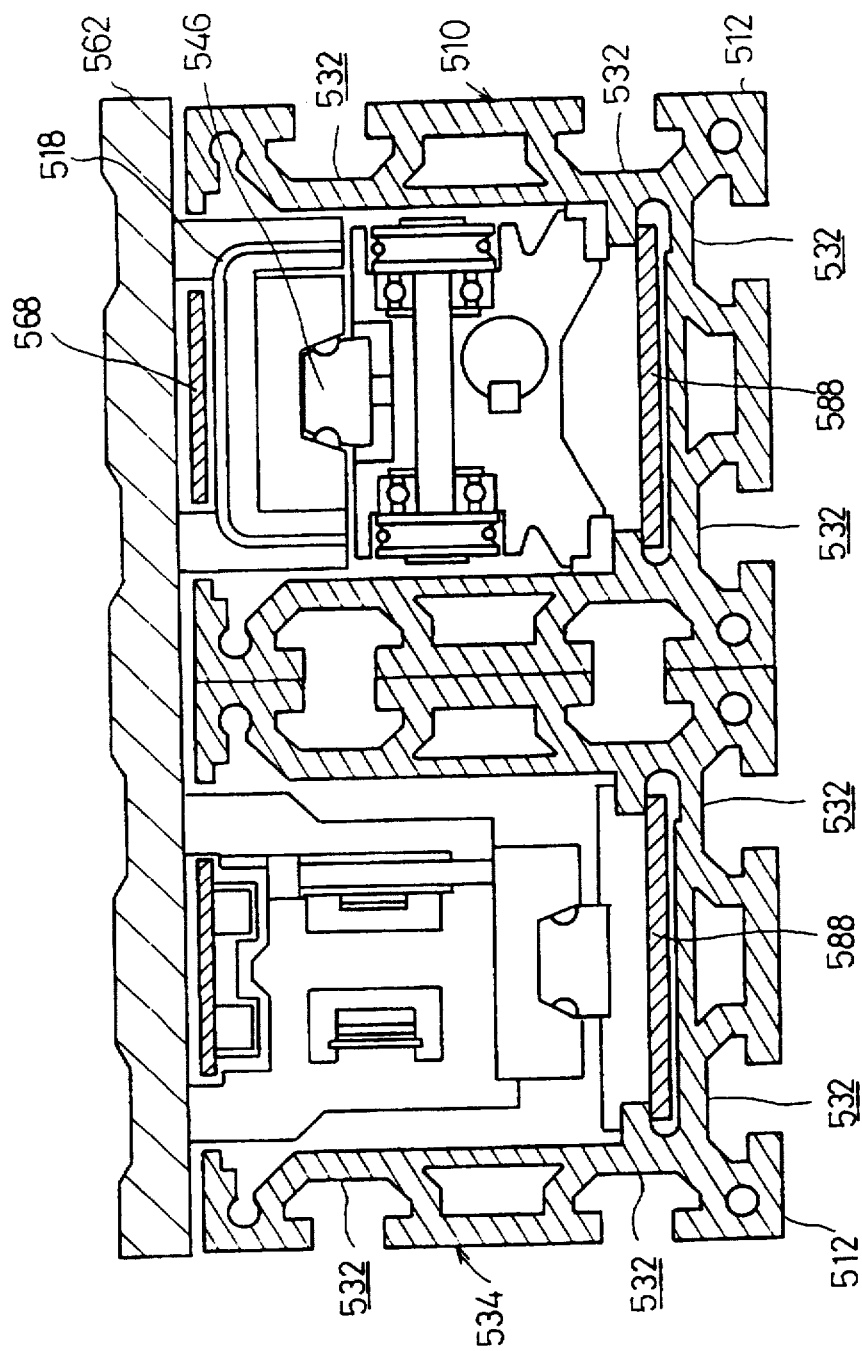
FIG. 64 is a transverse cross-sectional view of the balancer and the actuator shown in FIG. 63.
Figure 65:
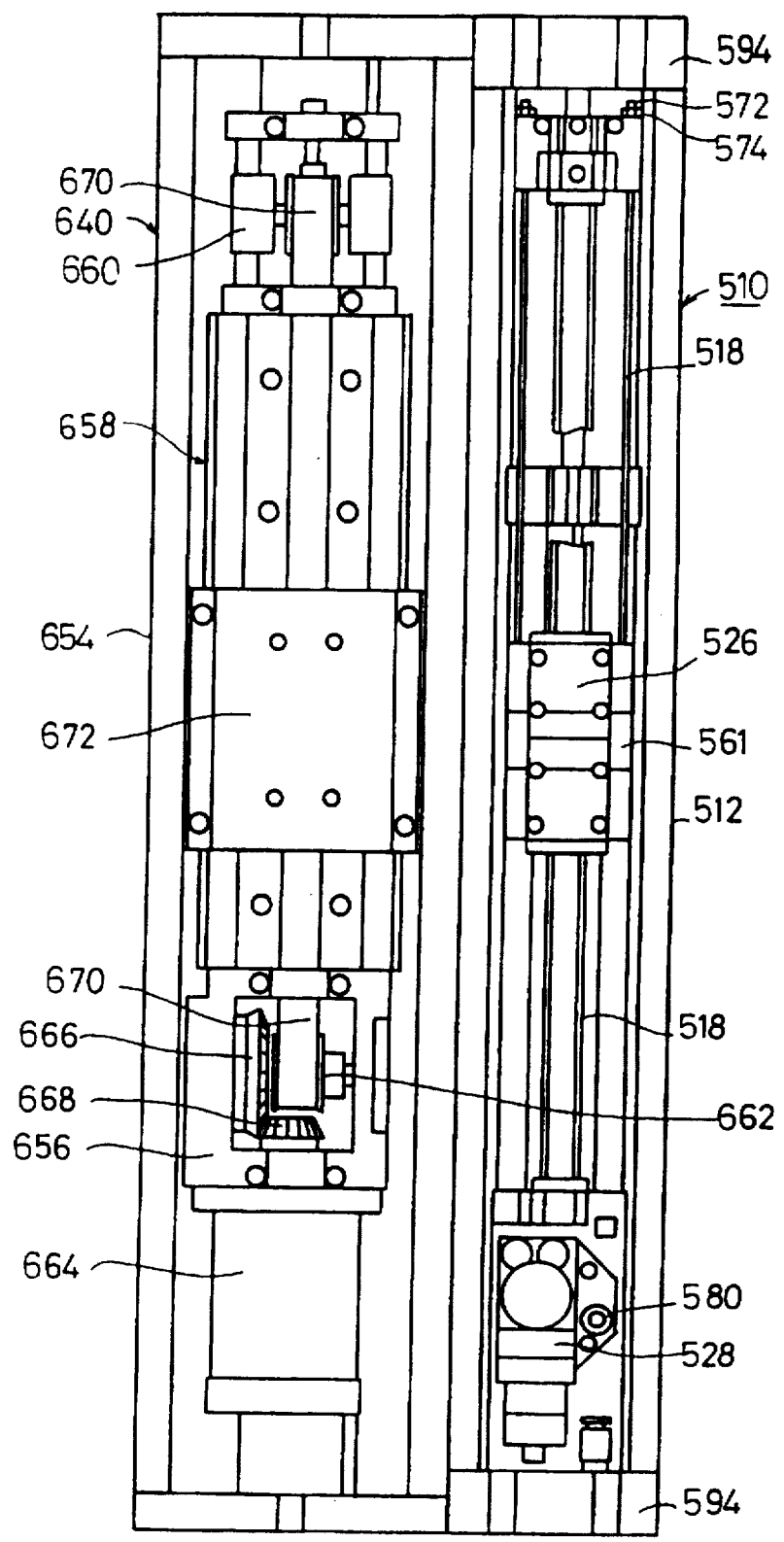
FIG. 65 is a front elevational view, partly cut away, of a balancer and an actuator that are juxtaposed, with a cover opened.
Figure 66:
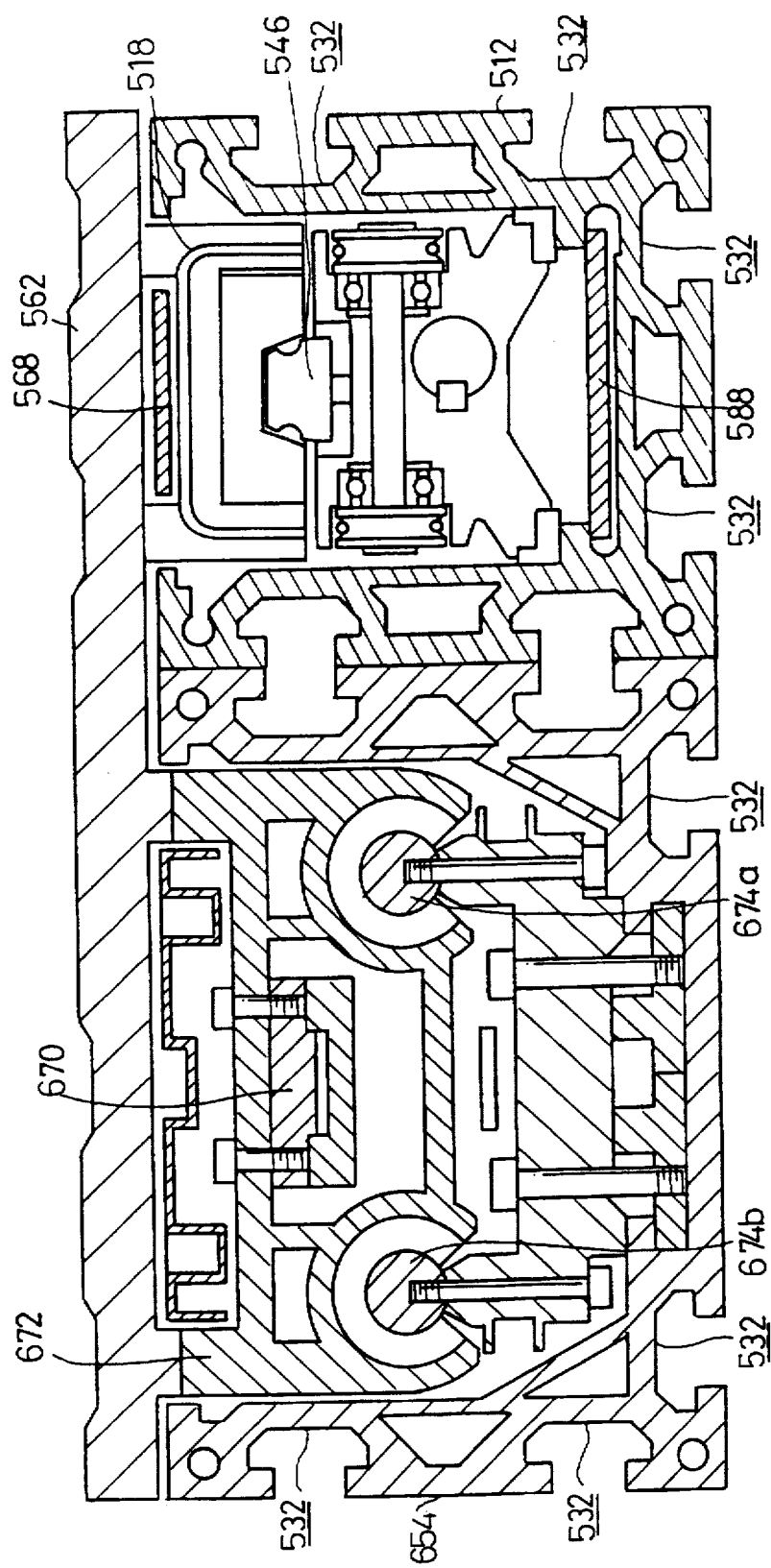
FIG. 66 is a transverse cross-sectional view of the balancer and the actuator shown in FIG. 65.
Figure 67:
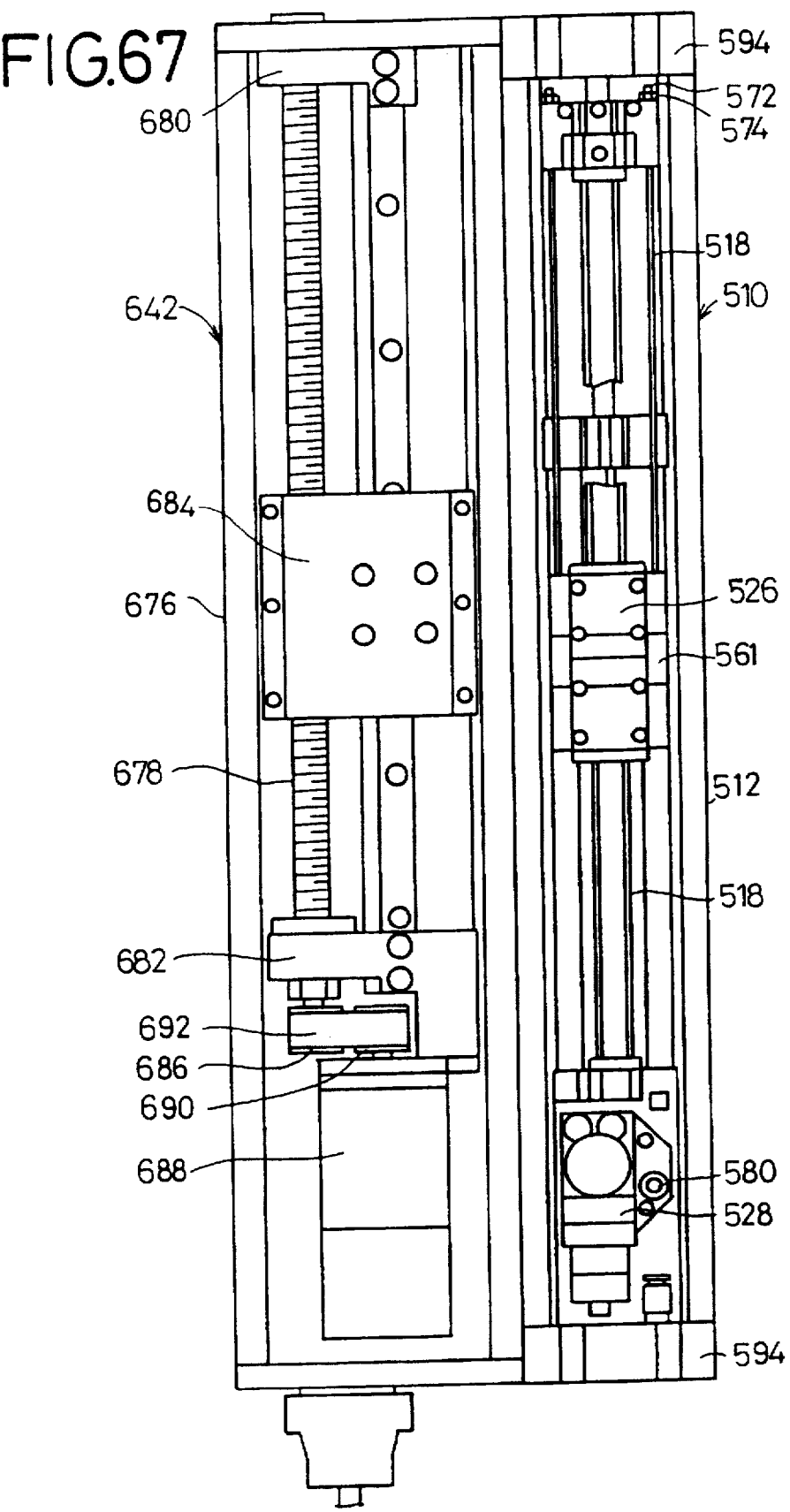
FIG. 67 is a front elevational view, partly cut away, of a balancer and an actuator that are juxtaposed, with a cover opened.
Figure 68:
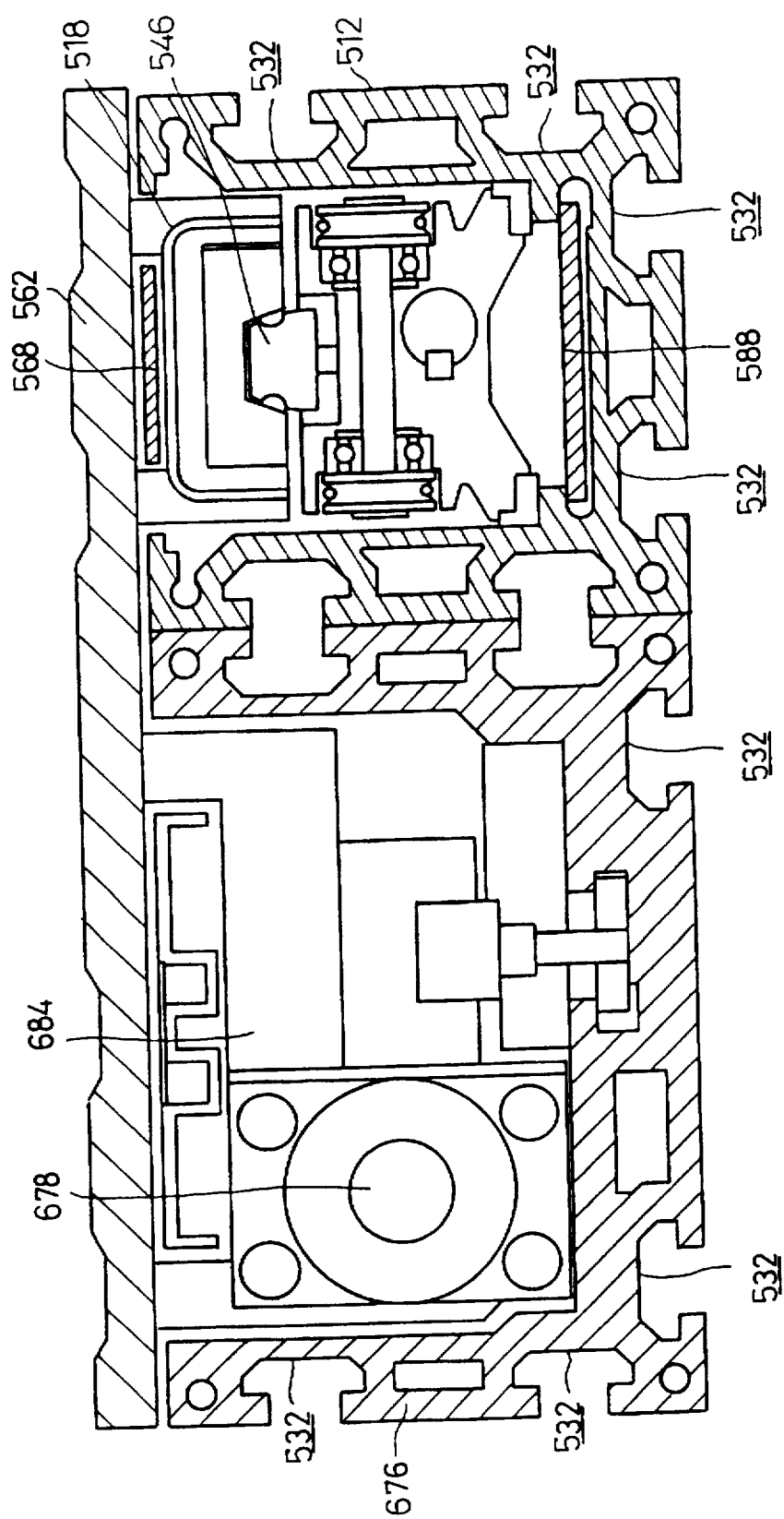
FIG. 68 is a transverse cross-sectional view of the balancer and the actuator shown in FIG. 67.

FIGS. 63, 65, and 67 are front elevational views of balancers 510 and respective actuators 638, 640, 642 that are juxtaposed, with covers opened. FIGS. 64, 66, and 68 are transverse cross-sectional views of the arrangements shown in FIGS. 63, 65, and 67, respectively.

The actuator 638 shown in FIG. 63 has a frame 512 which is substantially identical to a frame 512 of the balancer 510. A timing belt 650 trained around a motor pulley unit 646 and an idle pulley unit 648 disposed in a recess defined in the frame 512 is rotated by a motor 644 which is also disposed in the recess. Upon rotation of the timing belt 650, a table 652 supported by the timing belt 650 is linearly displaced, and an elongate joint table 562 that is joined to the table 652 and a drive table 526 of the balancer 510 is linearly displaced in a substantially vertical direction. In response to energization of the motor 644, therefore, the actuator 638 displaces the joint table 562 in a substantially vertical direction for moving a workpiece, for example, substantially vertically. The balancer 510 serves to reduce a load on the motor 644 of the actuator 638.

The actuator 640 shown in FIG. 65 has a frame 654 having grooves 532 of substantially T-shaped cross section defined in outer side surfaces thereof, which are similar to those of a frame 512 of the balancer 510, the frame 654 being wider than the frame 512. The frame 654 has a recess housing therein a motor pulley unit 656, a table 658, and an idle pulley unit 660. The motor pulley unit 656 has a pulley 662 which can be rotated by a bevel gear 666 coaxially connected to the pulley 662 and held in mesh with a bevel gear 668 that is coupled to the drive shaft of the motor 664. When the pulley 662 is rotated, a table 672 supported by a timing belt 670 is linearly moved. The table 672 supported by the timing belt 670 is slidably displaceable. Other structural details and operation of the actuator and the balancer shown in FIGS. 65 and 66 are the same as those of the actuator and the balancer shown in FIGS. 63 and 64, and will not be described in detail below.

The actuator 642 shown in FIG. 67 has a frame 676 which is as wide as the frame 654 shown in FIG. 65. The frame 676 has a recess housing therein a first housing 680 which supports one end of a ball screw 678, a second housing 682 which supports the opposite end of the ball screw 678, a table 684 having a through hole in which the ball screw 678 extends and linear displaceable along the ball screw 678, and a timing belt 692 trained around a pulley 686 coupled to the end of the ball screw 678 near the second housing 682 and a pulley 690 coupled to the drive shaft of a motor 688. When the motor 688 is energized, the pulley 690 rotates the timing belt 692, which then rotates the pulley 686 thereby to rotate the ball screw 678 coaxial with the pulley 686 for displacing the table 684.

The actuator 642 is useful for installation in a limited space. To make the actuator 642 thus useful, the ball screw 678 is positioned closely to an end of the frame 676, and the drive shaft of the motor 688 is positioned laterally of the axis of the ball screw 678. Therefore, if the actuator 642 is to be placed in a space with horizontal dimensional limitations, then the ball screw 678 and the drive shaft of the motor 688 may be longitudinally aligned with each other. Accordingly, the actuator 642 can be arranged for use in spaces with dimensional limitations in various directions.

Various assemblies of the actuator structural body with a plurality of actuators and an air balancer being arranged for conveying workpieces have been described above. However, the present invention is not limited to the above assemblies. Columnar members and actuators may be combined in various ways to produce actuator structural bodies for conveying workpieces in vertical and horizontal directions. Examples of such actuator structural bodies will be described below.

Figure 69:
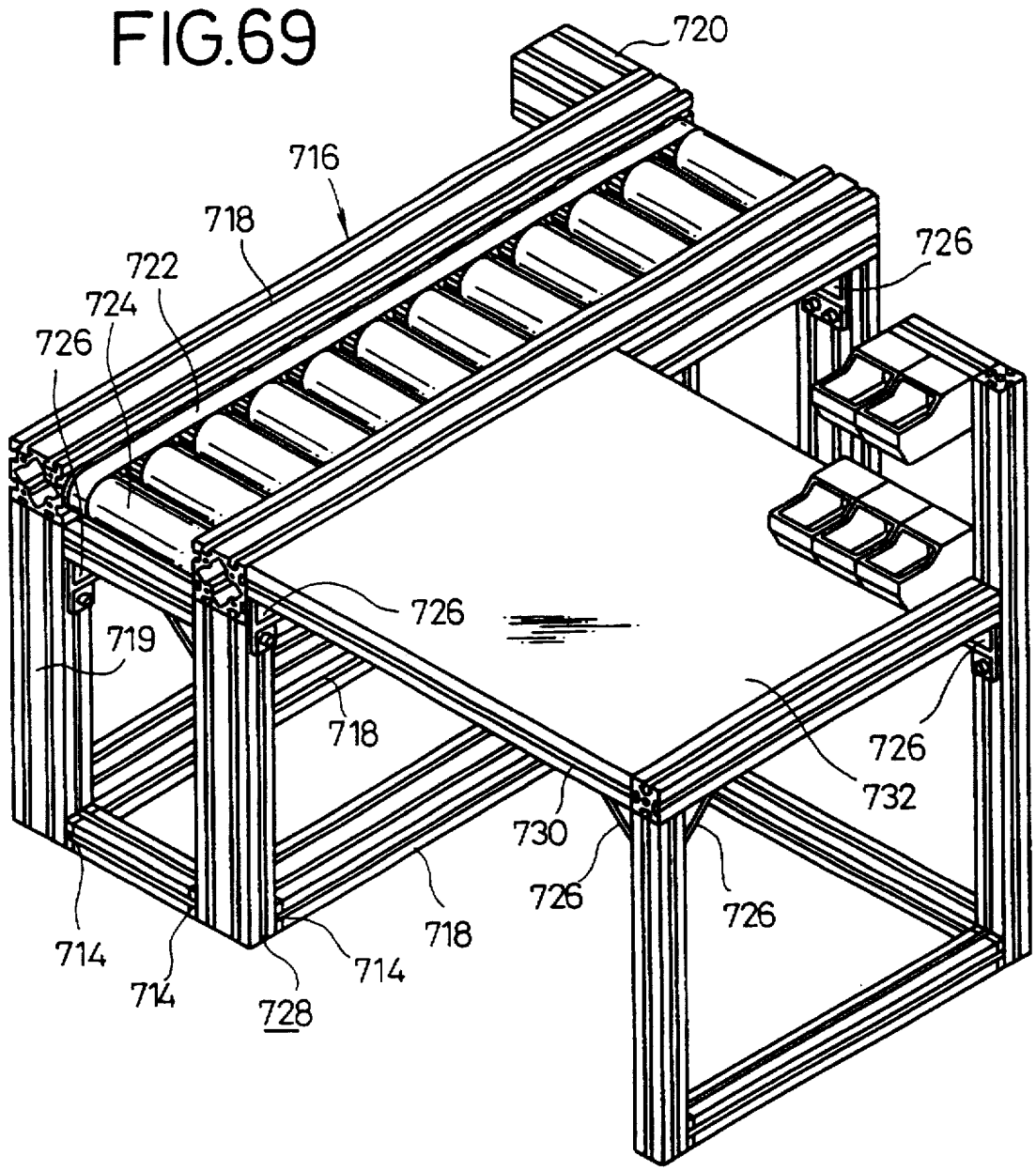
FIG. 69 is a perspective view of a conveyor device comprising a plurality of structural members joined and assembled together, with a working table coupled thereto.
Figure 70:
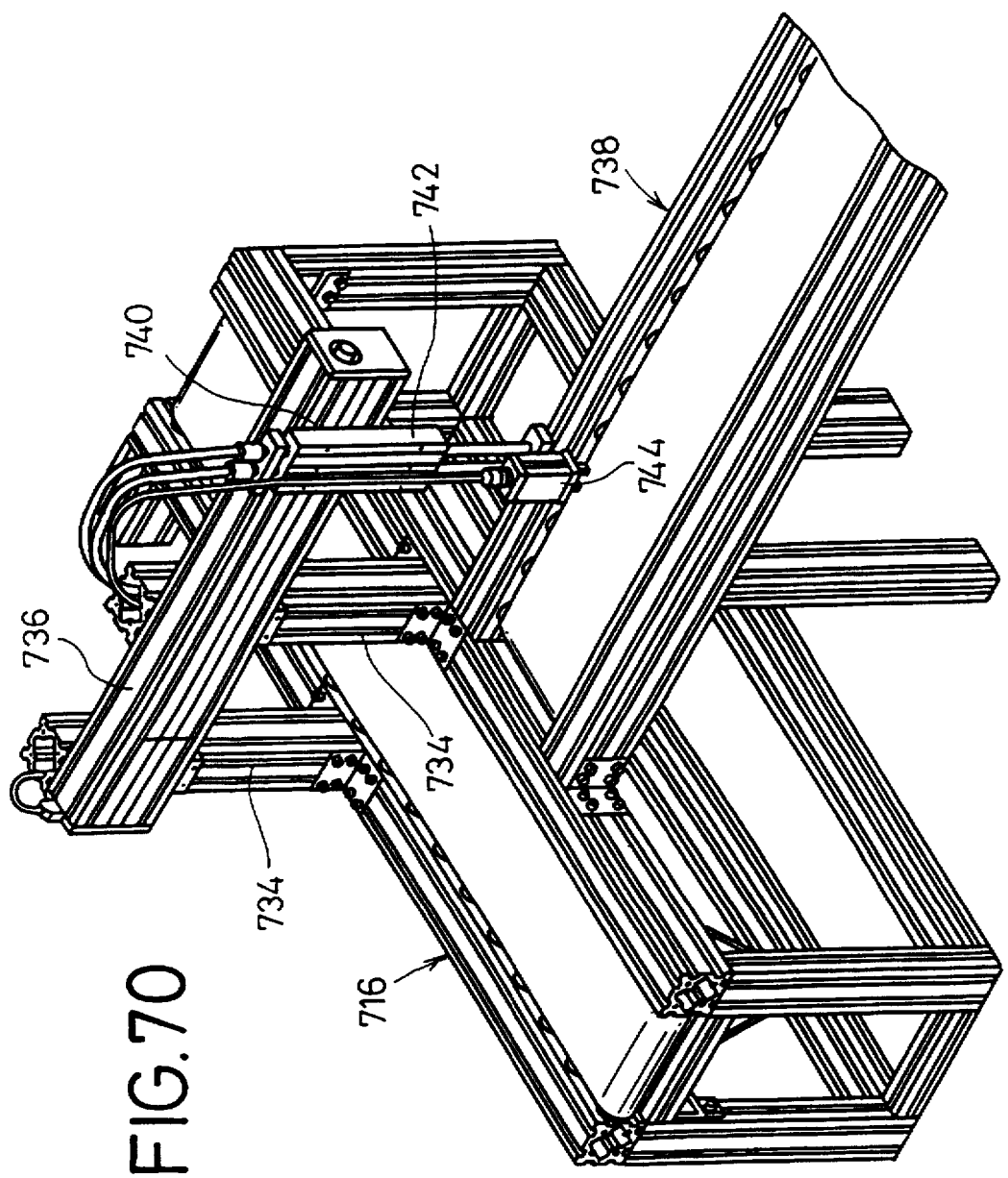
FIG. 70 is a perspective view of a conveyor device comprising a plurality of structural members joined and assembled together, with a conveying table coupled thereto.

Conveyor devices and an assembling working table which are constructed of structural members and connecting blocks are shown in FIGS. 69 and 70.

As shown in FIG. 69, a conveyor device 716 constructed of connecting blocks 714 has a plurality of structural members 718, 719 that make up a framework substantially in the form of a rectangular parallelepiped, a drive motor 720 coupled to an end of one of substantially parallel structural members 718 that are elongate, and a plurality of rotatable rollers 724 which can be rotated by the drive motor 720 through a timing belt 722. Shaft motors may be used which comprise the rotatable rollers 724 each incorporating the drive motor 720. The conveyor device 716 is associated with reinforcing members 726 which increase equipment rigidity in regions where loads are applied.

When the conveyor device 716 which has been constructed is modified or expanded, the conveyor device 716 does not need to be disassembled, but other structural members or devices may be joined to the conveyor device 716. In FIG. 69, a working table 732 can easily be added to the conveyor device 716 simply by joining a structural member 730 through grooves 728 of substantially T-shaped cross section which are defined in outer side surfaces of structural members 719.

As shown in FIG. 70, an actuator 736 and a conveying table 738 are joined to the conveyor device 716 through structural members 734, and a cylinder 742 with two rods is joined to a movable body 740 of the actuator 736, the cylinder 742 supporting an air chuck 744 mounted on the distal ends of the rods thereof. While a workpiece (not shown) conveyed by the conveying table 738 is being gripped by the air chuck 744, the actuator 736 is operated to move the cylinder 742 coupled to the movable body 740 toward the conveyor device 712 for thereby conveying the workpiece.

Figure 71:
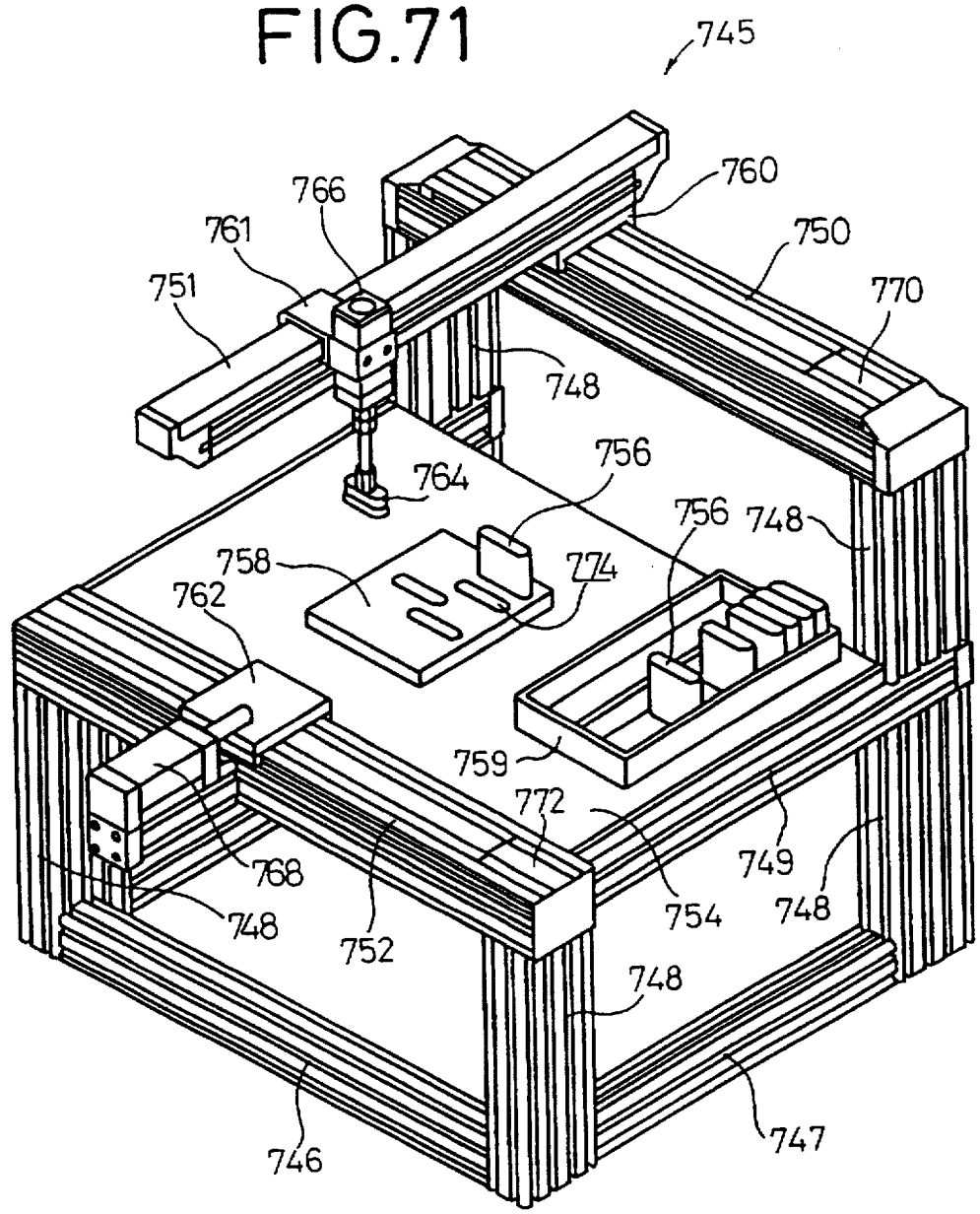
FIG. 71 is a perspective view showing a first assembly of a plurality of structural members and actuators coupled thereto.
Figure 72:
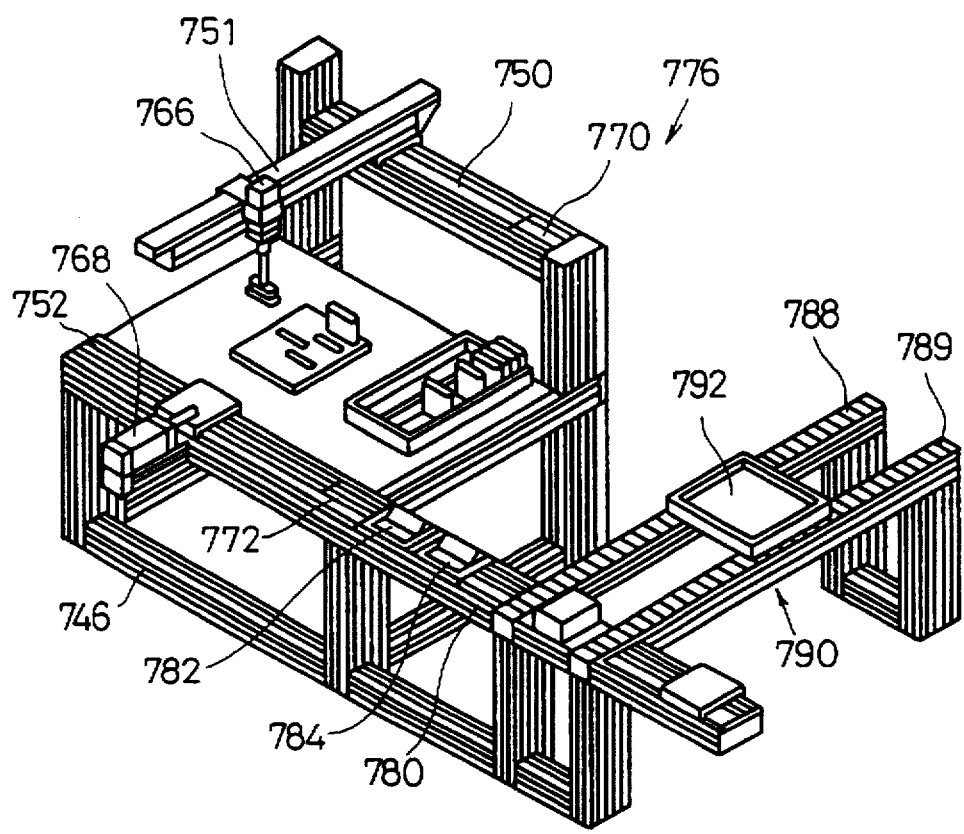
FIG. 72 is a perspective view showing a second assembly of a plurality of structural members and actuators coupled thereto.
Figure 73:
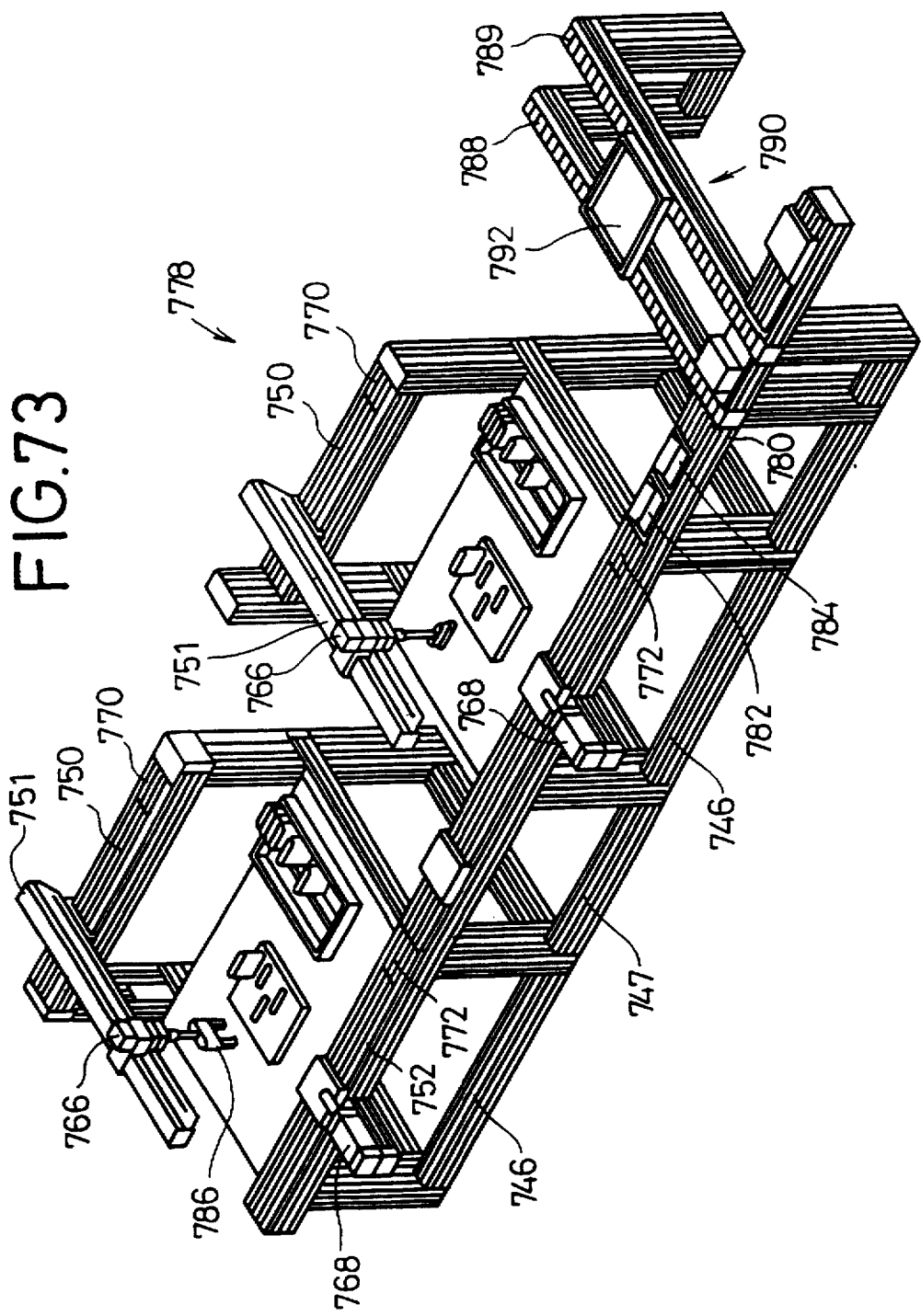
FIG. 73 is a perspective view showing a third assembly of a plurality of structural members and actuators coupled thereto.

Assemblies of a plurality of structural members and actuators coupled thereto are shown in FIGS. 71 through 73. In FIGS. 71 through 73, identical components are denoted by identical reference numerals, and will not be described in detail.

A first assembly 745 shown in FIG. 71 comprises a plurality of structural members 746, 747, 748, 749 which make up a skeleton, first through third actuators 750, 751, 752, a working table 754, a workpiece 756, a workpiece holder plate 758 and a workpiece storage box 759, movable bodies 760, 761, 762, a first cylinder 766 with a suction pad 764 being coupled as a workpiece gripping means, and a second cylinder 768 with a cylinder rod being projected.

The first actuator 750 serves to linearly move the second actuator 751 mounted on an upper surface of the movable body 760 associated with the first actuator 750. The first cylinder 766 with the suction pad 764 being coupled thereto is joined to the movable body 761 which is associated with the second actuator 751 which is connected perpendicularly to the first actuator 750. The second cylinder 768 is joined to the movable body 762 which is associated with the third actuator 752, for positioning the workpiece 756. A motor box 770 is disposed at a junction between the first actuator 750 and the structural member 748, and a valve unit 772 is disposed at a junction between the third actuator 752 and the structural member 748.

The first assembly 745 operates as follows: Compressed air is supplied through fluid passages in the structural members to the first cylinder 766 coupled to the second actuator 751. When the compressed air is supplied, the cylinder rod of the first cylinder 766 is displaced downwardly, and the suction pad 764 attracts the workpiece 756 which is positioned in the workpiece storage box 759. Compressed air is supplied again to displace the cylinder rod upwardly, and while the cylinder rod is being displaced upwardly, the movable body 760 of the first actuator 750 is moved upwardly, thereby moving the second actuator 751 coupled to the movable body 760 of the first actuator 750. The second actuator 751 stops moving when the workpiece 756 attracted by the suction pad 764 has moved near a position above a desired position. The movable body 761 of the second actuator 751 is moved horizontally, and the cylinder rod of the first cylinder 766 is lowered to insert the workpiece 756 into a desired hole 774 defined in the workpiece holder plate 220. The cylinder rod of the third actuator 752 is displaced to position the workpiece.

FIGS. 72 and 73 show second and third assemblies 776, 778, respectively. In each of the second and third assemblies 776, 778, sequencers 782, 784 with programming boards, which function as actuator controllers, are mounted on a structural member 780. In FIG. 73, a mechanical hand 786 is connected to the distal end of a first cylinder 766. The sequencers 782, 784 with programming boards are detachably mounted on the structural member 780. A belt conveyor actuator 790 combined with endless belts 788, 789 is positioned closely to the sequencers 782, 784 with programming boards. A plate 792 can be conveyed by the belt conveyor actuator 790.

In FIGS. 72 and 73, various signals such as electric signals, fluid pressure signals, or the like to be supplied to the sequencers 782, 784 with programming boards are transmitted through inner passages (not shown) defined in the structural members and actuators, as described above.

Figure 74:
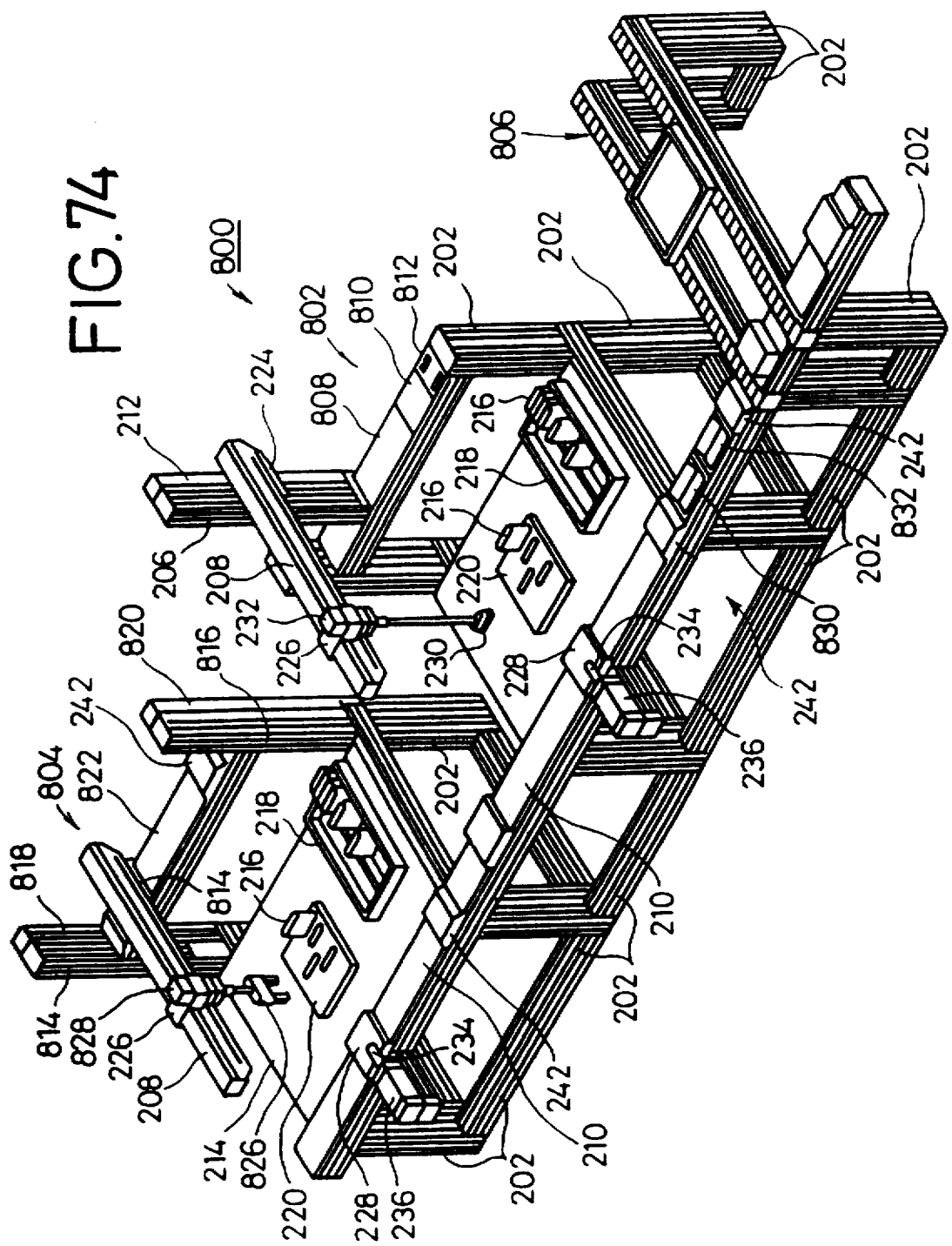
FIG. 74 is a perspective view of a second assembly of the actuator structural body according to the present invention.

FIG. 74 shows a second assembly of the actuator structural body which is similar to the assembly shown in FIG. 20. Those components of the second assembly which are identical to those of the assembly shown in FIG. 20 are denoted by identical reference numerals, and will not be described in detail below.

An actuator structural body 800 shown in FIG. 74 basically comprises a first section 802 and a second section 804 disposed parallel to the first section 802, with a belt conveyor 806 being disposed parallel to the second section 804. The first section 802 and the second section 804 are selectively used depending on a working process to be effected on a workpiece.

The first section 802 comprises a motor box 810 and a controller 812 having a display unit, the motor box 810 and the controller 812 being positioned on one end of an actuator 808 and lying flush with an upper surface of the actuator 808. Since the motor box 810 and the controller 812 lie flush with the upper surface of the actuator 808, they provide compatibility when they are mounted on another member. Because the motor box 810 and the controller 812 are compact in shape, they can effectively utilize a space. Other motor boxes 242, etc. shown in FIG. 74 may also be disposed flush with upper surfaces of actuators 210.

The second section 804 comprise balancers 818, 820 associated with respective actuators 814, 816 and extending vertically in confronting relationship to each other. Opposite ends of an actuator 822 are joined to respective movable bodies of the actuators 814, 816 and the balancers 818, 820. The actuator 822 extends substantially perpendicularly to the actuators 814, 816 and the balancers 818, 820, and is joined substantially horizontally. The actuator 822 has a movable body 824 to which an actuator 208 is joined, and the actuator 208 has a movable body 226 to which there is joined a cylinder 828 with a mechanical hand 826 connected to the distal end of a rod thereof. Actuators 210 are joined longitudinally to each other at a junction between the first and second sections 802, 804. The actuators 210 have respective movable bodies 228 to which there are joined respective cylinders 236 having respective positioning cylinder rods 234.

The belt conveyor 806 is coupled to the first section 802, and programming keyboards 830, 832, each functioning as an input/output device for a control system, are disposed at a junction between the belt conveyor 806 and the first section 802. The programming keyboards 830, 832 are detachably mounted on a columnar member 202, and allow the control system (described later on) to manage various devices incorporated in the actuator structural body 800, i.e., the actuators 210, 206, 208, 808, 814, 816, the balancers 212, 818, 820, the cylinders 232, 236, 838, the mechanical hand 826, and the belt conveyor 806. The control system comprise various controllers, processors, circuits for transmitting various signals including optical signals, electric signals, fluid pressure signals, etc., and circuits for transmitting and receiving radio signals, which are housed in the actuators 210, 206, 208, 808, 814, 816 and the columnar member 202.

Figure 75:
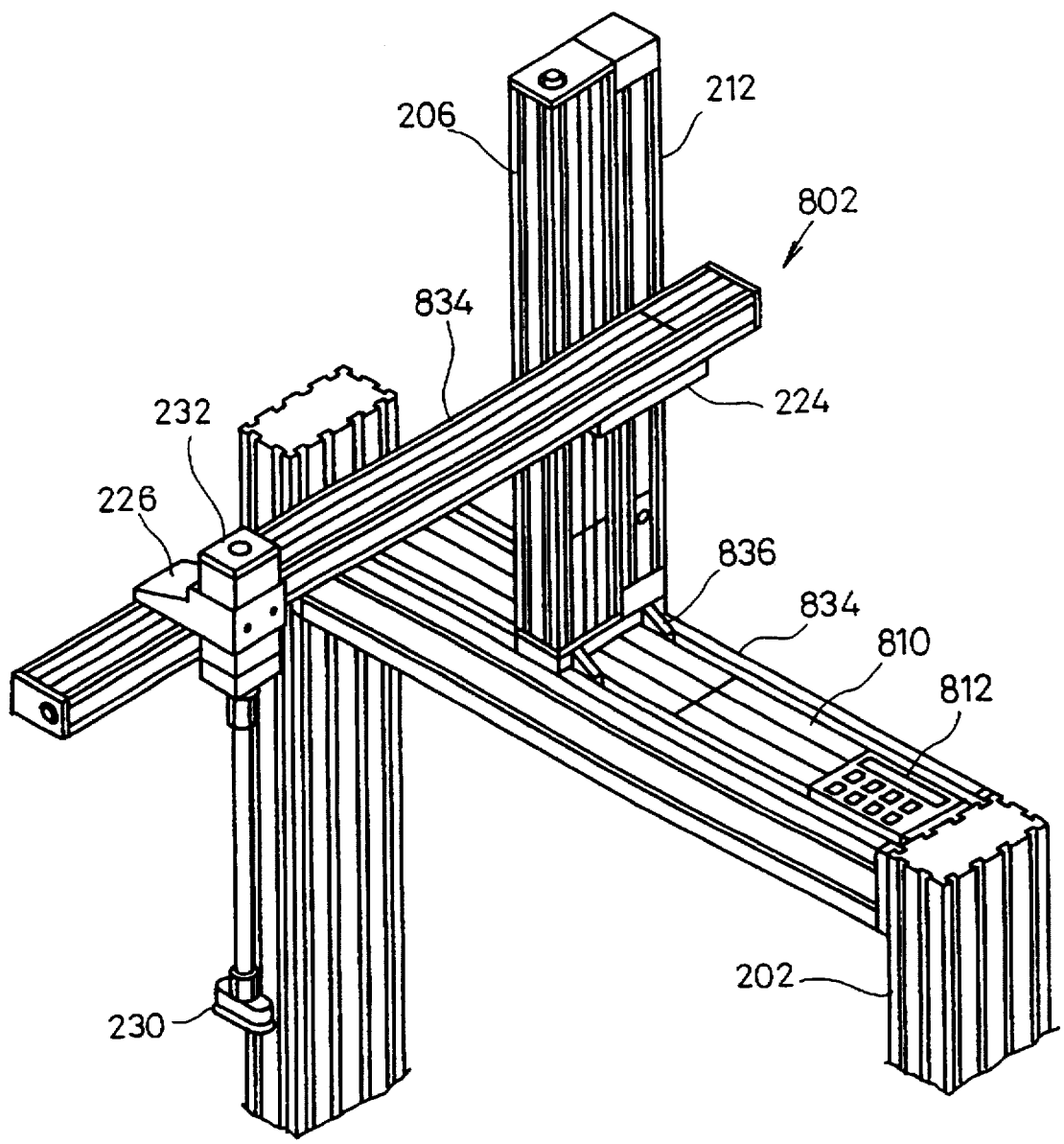
FIG. 75 is a partly perspective view of the actuator structural body shown in FIG. 74.

FIG. 75 shows the actuator structural body in which the actuator 208 of the first section 802 is replaced with another actuator 834. The reference numeral 836 represents a movable body.

An application in which the actuator structural body 800 functions as an independent production line having a plurality of processing steps will be described below.

As shown in FIG. 76, a parts pallet 841 having an ID module (not shown) is conveyed from a warehouse 838 by an unmanned vehicle 840 along a belt conveyor 806. The parts pallet 841 enters the first section 802 of the actuator structural body 800 where it is processed. Each of workpieces 216 also has an ID module. Thereafter, the parts pallet 841 is delivered to the second section 804 by a conveying means (not shown). In the second section 804, the parts pallet 841 is processed. After being fully processed by the production line, the parts pallet 841 is delivered to another process.

An application in which each of the sections 802, 804 of the actuator structural body 800 functions as an independent production line will be described below.

In FIGS. 74 and 76, the actuator 808 is controlled by an actuator controller 1, the actuator 208, the cylinder 232, and the suction pad 230 by an actuator controller 2, and the actuator 206 and the balancer 212 by a balancer controller 1. The actuator controllers 1, 2 and the balancer controller 1 are connected to a multiaxis controller 1 through a multibus 842 and controlled as one working unit thereby. The actuator 210 and the cylinder 236 are coordinately controlled by an actuator controller 3. The actuator 210 and the cylinder 236 are connected to a multiaxis controller 2 through a multibus 844 and coordinately controlled as one working unit thereby.

Coordinated control of the first section 802 of the actuator structural body 800 is carried out by a supervisory microprocessor 1 which is connected to the multiaxis controllers 1, 2 by a LAN which employs electric signals, optical signals, radio communications, etc.

In the second first section 804 of the actuator structural body 800, the actuator 822 is controlled by an actuator controller 4, the actuator 208, the cylinder 828, and the mechanical hand 826 by an actuator controller 5, the actuator 210 and the cylinder 236 by an actuator controller 6, the actuator 814 and the balancer 818 by a balancer controller 2, and the actuator 816 and the balancer 820 by a balancer controller 3. The balancer controllers 2, 3 are connected to a local controller 846 for moving the actuator 822 substantially vertically while keeping it horizontal, and controlled for coordinated synchronization. The actuator controllers 4, 5 and the local controller 846 are connected to a multiaxis controller 3 through a multibus 848 and coordinately controlled as one working unit thereby. Therefore, coordinated control of the second section 804 is also carried out by a supervisory microprocessor 2 which is connected to the multiaxis controllers 3, 4 by a LAN which employs on electric signals, optical signals, radio communications, etc. The actuator controllers 1–6 can function as balancer controllers, respectively, and the balancer controllers 1–3 can function as actuator controllers, respectively.

The belt conveyor 806 is controlled by a belt conveyor controller 850, and the unmanned vehicle 840 and the warehouse 838 are controlled by a control device, a control system, or the like which are not shown.

Respective control devices (not shown) of the supervisory microprocessors 1, 2, the belt conveyor controller 850, the unmanned vehicle 840, and the warehouse 838 are connected in a network comprising a LAN which employs on electric signals, optical signals, radio communications, etc., and can freely transfer information therebetween, thereby making up a coordinated control system for the actuator structural body 800 as an independent production line.

The above control system depends on a certain host computer for overall coordinated control, and provides a centralized control system for controlling the control devices through its nodes. The centralized control system has many advantages, but is disadvantageous in that the entire network will go down if the host computer goes down, and changes and additions of nodes and control devices need a large-scale modification of the control application program. In view of the above drawbacks, the control devices and control units of the control system may have self-controlling application programs and operate while in mutual communications, making up a decentralized intelligent control system based on a LON (Local Operating Network) which requires no host computer. In the decentralized intelligent control system, the control application programs dispersed in the respective nodes have a simple structure and can flexibly cope with additions and changes of the network and the node control devices (see Japanese patent publications Nos. 3-504066 and 3-505642).

To the LAN, there are connected not only the control system for the actuator structural body 800 as an independent production line, but also other production, supervisory, information, communication, and control systems, thus making up a larger-scale coordinated production supervising system. For example, a production supervising computer 852 which operates as a host management computer as in FA, CIM may be connected to the LAN, so that the LAN may be part of a larger-scale coordinated production supervising system network. In such a case, procedures for placing orders, managing processes, assembling, machining, and conveying workpieces, and program procedures or program editing for operating controlled objects including actuators, sensors, pallets, robots, control devices, etc. are carried out depending on the processes and an ordering system which are supervised by CIM.

An input/output device 854 such as the programming keyboards 830, 834 shown in FIG. 74 is provided as a user interface for the above system. The input/output device 854 may freely be connected to controllers, processors, computers, etc. through general-purpose interfaces such as RS232C, RS422C, etc., a LAN which employs electric signals, optical signals, radio communications, etc., a multibus, an Ethernet, or a token ring. An input/output device 856 or a general-purpose interface is provided which can be connected to a host CIM computer, controllers, processors, etc. In such a case, a control program can be edited, generated, modified, downloaded, uploaded, inputted and outputted by not only the host CIM computer, but also each of the controllers, processors, computers, etc., and each of the controllers, processors, computers, etc. can be accessed. All the each of the controllers, processors, and computers may be directly connected to each other by a network, or may be directly connected to each other by a virtual network through a software approach. This makes it possible to control the overall working site, monitor and manipulate supervisory information, to increase the working efficiency, and to individually control each operation and step while maintaining the coordinated nature of the entire system. The entire system is thus made highly flexible, resulting in a configuration highly effective for system modifications and maintenance and production of many product types in small quantities.

The controllers, processors, and computers may communicate with each other through the multibus and the LAN, but may be directly connected to each other by a network or a virtual network through a software approach. Furthermore, they may be integrated by the OS of a host computer, a slave computer, a PC, a local controller, a UNIX, a minicomputer, or a microcomputer, or an object architecture based on the window of a splashboard of the Macintosh OS. The CAD/CAM/CAE/LA data structure of a graphic/two-dimensional/solid modeling program, e.g., Ideas of SDRC Inc., CADAM or DB2 of IBM Inc., CAE of CATIA Inc., a DXF of AUTOCAD In., or the like, may be used to simulate a design or development process as a concurrent engineering process. In this case, it is effective to utilize the technology of virtual reality as a man-machine interface (MMI).

The user interface of the system may comprise be implemented by virtual reality as disclosed in Japanese patent application No. 5-36901. In such a case, an existing production system, network, parts, or ordering status may be presented in a virtual space as assistance for system recognition. Moreover, a virtual reality recognition system depending on a user (a system builder, a programmer, a production planner, a maintenance person, or the like) may be provided to assist in operation and understanding, irrespective of the actual factory equipment, and the structure and arrangement of the FA system. In this manner, recognized system and the actually constructed system can be separated, and the actually constructed system does not need to depend on the ability of the user. This allows a single actually constructed system to be recognized and operated as a plurality of simultaneous virtual reality recognition systems, allows an actually constructed system to be modified without hardware modifications by modifying a virtual reality recognition system, allows an actually constructed system to be divided on the time domain and operated (time sharing), or allows an actually constructed system to be divided on the space domain and operated (multilayering), so that the system can be operated beyond the limits of the user with respect to space and time recognition. This system comprises a system (GOD) for coordinately supervising and controlling the actually constructed system and a system (DEVIL) for translating the actually constructed system into a virtual reality recognition system and presenting the virtual reality recognition system to the user.

In the production system of the actuator structural body 800 that is standardized under the CIM supervision, the standardized structural body 800 with the workpiece 216 as its component, the actuators 210, 206, 208, 808, 814, 816, the suction pad 230, the mechanical hand 826, and the cylinders 232, 236, 828 may be replaced with an artificial-life CIM (ALCM) system which generates and maintains its production system by itself. Alternatively, the system may be propagated itself from a minimum ALCIM system or a production line into an overall factory production system or a regional group-factory production system. It will be possible for the system to be constructed as a biological system owing to advances in genetic technology in the future. In this case, the system may be propagated itself from a single super-DNA/RNA seed to a production system or a factory. A fully self-propagated artificial-life manufacturing system (ALMS) is highly effective in various applications, e.g., factories, mass-handling systems, medical fields, homes, special environments such as atomic energy and vacuum environments, or superclean rooms, and regions of severe environments for survival, such as polar regions, rigorously cold regions, deep sea, space, or planets. It is possible to provide ALMSs having a plurality of production purposes in a limited single environment, and integrate their system scales, abilities, and efficiencies into a composite ALMS which is optimum for demand capabilities and environmental conditions in the single environment. The composite ALMS may continuously be given self-propagating, self-modifying, and mutating abilities for growing a composite ALMS for use in a single environment which can maximally adapt itself to demand capabilities and environmental conditions that vary at all times. The above optimization concept based on a combination of systems is effective for use in a self-modifying system such as AI system, and is effective to optimize not only the ALMS but also system supervising software, network priority, manufacturing line construction, manufacturing priority, process division and construction, etc. The above optimization concept based on a combination of systems also suggests a possibility of operation of a CIM system based on a combination of systems which have independent controlling capabilities. The CIM system does not have a specific centralized control system, and is coordinately operated in its entirety by the consensus of all the independent control systems of the overall CIM system. The consensus may be formed under the supervision of a certain one of the independent control systems. Alternatively, certain parts of all the independent control systems which are of decentralized hardware and make up the entire system may be linked and function in an coordinated manner. If the consensus is reached in view of the importance of requests and tasks of the respective independent control systems, then it is possible to control the entire system optimally at all times.

We claim:

1. An actuator structural body for moving a workpiece, comprising:

a plurality of columnar bodies, wherein one of said columnar bodies comprises an actuator having T-shaped grooves defined along respective outer side surfaces thereof;

another of said columnar bodies comprising a columnar member having a plurality of T-shaped grooves defined along respective outer side surfaces thereof, and further comprising a through hole defined inside said columnar member; and joint means for joining said actuator and said columnar member together by fitting a head portion of said joint means within at least one of the T-shaped grooves of said actuator and securing another end of said joint means inside said through hole of said columnar member.

2. An actuator structural body according to claim 1, wherein said actuator comprises a recess defined in one of said outer side surfaces of said one of said columnar bodies, further comprising:

a drive source housed in said recess and comprising a first induction motor as a main motor and a second induction motor as an auxiliary motor for assisting or controlling said main motor;

power transmitting means for transmitting drive power from said drive source to a movable body;

displacement detecting means for detecting a displacement of said movable body; and control means for controlling drive power from each of said main motor and said auxiliary motor based on the displacement detected by said displacement detecting means, thereby to control a position to which or a speed at which said movable body is moved.

3. An actuator structural body according to claim 2, wherein said power transmitting means comprises a ball screw shaft.

4. An actuator structural body according to claim 2, wherein said power transmitting means comprises a timing belt.

5. An actuator structural body according to claim 4, wherein said timing belt is driven by a drive pulley integrally formed with said induction motor.

6. An actuator structural body according to claim 2, further comprising a gear for transmitting rotative forces from the induction motors, and a timing belt having teeth held in mesh with said gear.

7. An actuator structural body according to claim 4, wherein said timing belt has a longitudinal ridge.

8. An actuator structural body according to claim 2, wherein said displacement detecting means comprises an encoder for detecting angular displacement of the motors.

9. An actuator structural body according to claim 2, wherein said displacement detecting means comprises a magnet mounted on the movable body and a magnetic sensor mounted on the structural body.

10. An actuator structural body according to claim 2, wherein the movable body is slidably disposed on a guide mounted on the structural body.

11. An actuator structural body according to claim 1, wherein said joint means is disposed on an end of one of the columnar bodies, and has a T-shaped head fitted in the T-shaped groove defined in the outer side surface of the other of the columnar bodies.

12. An actuator structural body according to claim 1, wherein said joint means comprises:

an engaging member having a shank inserted in the through hole of said columnar member and a head complementary to the T-shaped groove, said shank having a recess defined therein; and a tightening member threaded in a threaded hole which is defined in said columnar member in communication with said through hole, and having a conical surface on a tip end thereof.

13. An actuator structural body according to claim 1, wherein said joint means comprises:

a block having, on a surface thereof, a protrusion inserted in the through hole of said columnar member and a tooth inserted in the T-shaped groove of said columnar member, said block having a first recess defined in another surface thereof, and a threaded hole defined therein and extending a side surface thereof toward said first recess;

an engaging member having a shank inserted in the first recess of said block and having a second recess defined in a side surface thereof, and a head complementary to the T-shaped groove; and a tightening member threaded in a threaded hole which is defined in said columnar member in communication with said through hole, and having a conical surface on a tip end thereof.

14. An actuator structural body according to claim 1, wherein said joint means comprises:

an engaging member having a shank inserted in an end of the through hole of said columnar member and a head complementary to the T-shaped groove, said engaging member having a first bevel gear on said shank; and a tightening member inserted in a hole defined in said columnar member in communication with said through hole, said tightening member having a second bevel gear on a tip end thereof which is held in mesh with said first bevel gear.

15. An actuator structural body according to claim 1, wherein each of said columnar bodies has two parallel grooves defined in one side surface thereof.

16. An actuator structural body according to claim 1, wherein the through hole of said columnar member is divided into a plurality of through holes.

17. An actuator structural body according to claim 1, wherein wires for energizing said actuator are disposed in the through hole of said columnar member.

18. An actuator structural body according to claim 1, wherein the through hole of said columnar member serves as a fluid passage.

19. An actuator structural body according to claim 1, wherein the through hole of said columnar member has a coated inner wall surface.

20. An actuator structural body according to claim 1, wherein said joint means comprises a reinforcing member held against an outer surface of each of two structural members, and a bolt inserted through a hole defined in said reinforcing member into a T-shaped groove defined in each of the structural members.

21. An actuator structural body according to claim 1, wherein said actuator comprises:

a cylinder for displacing a piston;

a fixed pulley disposed on an actuator body at a stroke end of said cylinder;

a drive pulley mounted in a pulley body connected to a piston rod of said cylinder;

a movable member displaceable by drive forces from said cylinder; and a wire trained around said drive pulley and said fixed pulley, said wire having an end fixed to a balancer body at the stroke end of said cylinder and an opposite end fixed to said joint means.

22. An actuator structural body according to claim 1, wherein said actuator comprises:

a fixed pulley disposed on the actuator body remotely from the stroke end of said cylinder;

an adjusting pulley mounted in said pulley body; and a wire trained around said drive pulley and said adjusting pulley, said from wire having an end fixed to the balancer body remotely from the stroke end of said cylinder and an opposite end fixed to said movable member.

23. An actuator structural body according to claim 21, wherein said movable member is integral with a movable body.

* * * * *